US011882218B2

(12) United States Patent
Higo et al.

(10) Patent No.: US 11,882,218 B2
(45) Date of Patent: *Jan. 23, 2024

(54) MATCHING SYSTEM, METHOD, APPARATUS, AND PROGRAM

(71) Applicant: NEC CORPORATION, Tokyo (JP)

(72) Inventors: Haruna Higo, Tokyo (JP); Toshiyuki Isshiki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 197 days.

This patent is subject to a terminal disclaimer.

(21) Appl. No.: 17/397,431

(22) Filed: Aug. 9, 2021

(65) Prior Publication Data
US 2021/0367783 A1  Nov. 25, 2021

Related U.S. Application Data

(63) Continuation of application No. 16/469,486, filed as application No. PCT/JP2017/044769 on Dec. 13, 2017, now Pat. No. 11,128,462.

(30) Foreign Application Priority Data

Dec. 15, 2016 (JP) ................................ 2016-243709

(51) Int. Cl.
*H04L 9/32* (2006.01)
*H04L 9/00* (2022.01)
(Continued)

(52) U.S. Cl.
CPC .............. *H04L 9/321* (2013.01); *H04L 9/008* (2013.01); *H04L 9/0861* (2013.01); *H04L 9/3066* (2013.01)

(58) Field of Classification Search
CPC ....... H04L 9/321; H04L 9/008; H04L 9/0861; H04L 9/3066
(Continued)

(56) References Cited

U.S. PATENT DOCUMENTS 9,100,185 B2    8/2015  Yasuda et al.
9,614,665 B2    4/2017  Takenaka et al.
(Continued)

FOREIGN PATENT DOCUMENTS

JP    2014-126865 A    7/2014
JP    2016-12111 A     1/2016
(Continued)

OTHER PUBLICATIONS

Haruna Higo, et al., "A Secure Biometric Authentication Scheme with Small Information Disclosure", Symposium on Cryptography and Information Security (SCIS2016), The Institute of Electronics, Information and Communication Engineers, Jan. 19-22, 2016, pp. 1-8, Kumamoto, Japan.

(Continued)

*Primary Examiner* — Kambiz Zand
*Assistant Examiner* — Phuc Pham
(74) *Attorney, Agent, or Firm* — Sughrue Mion, PLLC

(57) ABSTRACT

A matching apparatus generates a random number and transmits second encrypted data obtained by performing an operation of first encrypted data of each of first values related to a first binary vector encrypted and the random number to a matching request apparatus; transmits third encrypted data obtained by performing an operation of the second encrypted data and elements of a matching target second binary vector; based on a second value related to the first binary vector encrypted with the encryption key, the encrypted data and the random number, generates and transmits encrypted data and transmits the generated data to a verification apparatus as a query; and determines whether a count number of mismatched elements between the second binary vector and the first binary vector is less than or equal to a predetermined number based on values obtained by decrypting the encrypted data in the query.

14 Claims, 28 Drawing Sheets

(51) Int. Cl.
*H04L 9/08* (2006.01)
*H04L 9/30* (2006.01)

(58) Field of Classification Search
USPC .......................................................... 713/168
See application file for complete search history.

(56) References Cited

U.S. PATENT DOCUMENTS

| | | | |
|---|---|---|---|
| 9,860,060 | B2 | 1/2018 | Sakemi et al. |
| 10,211,986 | B2 | 2/2019 | Isshiki |
| 11,212,087 | B2 * | 12/2021 | Takemori .............. H04L 9/3242 |
| 2006/0171530 | A1 | 8/2006 | Futa et al. |
| 2009/0249063 | A1 | 10/2009 | Sakurai et al. |
| 2010/0080391 | A1* | 4/2010 | Shah ...................... H04L 9/3271 |
| | | | 380/277 |
| 2012/0224693 | A1* | 9/2012 | Lei ............................ G07F 7/08 |
| | | | 380/270 |
| 2013/0318351 | A1 | 11/2013 | Hirano et al. |
| 2014/0185794 | A1 | 7/2014 | Yasuda |
| 2015/0381348 | A1 | 12/2015 | Takenaka et al. |
| 2016/0099807 | A1 | 4/2016 | Isshiki |
| 2016/0173275 | A1* | 6/2016 | Yasuda ..................... H04L 9/14 |
| | | | 380/28 |
| 2016/0204936 | A1 | 7/2016 | Sakemi et al. |
| 2016/0269174 | A1 | 9/2016 | Yasuda |
| 2017/0193032 | A1* | 7/2017 | Kim .................... G06F 16/2365 |
| 2019/0034646 | A1* | 1/2019 | Fujiwara ................. H04L 9/008 |
| 2019/0207913 | A1 | 7/2019 | Hwang et al. |

FOREIGN PATENT DOCUMENTS

| | | |
|---|---|---|
| JP | 2016-111594 A | 6/2016 |
| JP | 2016-114692 A | 6/2016 |
| JP | 2016-131335 A | 7/2016 |
| JP | 2016-167037 A | 9/2016 |
| WO | 2012/114452 A1 | 8/2012 |
| WO | WO-2012114452 A1 * | 8/2012 ............. H04L 9/008 |
| WO | 2014/185447 A1 | 11/2014 |

OTHER PUBLICATIONS

Haruna Higo, et al., "Secure Biometric Authentication Scheme for Binary Feature", Abstracts of 2017 Symposium on Cryptography and Information Security (SCIS 2017), The Institute of Electronics Information and Communication Engineers, Jan. 24-27, 2017, pp. 1-8, Naha, Japan.

International Search Report for PCT/JP2017/044769 dated Feb. 13, 2018 (PCT/ISA/210).

* cited by examiner (a) $$\begin{pmatrix} A_1 \\ A_2 \end{pmatrix} = \begin{bmatrix} 7 & 10 \\ 10 & 1 \end{bmatrix} \begin{pmatrix} x_1 \\ x_2 \end{pmatrix} + \begin{pmatrix} 11 \\ 1 \end{pmatrix} \mod 13$$

(b)

(c)

MATCHING SYSTEM, METHOD, APPARATUS, AND PROGRAM

CROSS REFERENCE TO RELATED APPLICATION

The present application is a continuation of U.S. application Ser. No. 16/469,486 filed on Jun. 13, 2019, which is a National Stage of International Application No. PCT/JP2017/044769 filed Dec. 13, 2017, based upon and claims the benefit of the priority of Japanese patent application No. 2016-243709, filed on Dec. 15, 2016, the disclosure of which is incorporated herein in its entirety by reference thereto.

FIELD

The present invention relates to a matching system, a method, an apparatus, and a non-transitory medium storing program.

BACKGROUND

For example, services for managing data by using computer resources connected to communication networks, such as cloud computing services, are widely used. Since highly confidential data is managed in this kind of service, security of the data needs to be guaranteed. Research and development have been conducted on techniques for managing encrypted data and performing, for example, search or statistical processing on the encrypted data in a network environment. In addition, biometric authentication techniques have attracted attention. In these techniques, high-security authentication is realized by using biometric information (biometric feature(s)) extracted from a biometric characteristic such as veins.

In biometric authentication techniques, a template is created based on biometric information, and the created template is stored in a database as a credential. In the biometric authentication techniques, when authentication information created based on an authentication target biometric characteristic is similar to (or matches) a template stored in the database, the authentication target is accepted. In the biometric authentication technique, when the authentication information is not similar to (does not match) any one of templates, the authentication target is not accepted. Even when a plurality of items of authentication information are created from a single biometric characteristic, these items of authentication information do not necessarily identical to each other. However, by using a certain distance function, the distance between each pair of these items of authentication information is short. In contrast, when a plurality of items of authentication information are created from different biometric characteristics, a distance between each pair of items of authentication information is long. In the biometric authentication techniques, by using these properties, matching between the templates stored in the database and authentication information created by an authentication target is verified. For example, fingerprints, veins, etc. are examples of biometric characteristics and are considered as lifelong data. Leakage of biometric information to outside of the corresponding matching system results in a significant damage. Thus, confidentiality of biometric information needs to be guaranteed. Therefore, template-protection technique in which no biometric information is leaked to outside even if a template is leaked to outside of the corresponding matching system is important.

In addition, in a biometric authentication technique, as is the case with other authentication techniques, it is necessary to prevent a different person from impersonating a person whose authentication information has been registered (namely, "spoofing"). For example, an authentication scheme in which authentication succeeds with transmission of a specific value to a matching system, does not have sufficient resistance against spoofing. In addition, in an authentication technique, there is also a risk of eavesdropping (interception) of information being communicated. In an authentication technique, spoofing needs to be prevented even if information being communicated is eavesdropped. For example, an authentication scheme in which authentication succeeds with retransmitting data which was transmitted by a legitimate client before does not have sufficient resistance against spoofing.

For example, PTL 1 discloses a method and an apparatus that perform processing for: converting registered information of a user that has been encrypted by using an encryption algorithm capable of calculating a Hamming distance in an encrypted state so that a calculation result of a Hamming distance between the registered information and matching information that has been encrypted by using the encryption algorithm includes a Hamming distance between the matching information and the user and a Hamming distance between the matching information and another person different from the user; calculating a Hamming distance between an input matching information and the transformed registered information; and determining whether the input matching information is incorrect based on a comparison result between a predetermined threshold and the Hamming distance between the matching information and the user and the Hamming distance between the matching information and the another person different from the user included in the calculated Hamming distance.

In PTL 2, in a secure biometric authentication system and a secure tag search system using a homomorphic encryption, when vector data $A=(a1, a2, \ldots)$ is encrypted by a homomorphic encryption, each component ai is encrypted to generate encrypted vector data $E(A)=(E(a1), E(a2), \ldots)$, and a distance (for example, the Hamming distance) between the encrypted vector data $E(A)=(E(a1), E(a2), \ldots)$ and encrypted vector data $E(B)=(E(b1), E(b2), \ldots)$ is calculated with the encrypted data being kept in an encrypted state. PTL 2 states that, when each component of the vector data is encrypted by using a homomorphic encryption in this way, the encrypted vector data $E(A)=(E(a1), E(a2), \ldots), E(B)=(E(b1), E(b2), \ldots)$, etc. result in a large size and a considerable amount of calculation time is needed for secure distance calculation. PTL 2 discloses a configuration of reducing both the size of the encrypted vector data and the time needed for the secure distance calculation.

PTL 3 discloses a method for easily canceling encrypted information in an encryption processing system using a homomorphic encryption. PTL 3 discloses a method including: acquiring a first polynomial by converting first data by using a first transformation polynomial; acquiring a second polynomial by converting a formula obtained based on a random number corresponding to the first data and second data by using a second transformation polynomial; acquiring a random polynomial by converting the random number by using at least one of the first and second transformation polynomials; encrypting the first polynomial, the second polynomial, and the random number polynomial by using a homomorphic encryption scheme to acquire the encrypted first polynomial, the encrypted second polynomial, and the encrypted random number polynomial; and performing matching between the first and second data by using the encrypted first polynomial, the encrypted second polynomial, and the encrypted random number polynomial.

In addition, PTL 4 discloses a technique using a more general homomorphic encryption scheme in a system in which intervention of a trusted third party is introduced.

In addition, PTL 5 discloses a technique in which a template size does not depend on a parameter having a width in an acceptable range and load on a third party is small. However, in this scheme, a distance between registered biometric information and matching target biometric information is revealed to the third person. A malicious third person can conduct an attack (a hill-climbing attack) by using the distance obtained in the matching processing.

In addition, NPL 1 proposes a scheme that satisfies all of the following three security properties, which are security against an attacker who colludes with a server and a user, security against an attacker who colludes with a decryptor and a user, and security against an eavesdropper who impersonates a user.

The following describes notation for an encryption algorithm, etc. used in the present description. First, public key encryption will be described. A public key encryption scheme is expressed by three algorithms (Gen, Enc, Dec) of key generation, encryption, and decryption.

Based on a security parameter $1^\kappa$, the key generation algorithm (which will be referred to as "Gen") outputs a public key pk and a secret key sk based on a security parameter $1^\kappa$.

$$(pk, sk) \leftarrow Gen(1^\wedge\kappa)$$

On input of the public key pk and a plaintext m, the encryption algorithm (which will be referred to as "Enc") outputs a ciphertext c.

$$c \leftarrow Enc(pk, m)$$

On input of the secret key sk and the ciphertext c, the decryption algorithm (which will be referred to as "Dec") outputs a decryption result m'.

$$m' \leftarrow Dec(sk, c)$$

For example, when obvious from a context, pk and sk could be omitted in the present description, drawings, etc. Homomorphic encryption is public key encryption that enables, from ciphertexts of a plurality of plaintexts, calculation of a ciphertext corresponding to an operation result of the plaintexts. For example, "additive homomorphic encryption" enables, from ciphertexts $Enc(m_1), \ldots, Enc(m_n)$ of plaintexts $m_1, \ldots, m_n$, calculation of a ciphertext $Enc(m_1 + \ldots + m_n)$ corresponding to a sum of the plaintexts without using a secret key.

PTL 1: Japanese Patent Kokai Publication No. JP-2016-131335A
PTL 2: Japanese Patent Kokai Publication No. JP-2014-126865A
PTL 3: Japanese Patent Kokai Publication No. JP-2016-12111A
PTL 4: International Publication No. 2014/185447
PTL 5: International Publication No. 2012/114452
NPL 1: Higo, Isshiki, Mori, Obana, "A Secure Biometric Authentication Scheme with Small Information Disclosure", Symposium on Cryptography and Information Security (SCIS2016), 2016.

SUMMARY

The following gives analysis of the related technologies.

PTLs 2 and 3 have a problem in resistance against spoofing attacks by eavesdroppers. In addition, PTLs 2, 3, and 5 need somewhat homomorphic encryption or pairing calculation. The somewhat homomorphic encryption has problems in that the processing load for calculation is heavier than that of an additive homomorphic encryption and requires a stronger assumption, for example.

In addition, in the disclosure of NPL 1, the present inventors have found that, when biometric information is a binary vector (a binary code string), protection (resistance) against spoofing attacks by eavesdroppers, etc. needs to be improved. In addition, the present inventors have found a technique applicable to 1:N authentication, which will be proposed below.

A principal object of the present invention is to provide a matching system, a method, a matching apparatus, and a non-transitory medium, each enabling to avoid leakage, spoofing, etc. regarding matching between binary vectors and enhance security.

According to an aspect of the present invention, a matching system includes:

a matching apparatus that generates a random number, and transmits encrypted data obtained by performing an operation of each of first values related to a first binary vector encrypted with an encryption key, and the random number, with each of the first values being kept in an encrypted state, or encrypted data obtained by encrypting the generated random number with the encryption key, to a matching request apparatus;

the matching request apparatus that performs an operation of the encrypted data transmitted from the matching apparatus and elements of a matching target second binary vector, with the encrypted data being kept in an encrypted state to generate and transmit encrypted data to the matching apparatus;

wherein the matching apparatus, based on a second value related to the first binary vector encrypted with the encryption key, the encrypted data transmitted from the matching request apparatus, and the random number, generates encrypted data or the encrypted data and auxiliary data, each thereof for use of verification of a mismatch degree between the second binary vector and the first binary vector, and transmits the generated data as a query to a verification apparatus; and the verification apparatus that determines whether a count number of mismatched elements between the second binary vector and the first binary vector is less than or equal to a predetermined number, based on a decrypted value obtained by decrypting, with a decryption key, the encrypted data included in the query transmitted from the matching apparatus, or the decrypted value and the auxiliary data included in the query.

According to another aspect of the present invention, there is provided a matching method, including:

(a) by a matching apparatus, generating a random number and transmitting encrypted data obtained by performing an operation of each of first values related to a first binary vector encrypted with an encryption key, and the random number, with each of the first values being kept in an encrypted state, or encrypted data obtained by encrypting the generated random number with the encryption key, to a matching request apparatus;

(b) by the matching request apparatus, performing an operation of the encrypted data transmitted from the matching apparatus and elements of a matching target second binary vector, with the encrypted data being kept in an encrypted state to generate and transmitting encrypted data to the matching apparatus;

(c) by the matching apparatus, based on a second value related to the first binary vector encrypted with the encryption key, the encrypted data transmitted from the matching request apparatus, and the random number, generating encrypted data or the encrypted data and auxiliary data, each thereof for use of verification of a mismatch degree between the second binary vector and the first binary vector, and transmitting the generated data as a query to a verification apparatus; and (d) by the verification apparatus, determining whether a count number of mismatched elements between the second binary vector and the first binary vector is less than or equal to a predetermined number, based on a decrypted value obtained by decrypting, with a decryption key, the encrypted data included in the query transmitted from the matching apparatus, or the decrypted value and the auxiliary data included in the query.

According to another aspect of the present invention, there is provided a matching apparatus including:

means for generating a random number, and transmitting encrypted data obtained by performing an operation of each of first values related to a first binary vector encrypted with an encryption key, and the random number, with each of the first values being kept in an encrypted state, or encrypted data obtained by encrypting the generated random number with the encryption key, to a matching request apparatus;

means for receiving, from the matching request apparatus, encrypted data obtained by an operation of each element of a matching target second binary vector and the encrypted data, with the encrypted data being kept in an encrypted state;

means for generating, based on a second value related to the first binary vector encrypted with the encryption key, the encrypted data transmitted from the matching request apparatus, and the random number, encrypted data or the encrypted data and auxiliary data, each thereof for use of verification of a mismatch degree between the second binary vector and the first binary vector, and transmits the generated data as a query to a verification apparatus; and means for receiving a verification result from the verification apparatus that determines whether a count number of mismatched elements between the second binary vector and the first binary vector is less than or equal to a predetermined number, based on a decrypted value obtained by decrypting, with a decryption key, the encrypted data included in the query transmitted from the matching apparatus, or the decrypted value and the auxiliary data.

According to still another aspect of the present invention, there is provided a program causing a computer of a matching apparatus to perform processing comprising generating a random number, and transmitting encrypted data obtained by performing an operation of each of first values related to a first binary vector encrypted with an encryption key, and the random number, with each of the first values being kept in an encrypted state, or encrypted data obtained by encrypting the generated random number with the encryption key, to a matching request apparatus;

receiving, from the matching request apparatus, encrypted data obtained by an operation of each element of a matching target second binary vector and the encrypted data, with the encrypted data being kept in an encrypted state;

generating, based on a second value related to the first binary vector encrypted with the encryption key, the encrypted data transmitted from the matching request apparatus, and the random number, encrypted data or the encrypted data and auxiliary data, each thereof for use of verification of a mismatch degree between the second binary vector and the first binary vector, and transmits the generated data as a query to a verification apparatus; and receiving a verification result from the verification apparatus that determines whether a count number of mismatched elements between the second binary vector and the first binary vector is less than or equal to a predetermined number, based on a decrypted value obtained by decrypting, with a decryption key, the encrypted data included in the query transmitted from the matching apparatus, or the decrypted value and the auxiliary data.

According to the present invention, there is provided a non-transitory computer-readable recording medium such as a semiconductor storage such as a computer-readable recording medium in which the above program is stored (for example, a RAM (random access memory), a ROM (read-only memory), or an EEPROM (electrically erasable and programmable ROM)), an HDD (hard disk drive), a CD (compact disc), or a DVD (digital versatile disc).

The present invention can avoid leakage of a binary vector, spoofing, etc. regarding matching between binary vectors and enhance security. Still other features and advantages of the present invention will become readily apparent to those skilled in this art from the following detailed description in conjunction with the accompanying drawings where only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

<Basic Mode>

Figure 1:
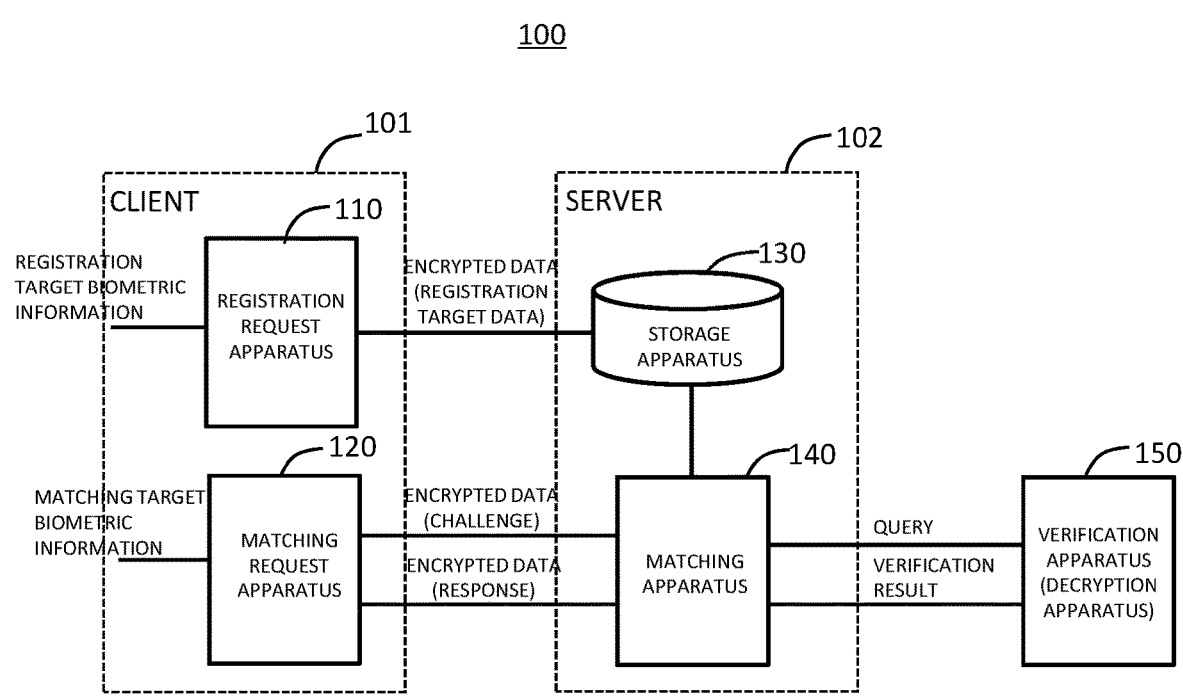
FIG. 1 is a diagram illustrating a configuration according to an example embodiment of the present invention.

FIG. 1 is a diagram illustrating a mode of the present invention. As illustrated in FIG. 1, in a matching system 100 according to a mode of the present invention, in response to a matching request from a matching request apparatus 120, a matching apparatus 140 generates a random number (for example, S in FIGS. 4, 9, 10, 14 to 16, and 19) and encrypted data ($Enc(S(1-2x_i)$ in FIG. 4, etc. or $Enc(SA_i)$ (i=1, . . . , n) in FIG. 14) by performing an operation of first evaluated values (for example, $Enc(1-2x_i)$ (i=1, . . . , n) in FIGS. 4, 9, and 10 or $Enc(A_i)$ in FIG. 14) related to a first binary vector ($X=[x_1, \ldots, x_n]$) which is encrypted with an encryption key (a public key pk) and the random number (S), wherein the first evaluated values have been encrypted with an encryption key (a public key pk) and stored. The matching apparatus 140 transmits the encrypted data ($Enc(S(1-2x_i)$ in FIG. 4, etc. or $Enc(SA_i)$ (i=1, . . . , n) in FIG. 14) to the matching request apparatus 120.

Figure 22:
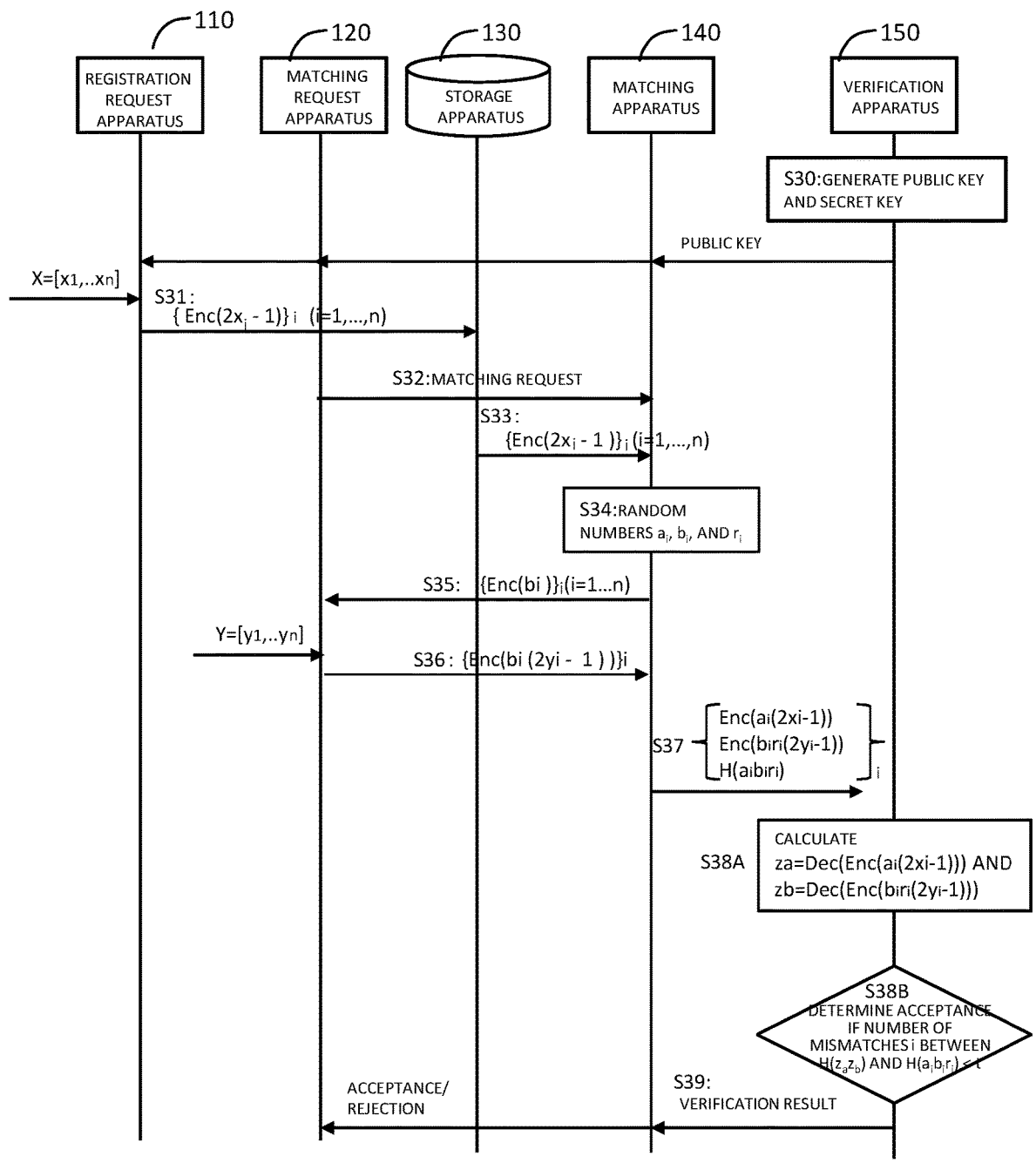
FIG. 22 is a diagram illustrating an operation sequence according to the third example embodiment of the present invention.
Figure 26:
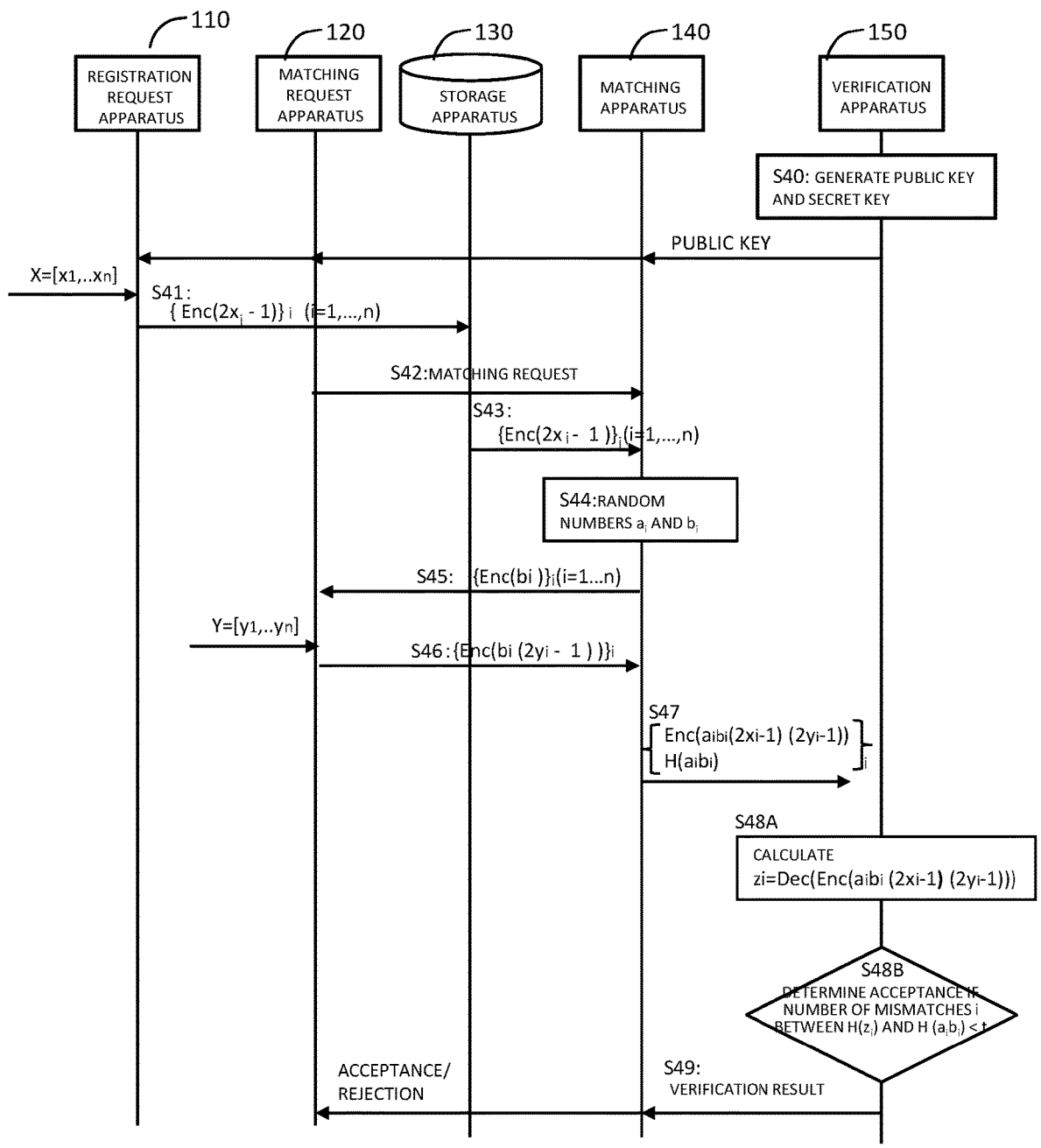
FIG. 26 is a diagram illustrating an operation sequence of a registration phase according to a fourth example embodiment of the present invention.

In the case of 1:N authentication, in response to a matching request from the matching request apparatus 120, the matching apparatus 140 generates random numbers (for example, $a_i$, $b_i$, and $r_i$ in FIG. 22, or $a_i$ and $b_i$ in FIG. 26), generates encrypted data (for example, $Enc(b_i)$ (i=1, . . . , n) in FIG. 22 or 26) of one of the random numbers encrypted with the encryption key (public key pk) and transmits the encrypted data (for example, $Enc(b_i)$ (i=1, . . . , n) in FIG. 22 or 26) to the matching request apparatus 120.

Figure 4:
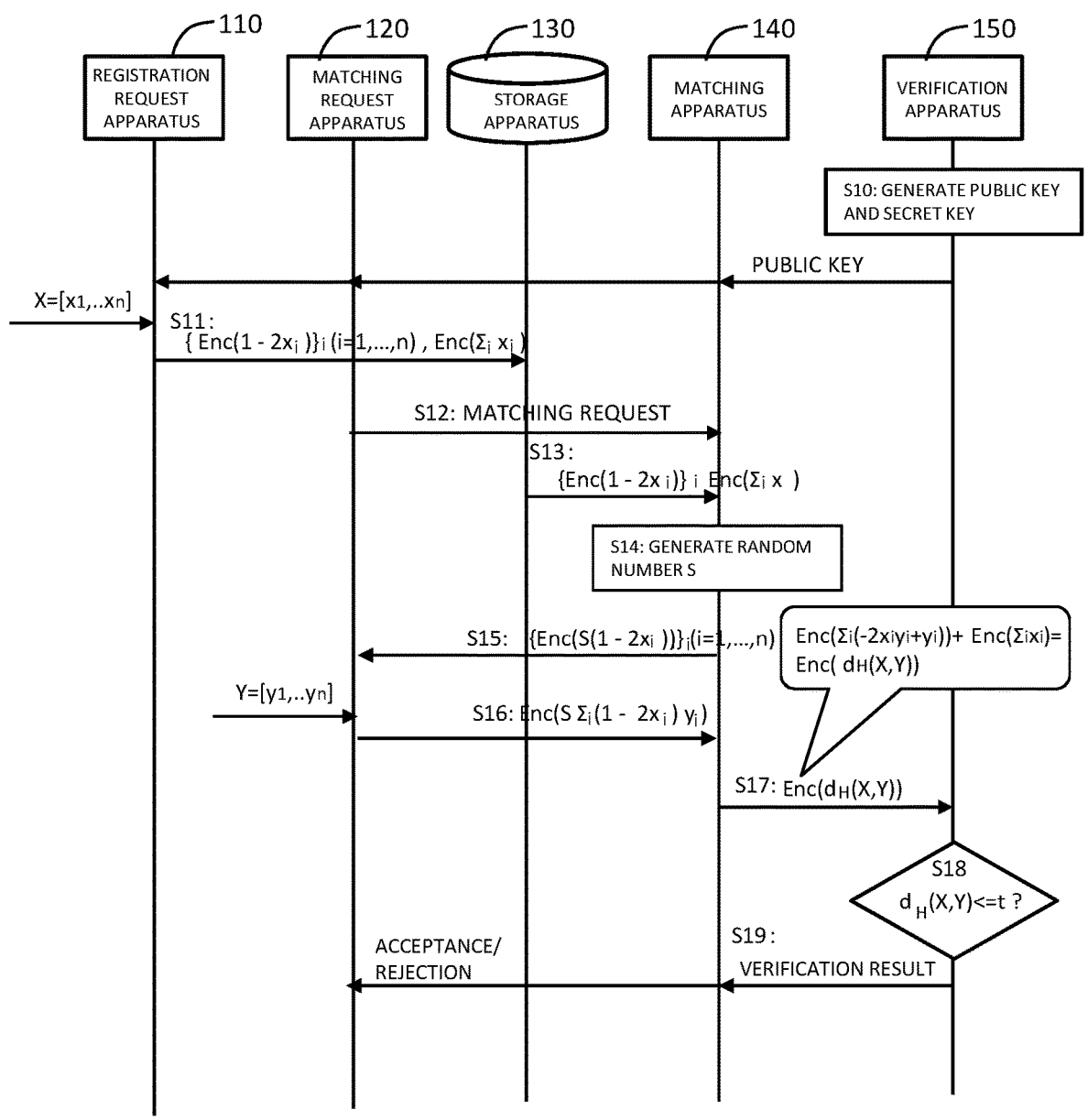
FIG. 4 is a diagram illustrating an operation sequence according to a first example embodiment of the present invention.
Figure 14:
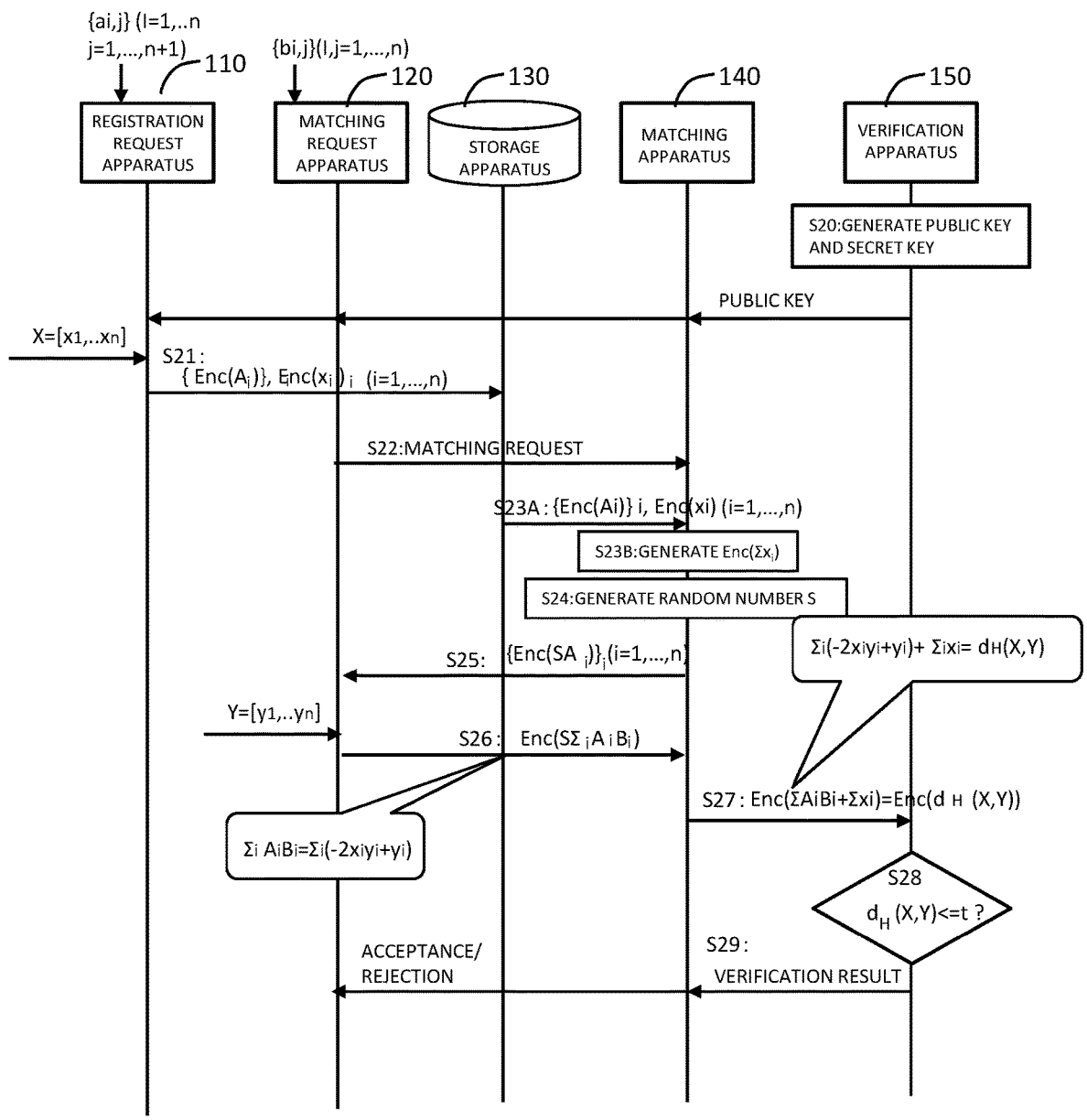
FIG. 14 is a diagram illustrating an operation sequence according to the second example embodiment of the present invention.

The matching request apparatus 120 generates encrypted data (for example, $Enc(S\Sigma_i (1-2x_i)y_i)$ in FIG. 4, etc. or $Enc(S\Sigma_i A_i B_i)$ in FIG. 14, etc., in the case of 1:N authentication, $Enc(b_i (2y_i-1))$ (i=1, . . . , n) in FIG. 22 or 26) obtained by performing an operation of the encrypted data (for example, $Enc(pk, S(1-2x_i))$ in FIG. 4, etc. or, in the case of 1:N authentication, $Enc(SA_i)$ in FIG. 14 or $Enc(b_i)$ (i=1, . . . , n) in FIG. 22 or 26) transmitted from the matching apparatus 140, with the encrypted data being kept in an encrypted state, and elements $\{y_i\}$ (i=1, . . . , n) of a matching target second binary vector ($Y=[y_i, \ldots, y_n]$), or operation results (for example, $B_i$ in FIG. 14) of the elements $\{y_i\}$ (i=1, . . . , n) and transmits the generated encrypted data to the matching apparatus 140. It is noted that $\Sigma_i$ denotes an operator for calculating a sum for i (there are cases in which i is omitted in the drawings).

Based on encrypted data ($Enc(\Sigma_i x_i)$ in FIG. 4, etc. or in the case of 1:N authentication, $Enc(2x_i-1)$ in FIG. 22) of second evaluated values related to the first binary vector ($X=[x_1, \ldots, x_n]$) encrypted with the encryption key (pk), the encrypted data (for example, $Enc(S\Sigma_i (1-2x_i)y_i)$ in FIG. 4, etc. or $Enc(S \Sigma_i A_i B_i)$ in FIG. 14, etc. or, in the case of 1:N authentication, $Enc(b_i (2y_i-1))$ in FIG. 22) transmitted from the matching request apparatus 120, and the random number(s) (for example, S in FIGS. 4, 14, etc. or, in the case of 1:N authentication, $a_i$, $r_i$ in FIG. 22 or $a_i$ in FIG. 26), the matching apparatus 140 generates, as a query to verify a degree of mismatch between the second binary vector and the first binary vector, encrypted data (for example, $Enc(d_H (X, Y))$ in FIGS. 4, 14, etc.) or encrypted data (for example, $Enc(a_i (2x_i-1))$ and $Enc(b_i r_i (2y_i-1))$ in FIG. 22 or $Enc(a_i b_i (2x_i-1)(2y_i-1))$ in FIG. 26) and auxiliary data (for example, hash values $H(a_i b_i r_i)$ in FIG. 22 or hash values H($a_i$ $b_i$) in FIG. 26) in the case of 1:N authentication, and transmits the generated query to a verification apparatus 150.

Figure 19:
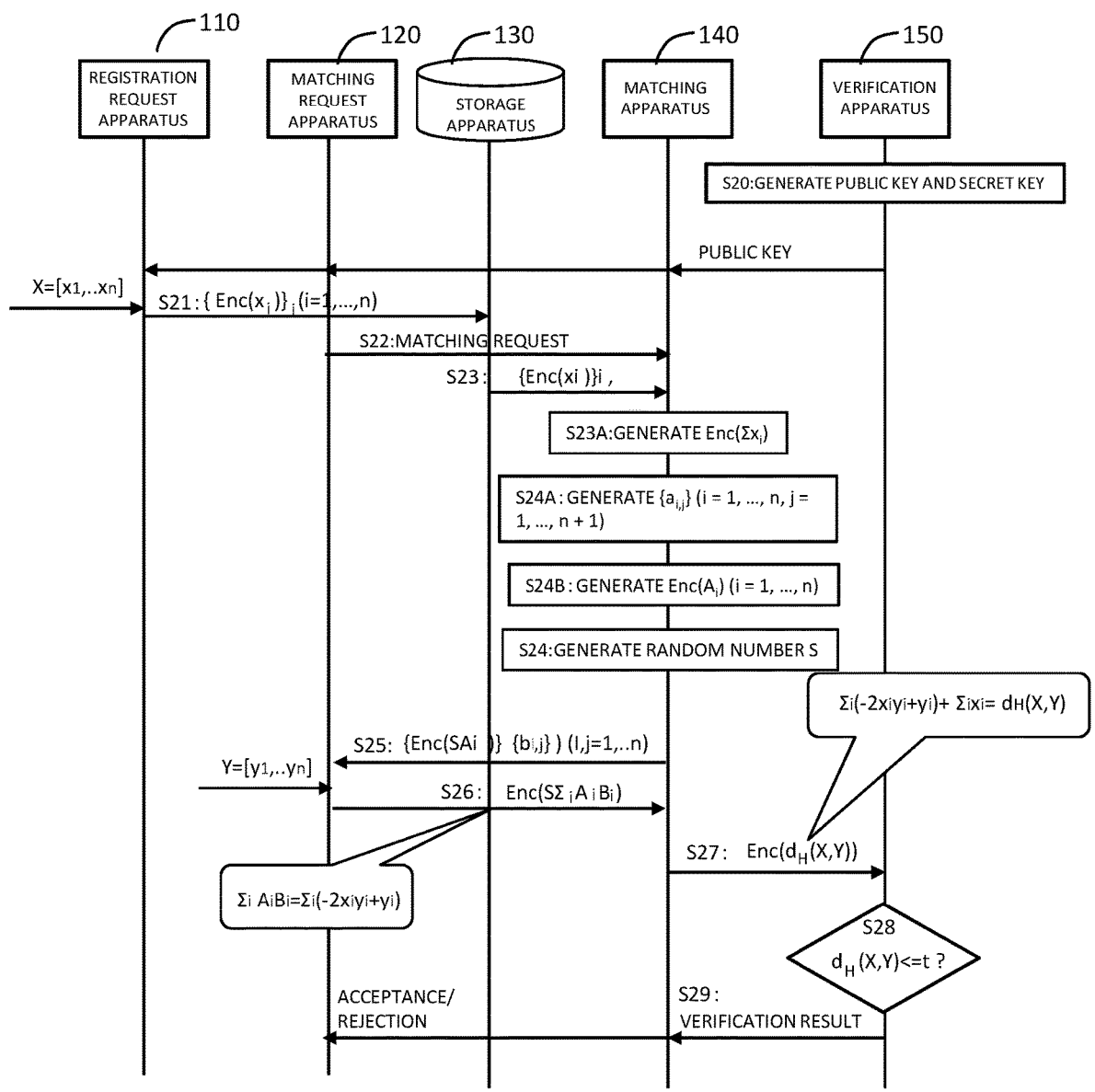
FIG. 19 is a diagram illustrating an operation sequence according to variation 3 of the second example embodiment of the present invention.

Based on a value ($d_H$ (X, Y)) obtained by decrypting the encrypted data (for example, Enc($d_H$ (X, Y)) in FIGS. 4, 19, etc.) included in the query from the matching apparatus 140 by using a decryption key (sk) or based on auxiliary data (for example, H($z_a$ $z_b$) in FIG. 22 or H($z_i$) in FIG. 26) generated from values (for example, ($z_a$, $z_b$) in FIG. 22 or $z_i$ in FIG. 26) obtained by decrypting the encrypted data (for example, Enc($a_i$ ($2x_i-1$)) and Enc($b_i$ $r_i$ ($2y_i-1$)) in FIG. 22 or Enc($a_i$ $b_i$ ($2x_i-1$)($2y_i-1$)) in FIG. 26) included in the query by using the decryption key (sk) and auxiliary data (for example, H($a_i$ $b_i$ $r_i$) in FIG. 22 or H($a_i$ $b_i$) in FIG. 26) included in the query in the case of 1:N authentication, the verification apparatus 150 determines whether a count number of mismatched elements between the second binary vector (Y) and the first binary vector (X) is less than or equal to a predetermined number. The verification apparatus 150 outputs a verification result (acceptance or rejection). The verification apparatus 150 may transmit the verification result (acceptance or rejection) to the matching apparatus 140 as a response to the query, and the matching apparatus 140 may transmit the verification result (acceptance or rejection) to the matching request apparatus 120.

Figure 9:
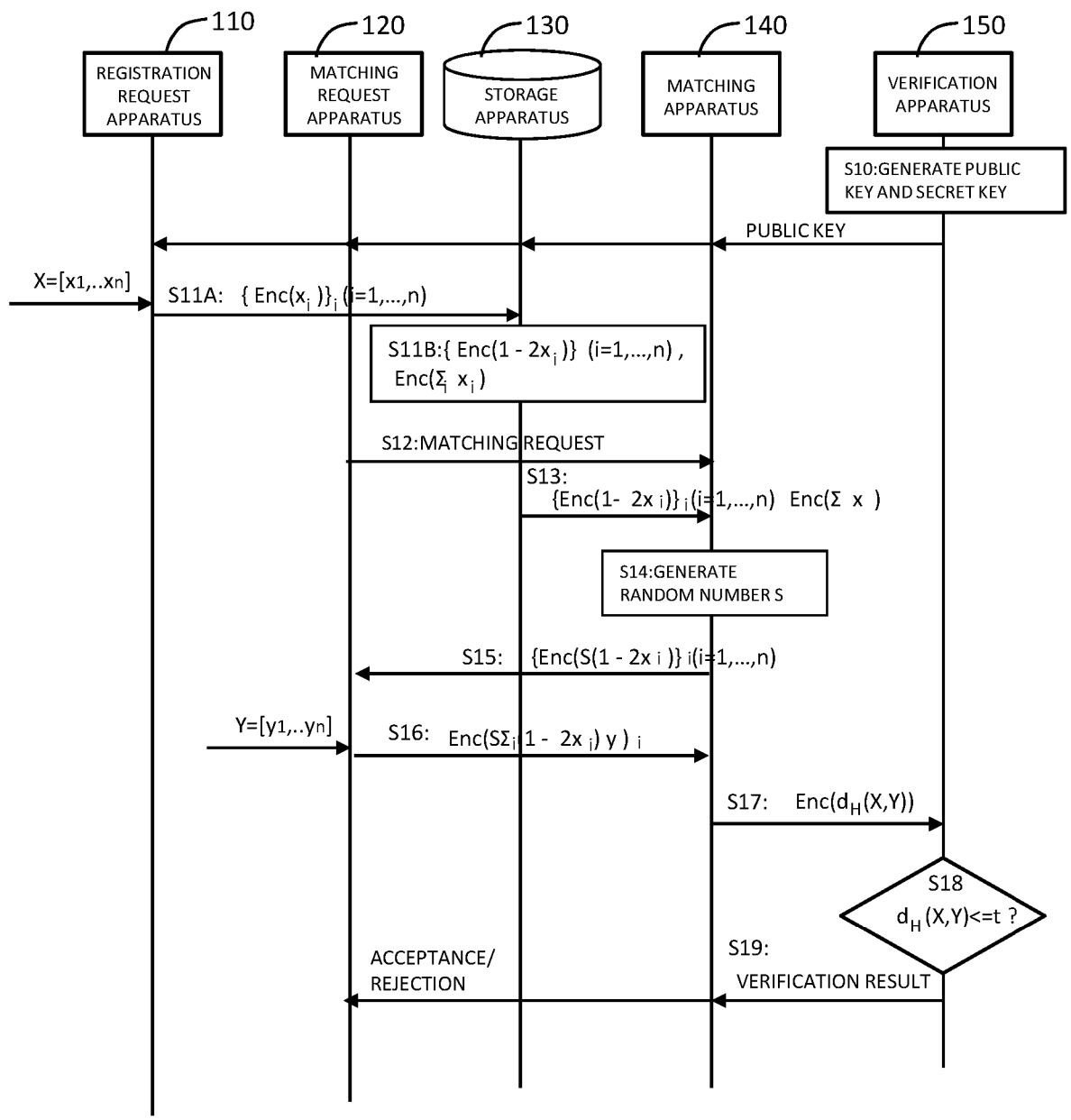
FIG. 9 is a diagram illustrating an operation sequence according to variation 1 of the first example embodiment of the present invention.
Figure 10:
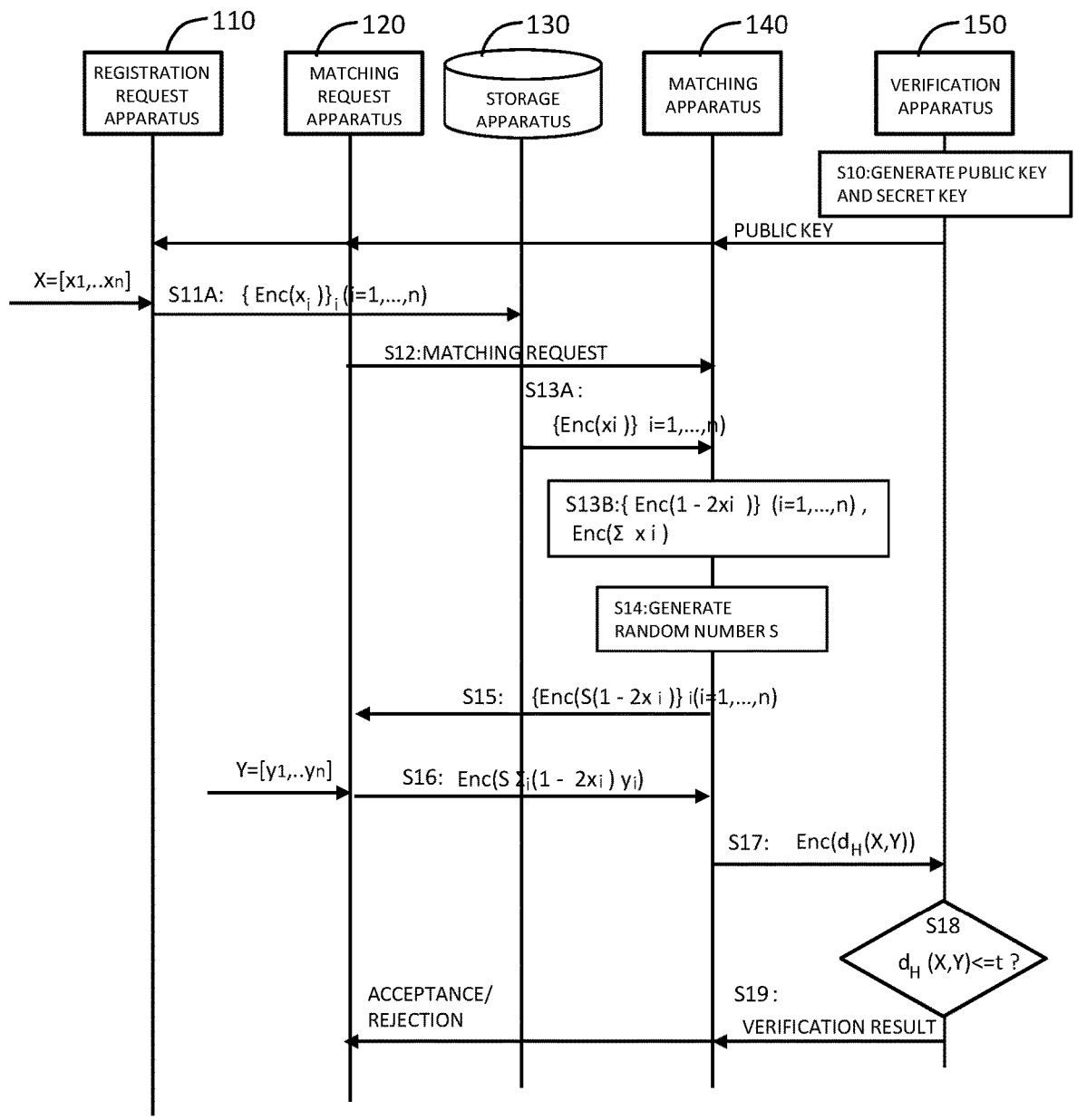
FIG. 10 is a diagram illustrating an operation sequence according to variation 2 of the first example embodiment of the present invention.

A registration request apparatus 110 transmits at least one of encrypted data (Enc($x_i$) (i=1, . . . , n)) of individual elements $\{x_i\}$ (i=1, . . . , n) of the registration target first binary vector X and the first evaluated values (operation results) of the individual elements (for example, Enc(1−$2x_i$) (i=1, . . . , n) in FIGS. 4, 9, and 10 or Enc($A_i$) in FIG. 14) to a storage apparatus 130. The storage apparatus 130 holds the registered data that has been encrypted. It is preferable that a public key encryption scheme having a homomorphic property regarding addition be used for the encryption key (public key) and the decryption key (secret key). Alternatively, a public key encryption scheme having a multiplicative homomorphic property may be used as the encryption scheme. Alternatively, a public key encryption scheme having a homomorphic property on addition and multiplication may be used, such as a somewhat homomorphic encryption scheme.

The registration request apparatus 110 and the matching request apparatus 120 may constitute a client for registration and a client for authentication, respectively. The registration and authentication clients may be integrally formed as a single unit (apparatus) that performs both the registration and matching. Alternatively, the registration and authentication clients may be separately formed as different units (apparatuses) that perform the registration and matching, respectively. The storage apparatus 130 and the matching apparatus 140 may be formed respectively as servers (a database server and an authentication server) that perform registration and matching processing in response to a request from a client. The storage apparatus 130 and the matching apparatus 140 may be integrally formed as a single server.

<First Mode>

According to a mode of the present invention, with reference to FIG. 4, the registration request apparatus 110 may transmit first encrypted data (first templates) (Enc(pk, (1−$2x_i$))) (i=1, . . . , n) obtained by encrypting first calculated values (1−$2x_i$) (i=1, . . . , n) related to individual elements $\{xi\}$ (i=1, . . . , $x_n$) of a registration target n-dimensional first binary vector X=[$x_1$, . . . , $x_n$] by using additive homomorphic encryption with a public key (pk) and fifth encrypted data (a second template) (Enc(pk, $\Sigma$[i=1 to n]$x_i$)) obtained by encrypting a second calculated value ($\Sigma$[i=1 to n] $x_i$) of the individual elements $\{x_i\}$(i=1, . . . , n) by using the public key (pk) to the storage apparatus 130. The storage apparatus 130 holds the first and second templates as registered data. It is noted that the operator $\Sigma$[i=1 to n] denotes a summation operation from i=1 to i=n, namely, $$\Sigma[i=1 \text{ to } n]O(i)=O(1)+ \ldots +O(n)$$

The matching apparatus 140 may generate, in response to a matching request from the matching request apparatus 120, a random number (S) and obtain second encrypted data (Enc(pk, S(1−$2x_i$)), . . . , Enc(pk, S(1−$2x_n$))) by multiplying the first encrypted data (Enc(pk, (1−$2x_i$))) (i=1, . . . , n) by the random number S through a scalar operation with the first encrypted data being kept in an encrypted state. The matching apparatus 140 may transmit the second encrypted data (Enc(pk, S(1−$2x_i$)), . . . , Enc(pk, S(1−$2x_n$))) to the matching request apparatus 120.

The matching request apparatus 120 calculates third encrypted data (Enc(pk, S$\Sigma$[i=1 to n] (1−$2x_i$)$y_i$)), which is a sum of values obtained by multiplying the second encrypted data (Enc(pk, S(1−$2x_i$)), . . . , Enc(pk, S(1−$2x_n$))) transmitted from the matching apparatus 140 by the individual elements $\{y_i\}$(i=1, . . . , n) of the registration target n-dimensional second binary vector Y=[$y_1$, . . . , $y_n$] through a scalar operation. The matching request apparatus 120 transmits the third encrypted data (Enc(pk, S$\Sigma$[i=1 to n] (1−$2x_i$)$y_i$)) to the matching apparatus 140.

The matching apparatus 140 calculates the fourth encrypted data (Enc(pk, $\Sigma$[i=1 to n] (1−$2x_i$)$y_i$)) by removing the random number (S) from the third encrypted data (Enc(pk, S$\Sigma$[i=1 to n] (1−$2x_i$)$y_i$)) transmitted from the matching request apparatus 120. Specifically, the matching apparatus 140 calculates the fourth encrypted data (Enc(pk, $\Sigma$[i=1 to n] (1−$2x_i$)$y_i$)) by multiplying the third encrypted data by the reciprocal (S^(−1)) of the random number (S) (^ denotes an exponentiation operator) through a scalar operation. As a result, the random number (S) is removed from the third encrypted data. The matching apparatus 140 obtains encrypted data (=Enc(pk, $d_H$ (X, Y))=Enc(pk, ($\Sigma$[i=1 to n]$x_i$)+($\Sigma$[i=1 to n] (1−$2x_i$)$y_i$)) of the distance between the first and second binary vectors by adding the fourth encrypted data (Enc(pk, $\Sigma$[i=1 to n] (1−$2x_i$)$y_i$)) and the fifth encrypted data (Enc(pk, $\Sigma$[i=1 to n]$x_i$)) registered in the storage apparatus 130 (homomorphic addition) with the encrypted data being kept in an encrypted state. Next, the matching apparatus 140 transmits the encrypted data (=Enc(pk, $d_H$ (X, Y)) of the distance between the first and second binary vectors to the verification apparatus 150 as a query.

The verification apparatus 150 decrypts the encrypted data (Enc(pk, $d_H$(X, Y))) by using a secret key (sk) (Dec(sk, Enc(pk, $d_H$ (X, Y)))). Next, the verification apparatus 150 outputs acceptance or rejection based on the comparison between the Hamming distance ($d_H$ (X, Y)) between the first and second binary vectors obtained as a result of the decryption and a threshold t ($d_H$ (X, Y))<=t).

<First Mode: Variation 1>

Alternatively, according to the mode of the present invention, with reference to FIG. 9, the registration request apparatus 110 transmits encrypted data Enc(pk, $x_1$), . . . , Enc(pk, $x_n$) obtained by encrypting the individual elements $\{x_i\}$ (i=1, . . . , n) of the registration target first binary vector X=[$x_1$, . . . , $x_n$] by using the public key (pk) to the storage apparatus 130. The storage apparatus 130 calculates first calculated values (Enc(pk, S(1−$2x_i$))) (i=1, . . . , n) and a second calculated value (Enc(pk, $\Sigma$[i=1 to n]$x_i$)) about the individual elements $\{x_i\}$ of the first binary vector X with the encrypted data being kept in an encrypted state (Enc(pk, $x_i$))

(i=1, . . . , n) of the individual elements {$x_i$} of the first binary vector X and holds the first calculated values and the second calculated value as first encrypted data (template) (Enc(pk, S(1−2$x_i$)) (i=1, . . . , n)) and second encrypted data (template) (Enc(pk, Σ[i=1 to n]$x_i$)), respectively.

The matching apparatus 140 generates, in response to a matching request from the matching request apparatus 120, a random number (S), and calculates third encrypted data (Enc(pk, S(1−2$x_1$)), . . . , Enc(pk, S(1−2$x_n$))) by performing a scalar operation of the first encrypted data and the random number (S) with the first encrypted data being kept in an encrypted state. Next, the matching apparatus 140 transmits the third encrypted data to the matching request apparatus 120.

The matching request apparatus 120 calculates fourth encrypted data (Enc(pk, SΣ[i=1 to n] (1−2$x_i$)$y_i$)), which is a sum of values obtained by multiplying each element of the third encrypted data transmitted from the matching apparatus 140, with each element being kept in an encrypted state, by each element of the registration target second binary vector through a scalar operation. The matching request apparatus 120 transmits the fourth encrypted data to the matching apparatus 140. The subsequent processing of the matching apparatus 140 and the verification apparatus 150 is the same as that in the above first mode.

<First Mode: Variation 2>

Alternatively, according to the mode of the present invention, with reference to FIG. 10, the registration request apparatus 110 transmits encrypted data (Enc(pk, x1)), . . . , Enc(pk, $x_n$)) obtained by encrypting individual elements of the registration target first binary vector by using the public key (pk) to the storage apparatus 130. The storage apparatus 130 holds the encrypted data of each element of the first binary vector.

The matching apparatus 140 calculates, in response to a matching request from the matching request apparatus 120, first encrypted data (Enc(pk, (1−2$x_i$)), . . . , Enc(pk, (1−2$x_n$))) and second encrypted data (Enc(pk, Σ[i=1 to n]$x_i$)) of the first calculated values (1−2$x_i$) (i=1, . . . , n), and the second calculated value (Σ[i=1 to n] $x_i$) on individual elements {$x_i$} of the first binary vector with the encrypted data (Enc(pk, $x_i$)) (i=1, . . . , n) of the individual elements {$x_i$} of the first binary vector being kept in an encrypted state. The matching apparatus 140 also generates a random number (S) and calculates the third encrypted data (Enc(pk, S(1−2$x_i$)), . . . , Enc(pk, S(1−2$x_n$))) by performing a scalar operation of multiplication of the random number (S) to the first encrypted data (Enc(pk, (1−2$x_i$)), . . . , Enc(pk, (1−2$x_n$)). Next, the matching apparatus 140 transmits the third encrypted data (Enc(pk, S(1−2$x_1$)), . . . , Enc(pk, S(1−2$x_n$))) to the matching request apparatus 120.

The matching request apparatus 120 calculates the fourth encrypted data (Enc(pk, SΣ[i=1 to n] (1−2$x_i$)$y_i$)), which is a sum of values obtained by multiplying individual elements of the third encrypted data (Enc(pk, S(1−2$x_i$))) (i=1, . . . , n) transmitted from the matching apparatus 140 by individual elements {$y_i$} (i=1, . . . , n) of the matching target second binary vector Y=[$y_i$, . . . , yn] using a scalar operation with the third encrypted data being kept in an encrypted state. Next, the matching request apparatus 120 transmits the fourth encrypted data (Enc(pk, SΣ[i=1 to n] (1−2$x_i$)$y_i$)) to the matching apparatus 140. The subsequent processing of the matching apparatus 140 and the verification apparatus 150 is the same as that in the above first mode.

<Second Mode>

According to a second mode of the present invention, a first transformation function f1 that is applied to a registration target n-dimensional binary vector X=[$x_1$, . . . , $x_n$] is preset in the registration request apparatus 110, and a second transformation function f2 that is applied to a matching target n-dimensional binary vector Y=[$y_i$, . . . , $y_n$] is preset in the matching request apparatus 120.

For example, the first transformation function f1 is given as, $$A=f1(X)=FX+d$$

where A is an n-dimensional transformed value vector, F is an n×n transformation matrix in which a transformation coefficient {$a_{i,j}$} (i=1, . . . , n, j=1, . . . , n) is an element in i-th row and j-th column of the matrix, and d is an n-dimensional vector (offset) with transformation coefficients {$a_{i,n+1}$} (i=1, . . . , n).

For example, the second transformation function f2 is given as, $$B=f2(Y)=EY$$

where B is an n-dimensional transformed value vector and E is an n×n transformation matrix in which a transformation coefficient {$b_{i,j}$} (i=1, . . . , n, j=1, . . . , n) is an element in i-th row and j-th column of the matrix. In the registration request apparatus 110, the first transformation function f1 may be implemented as a subroutine that uses the binary vector X as an input parameter and the transformed value vector A as an output parameter. In the matching request apparatus 120, the second transformation function f2 may be implemented as a subroutine that uses the binary vector Y as an input parameter and the transformed value vector B as an output parameter. The second mode will hereinafter be described with reference to FIG. 14.

The registration request apparatus 110 calculates the transformed value vector [$A_1$, . . . , $A_n$] by applying the first transformation function f1 to the registration target binary vector X.

$$[A1, \ldots, A_n]^T = f1[x_1, \ldots, x_n]^T$$

where superscript T is a transpose operator.

The registration request apparatus 110 generates, as first templates, encrypted data Enc(pk, $A_1$), . . . , Enc(pk, $A_1$) by encrypting the first transformed values $A_i$ (i=1, . . . , n) by using a public key (pk). The registration request apparatus 110 transmits the encrypted data Enc(pk, $A_1$), . . . , Enc(pk, $A_n$) to the storage apparatus 130. In addition, the registration request apparatus 110 also transmits encrypted data (Enc(pk, $x_1$), . . . , Enc(pk, $x_1$)) obtained by encrypting individual elements {$x_i$} (i=1, . . . , n) of the first binary vector X=[$x_1$, . . . , $x_a$] by using the public key (pk) to the storage apparatus 130.

On reception of a matching request from the matching request apparatus 120, the matching apparatus 140 gets the encrypted data (Enc(pk, $A_1$), . . . , Enc(pk, $A_1$)) of the first transformed values from the storage apparatus 130. In addition, the matching apparatus 140 gets the encrypted data (Enc(pk, $x_1$), . . . , Enc(pk, $x_1$)) from the storage apparatus 130. The matching apparatus 140 obtains encrypted data (Enc(pk, Σ[i=1 to n] xi)) of a sum of individual elements {$x_i$} of the first binary vector X=[$x_1$, . . . , $x_{11}$]. In addition, the matching apparatus 140 generates a random number (S) and obtains encrypted data (Enc(pk, $SA_1$), . . . , Enc(pk, $SA_1$)) by multiplying the random number (S) to individual elements of the encrypted data (Enc(pk, $A_1$), . . . , Enc(pk, $A_1$)) of the first transformed values through a scalar operation. Next, the matching apparatus 140 transmits the calculated encrypted data (Enc(pk, $SA_1$), . . . , Enc(pk, $SA_n$)) to the matching request apparatus 120.

The matching request apparatus 120 calculates the second transformed values $(B_1, \ldots, B_{11})$ by applying the second transformation function f2 to an extracted matching target n-dimensional binary vector $Y=[y_1, \ldots, y_n]$. Next, the matching request apparatus 120 performs calculation of the encrypted data Enc(pk, $SA_i$) (i=1, ..., n) received from the matching apparatus 140 in an encrypted state and the second transformed values ($B_i$) (i=1, ..., n). Specifically, the matching request apparatus 120 multiplies the n first transformed values (transformed vector) $[A_1, \ldots, A_n]$ by the random number to obtain values $[SA_1, \ldots, SA_n]$ and obtains encrypted data (Enc(pk, $\Sigma[i=1$ to n] $SA_i B_i$)) of a sum of values obtained by multiplying the values $[SA_1, \ldots, SA_n]$ by elements of the second transformed values (transformation vector) $[B_1, \ldots, B_n]$. Next, the matching request apparatus 120 transmits the encrypted data (Enc(pk, $\Sigma[i=1$ to n]$SA_iB_i$)) to the matching apparatus 140 as a response.

The matching apparatus 140 performs a scalar operation of a reciprocal ($S^\wedge(-1)$) of the random number (S) to the response (encrypted data) (Enc(pk, $\Sigma[i=1$ to n] $SA_i B_i$)) to remove the random number (S) from the response. Namely, the matching apparatus 140 obtains encrypted data (Enc(pk, $\Sigma[i=1$ to n]$A_i B_i$)) which is a sum of values obtained by multiplying elements of the n first transformed values (transformed vector) $[A_1, \ldots, A_n]$ by elements of the second transformed values (transformed vector) $[B_1, \ldots, B_n]$ (encrypted data of an inner product of the vectors A and B). The matching apparatus 140 obtains encrypted data by addition of the encrypted data (Enc(pk, $\Sigma[i=1$ to n]$A_i B_i$)) and the encrypted data (second template) (Enc(pk, $\Sigma[i=1$ to n] $x_i$)) registered in the storage apparatus 130 in an encrypted state. The encrypted data is encrypted data Enc (pk, $d_H$ (X, Y)) of a Hamming distance $d_H$ (X, Y) between the vectors X and Y.

The n(n+1) transformation coefficients $\{a_{i,j}\}$ (i=1, ..., n, j=1, ..., n+1) corresponding to the first transformation function f1 and the $n^2$ transformation coefficients $\{b_{i,j}\}$ (i, j=1, ..., n) corresponding to the second transformation function f2 are set so that the first and second transformed values $A_i$ and $B_i$ (i=1, ..., n) satisfy $\Sigma[i=1$ to n]$A_iB_i=\Sigma[i=1$ to n] $(1-2x_i)y_i$.

That is, a value ($\Sigma[i=1$ to n]$A_i B_i+\Sigma[i=1$ to n]$x_i$) obtained by addition of an inner product of the vectors A and B and $\Sigma[i=1$ to n] $x_i$ is given as $\Sigma[i=1$ to $n](1-2x_i)yi+\Sigma[i=1$ to $n]xi$ which corresponds to a Hamming distance $d_H$ (X, Y) between the vectors X and Y. Namely, $\Sigma[i=1$ to n]$A_iB_i$ is a first divided value of the Hamming distance $d_H$ (X, Y) between the binary vectors X and Y, and $\Sigma[i=1$ to n]xi is a second divided value of the Hamming distance $d_H$ (X, Y).

The matching apparatus 140 transmits the encrypted data Enc(pk, $d_H$ (X, Y)) of the Hamming distance $d_H$ (X, Y) between the vectors X and Y to the verification apparatus 150.

The verification apparatus 150 decrypts the encrypted data Enc(pk, $d_H$(X, Y)) by using a secret key sk. If the decrypted Hamming distance $d_H$ (X, Y) between the vectors X and Y is less than or equal to a threshold t, the verification apparatus 150 determines acceptance.

<Second Mode: Variation 1>

Figure 15:
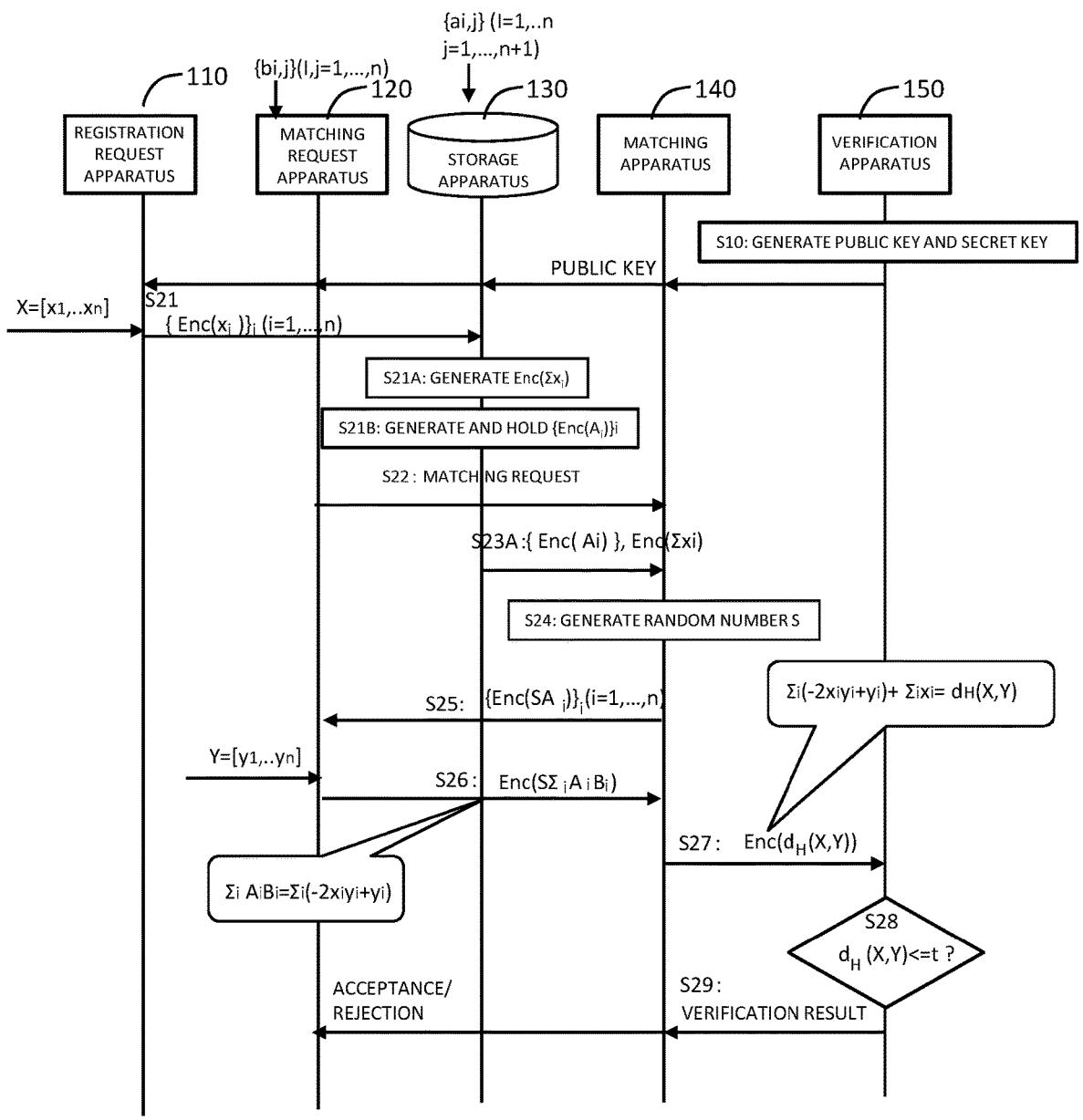
FIG. 15 is a diagram illustrating an operation sequence according to variation 1 of the second example embodiment of the present invention.

Alternatively, according to the mode of the present invention, with reference to FIG. 15, the registration request apparatus 110 transmits the encrypted data (Enc(pk, $x_i$)) (i=1, ..., n) of the individual elements $\{x_i\}$ of the registration target n-dimensional first binary vector $X=[x_1, \ldots, x_n]$ to the storage apparatus 130.

The storage apparatus 130 obtains the encrypted data (Enc(pk, $x_i$)) (i=1, ..., n) of individual elements $\{xi\}$ (i=1, ..., n) of the first binary vector $X=[x_1, \ldots, x_n]$ and obtains the encrypted data (Enc(pk, $\Sigma[i=1$ to n] xi)) of a sum of individual elements $\{x_i\}$ of the first binary vector $X=[x_1, \ldots, x_n]$. In addition, the storage apparatus 130 has means for calculating encrypted data Enc(pk, $A_i$) (i=1, ..., n) of n first transformed values $\{A_i\}$ (i=1, ..., n) by applying the first transformation function f1 to the first binary vector X with the individual elements $\{x_i\}$ (i=1, ..., n) of the first binary vector X in an encrypted state. The storage apparatus 130 holds the encrypted data (Enc(pk, $A_i$) (i=1, ..., n)) of the n first transformed values and the encrypted data (Enc(pk, $\Sigma[i=1$ to n]$x_i$)) of a sum of the elements of the first binary vector.

On reception of a matching request from the matching request apparatus 120, the matching apparatus 140 obtains the encrypted data of the n first transformed values from the storage apparatus 130 and generates a random number (S). The matching apparatus 140 obtains encrypted data (Enc(pk, $SA_i$) (i=1, ..., n)) by multiplying the random number S to the individual elements of the encrypted data of the n first transformed values through a scalar operation. Next, the matching apparatus 140 transmits the encrypted data (Enc (pk, $SA_i$) (i=1, ..., n)) to the matching request apparatus 120.

The matching request apparatus 120 obtains n second transformed values (transformed vector) $[B_1, \ldots, B_n]$ by applying the second transformation function f2 to a matching target n-dimensional second binary vector $Y=[y1, \ldots, yn]$. In addition, the matching request apparatus 120, by performing a scalar operation of the encrypted data (Enc(pk, $SA_i$)) (i=1, ..., n) in an encrypted state, which has been received from the matching apparatus 140, obtains encrypted data Enc(pk, $SA_i B_i$) (i=1, ..., n) which is a multiplication result of the second transformed values ($B_i$) to a result of multiplying the first transformed value ($A_i$) by the random number (S). The matching request apparatus 120 transmits a sum of these encrypted data (Enc(pk, $\Sigma[i=1$ to n]$SA_iB_i$)) to the matching apparatus 140, as a response.

The matching apparatus 140 multiplies a reciprocal of the random number S to the response (Enc(pk, $\Sigma[i=1$ to n] $SA_i B_i$)) through a scalar operation to remove the random number S from the response. Namely, the matching apparatus 140 obtains encrypted data (Enc(pk, $\Sigma[i=1$ to n]$A_i B_i$)) of a sum of values obtained by multiplying the n first transformed values (transformed vector) $[A_1, \ldots, A_n]$ by the second transformed values (transformed vector) $[B_1, \ldots, B_n]$ (encrypted data of the inner product of the vectors A and B). The matching apparatus 140 calculates addition of the encrypted data (Enc(pk, $\Sigma[i=1$ to n]$A_i B_i$)) of the inner product of the vectors A and B and the encrypted data (second template) (Enc(pk, $\Sigma[i=1$ to n]$x_i$)) registered in the storage apparatus 130 (homomorphic addition). The following equation holds.

$(\Sigma[i=1$ to $n]A_iB_i)+(\Sigma[i=1$ to $n]x_i)=(\Sigma[i=1$ to $n](1-2x_i)y_i)+(\Sigma[i=1$ to $n]xi)$ Namely, addition of the encrypted data (Enc(pk, $\Sigma[i=1$ to n]$A_i B_i$)) and the encrypted data (second template) (Enc(pk, $\Sigma[i=1$ to n]$x_i$)) is equal to the encrypted data of the Hamming distance $d_H$ (X, Y) between the binary vectors X and Y. The matching apparatus 140 transmits the encrypted data of the Hamming distance between the binary vectors X and Y to the verification apparatus 150. The verification apparatus 150 decrypts the encrypted data of the Hamming distance between the binary vectors X and Y by using a secret key sk.

The verification apparatus 150 determines whether the decrypted value (Hamming distance) is less than or equal to a threshold t. If the decrypted value is less than or equal to the threshold t, the verification apparatus 150 determines acceptance. If the decrypted value is over the threshold t, the verification apparatus 150 determines rejection.

<Second Mode: Variation 2>

Figure 16:
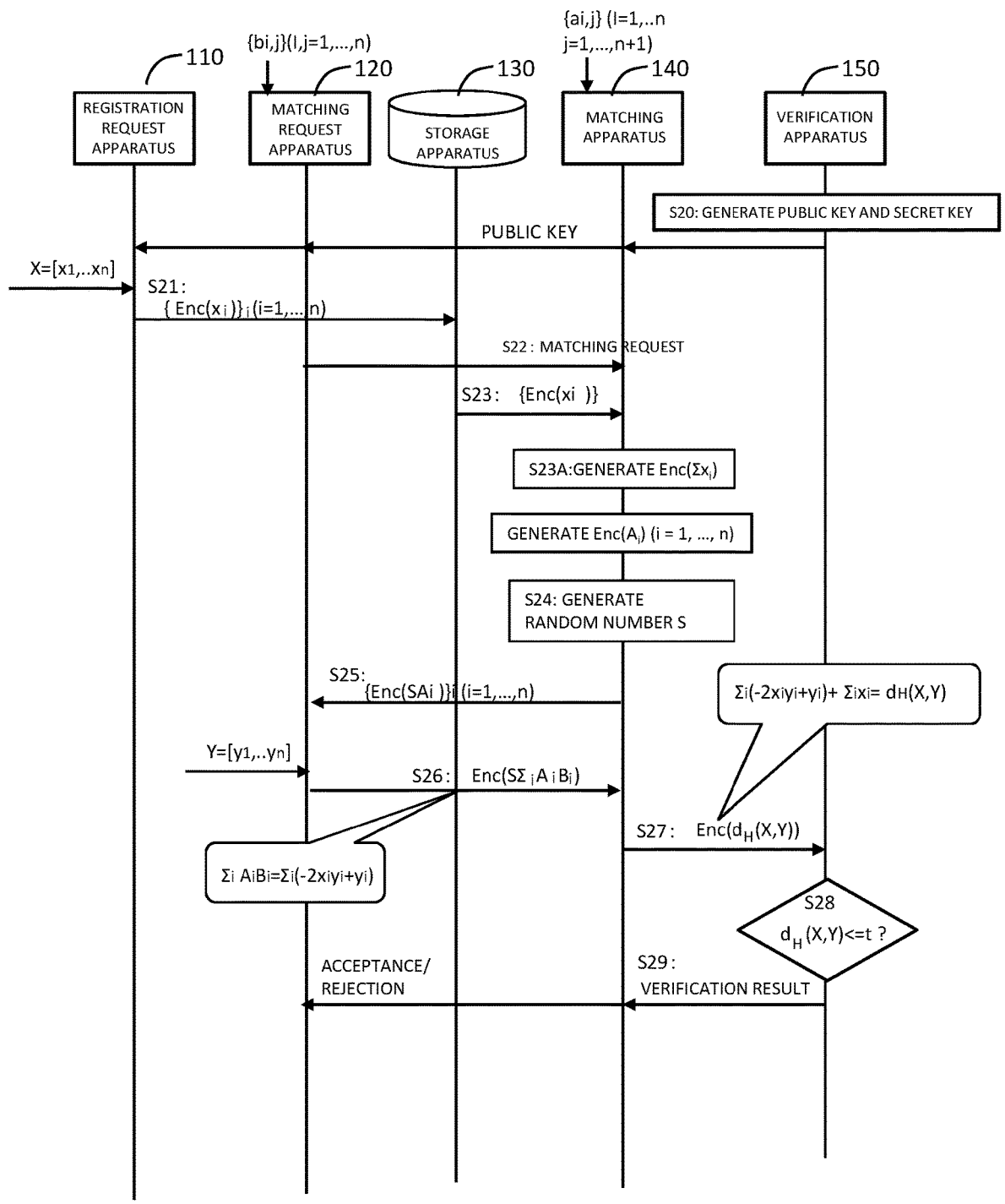
FIG. 16 is a diagram illustrating an operation sequence according to variation 2 of the second example embodiment of the present invention.

Alternatively, according to a further mode of the present invention, with reference to FIG. 16, the registration request apparatus 110 transmits encrypted data (Enc(pk, $x_i$)) (i=1, ..., n)) of individual elements $\{x_i\}$ of a registration target n-dimensional first binary vector $X=[x_1, ..., x_n]$ to the storage apparatus 130. The storage apparatus 130 holds the encrypted data of each element of the first binary vector.

On reception of a matching request from the matching request apparatus 120, the matching apparatus 140 gets the encrypted data (Enc(pk, $x_i$))(i=1, ..., n) of the individual elements $\{x_i\}$ of the first binary vector $X=[x_1, ..., x_n]$ from the storage apparatus 130 and obtains the encrypted data (Enc(pk, $\Sigma$[i=1 to n] $x_i$)) of a sum of the elements $\{x_i\}$ of the first binary vector X. It is noted that the storage apparatus 130 may be configured to obtain the encrypted data (Enc(pk, $\Sigma$[i=1 to n] xi)) of a sum of the individual elements $\{x_i\}$ of the first binary vector X.

The matching apparatus 140 includes means that obtains encrypted data Enc(pk, $A_i$) (i=1, ..., n) of the n first transformed values $\{A_i\}$ (i=1, ..., n) by applying the first transformation function f1 to the encrypted data (Enc(pk, $x_i$)) (i=1, ..., n) of individual elements $\{x_i\}$ of the first binary vector $X=[x_1, ..., x_n]$. In addition, the matching apparatus 140 generates a random number (S) and obtains the encrypted data Enc(pk, $SA_i$) (i=1, ..., n) by performing a scalar operation of the random number (S) to the individual elements of the encrypted data of the n first transformed values. Next, the matching apparatus 140 transmits the encrypted data Enc(pk, $SA_i$) (i=1, ..., n) to the matching request apparatus 120.

The matching request apparatus 120 calculates the n second transformed values (transformed vector) $[B_1, ..., B_n]$ by applying the second transformation function f2 to a matching target n-dimensional second binary vector $Y=[y_i, ..., y_n]$. The matching request apparatus 120 performs a scalar operation to the encrypted data Enc(pk, $SA_i$) (i=1, ..., n) in an encrypted state which is received from the matching apparatus 140 to obtain encrypted data Enc(pk, $SA_i B_i$) (i=1, ..., n) of a result of multiplication of the second transformed values ($B_i$) (i=1, ..., n) to the encrypted data Enc(pk, $SA_i$) (i=1, ..., n). Next, the matching request apparatus 120 transmits a sum (Enc(pk, $\Sigma$[i=1 to n] $SA_i B_i$)) of the encrypted data (Enc(pk, $SA_i B_i$)) (i=1, ..., n) to the matching apparatus 140 as a response. The subsequent processing of the matching apparatus 140 and the verification apparatus 150 is the same as that in the above second mode.

<Second Mode (First Mode): Variation 3>

Alternatively, according to a further mode of the present invention, with reference to FIG. 19, the registration request apparatus 110 transmits the encrypted data (Enc(pk, xi)) (i=1, ..., n) of the individual elements $\{xi\}$ of the registration target n-dimensional first binary vector $X=[x_1, ..., x_n]$ to the storage apparatus 130. The storage apparatus 130 holds the encrypted data of each element of the first binary vector.

On reception of a matching request from the matching request apparatus 120, the matching apparatus 140 gets the encrypted data (Enc(pk, $x_i$)) (i=1, ..., n) of the individual elements of the n-dimensional first binary vector from the storage apparatus 130 and obtains the encrypted data (Enc(pk, $\Sigma$[i=1 to n] xi)) of a sum of individual elements $\{x_i\}$ of the first binary vector X. It is noted that the storage apparatus 130 may be configured to calculate the encrypted data (Enc(pk, $\Sigma$[i=1 to n] $x_i$)) of a sum of the individual elements $\{x_i\}$ of the first binary vector $X=[x_1, ..., x_n]$. The matching apparatus 140 generates a first group of transformation coefficients $\{a_{i,j}\}$ (i=1, ..., n, j=1, ..., n+1) of the first transformation function f1. The matching apparatus 140 obtains the encrypted data Enc(pk, $A_i$) (i=1, ..., n) of the n first transformed values $\{A_i\}$ (i=1, ..., n) based on the first group of n(n+1) transformation coefficients $\{a_{i,j}\}$ (i=1, ..., n, j=1, ..., n+1) and the encrypted data of the individual elements $\{x_i\}$ of the first binary vector $X=[x_1, ..., x_n]$. In addition, the matching apparatus 140 generates a random number (S) and performs a scalar operation of the random number (S) to individual elements of the encrypted data Enc(pk, $A_i$) (i=1, ..., n) of the n first transformed values $\{A_i\}$ (i=1, ..., n) to obtain encrypted data Enc(pk, $SA_i$) (i=1, ..., n). Next, the matching apparatus 140 transmits the encrypted data Enc(pk, $SA_i$) (i=1, ..., n) to the matching request apparatus 120. In addition, the matching apparatus 140 transmits a second group of n×n transformation coefficients $\{b_{i,j}\}$(i, j=1, ..., n) used to generate the first group of n(n+1)transformation coefficients $\{a_{i,j}\}$ (i=1, ..., n, j=1, ..., n+1) to the matching request apparatus 120.

The matching request apparatus 120 calculates the n second transformed values ($B_1, ..., B_n$), which are a result of an operation in which the second transformation function f2 including the second group of n×n transformation coefficients $\{b_{i,j}\}$ (i, j=1, ..., n) transmitted from the matching apparatus 140 is applied to a matching target n-dimensional second binary vector $Y=[y_1, ..., y_n]$. The matching request apparatus 120 performs a scalar operation to the encrypted data Enc(pk, $SA_i$) (i=1, ..., n) in an encrypted state which is received from the matching apparatus 140 to obtain encrypted data (Enc(pk, $SA_i B_i$)) (i=1, ..., n) of a result of multiplication of the second transformed values ($B_i$) (i=1, ..., n) to the encrypted data Enc(pk, $SA_i$) (i=1, ..., n). Next, the matching request apparatus 120 transmits a sum (Enc(pk, $\Sigma$[i=1 to n] $SA_i B_i$)) of these encrypted data (Enc(pk, $SA_i B_i$)) (i=1, ..., n) to the matching apparatus 140 as a response. The subsequent processing of the matching apparatus 140 and the verification apparatus 150 is the same as that in the above second mode.

<Third Mode>

According to a third mode of the present invention, with reference to FIG. 22, the registration request apparatus 110 transmits first encrypted data (Enc(pk, ($2x_i-1$))) (i=1, ..., n) obtained by encrypting first calculated values ($2x_i-1$) for individual elements $\{x_i\}$(i=1, ..., n) of the registration target n-dimensional first binary vector $X=[x_1, ..., x_{11}]$ by additive homomorphic encryption using a public key (pk) to a storage apparatus 130. The storage apparatus 130 holds the first encrypted data (Enc(pk, ($2x_i-1$))) (i=1, ..., n).

On reception of a matching request from a matching request apparatus 120, the matching apparatus 140 generates first to third random numbers ($b_i$, $a_i$, and $r_i$) (i=1, ..., n). The matching request apparatus 120 transmits encrypted data of the first random number $\{b_i\}$(i=1, ..., n) to the matching request apparatus 120. The matching request apparatus 120 performs a scalar operation of individual elements $\{y_i\}$ of a matching target binary vector $Y=[y_i, ..., y_n]$ to the encrypted data (Enc(pk, $b_i$)) (i=1, ..., n) of the first random number $\{b_i\}$, to obtain second encrypted data (Enc(pk, $b_i(2y_i-1)$)) (i=1, ..., n). Next, the matching request apparatus 120 transmits the second encrypted data (Enc(pk, $b_i$ ($2y_i-1$))) (i=1, . . . , n) to the matching apparatus 140.

Based on the second encrypted data (Enc(pk, $b_i$ ($2y_i-1$))) (i=1, . . . , n) from the matching request apparatus 120, the first encrypted data (Enc(pk, ($2x_i-1$))) (i=1, . . . , n) from the storage apparatus 130, and the first to third random numbers ($b_i$, $a_i$, and $r_i$) (i=1, . . . , n), the matching apparatus 140 obtains third encrypted data (Enc(pk, $a_i$ ($2x_i-1$))) (i=1, . . . , n) of values obtained by multiplying the second random number $\{a_i\}$ to the first encrypted data (Enc(pk, ($2x_i-1$))) through a scalar operation, and fourth encrypted data (Enc(pk, $b_i$ $r_i$ ($2y_i-1$))) (i=1, . . . , n) of values obtained by multiplying the third random number ($r_i$) to the second encrypted data (Enc(pk, $b_i$ ($2y_i-1$))) through a scalar operation. In addition, the matching apparatus 140 generates hash values (H($a_i$ $b_i$ $r_i$)) (i=1, . . . , n) of products of the first to third random numbers ($b_i$, $a_i$, and $r_i$). The matching apparatus 140 transmits the third encrypted data (Enc(pk, $a_i$ ($2x_i-1$))) (i=1, . . . , n), the fourth encrypted data (Enc(pk, $b_i$ $r_i$ ($2y_i-1$))) (i=1, . . . , n), and the hash values (H($a_i$ $b_i$ $r_i$)) (i=1, . . . , n) to the verification apparatus 150. In this transmission of the third and fourth encrypted data (Enc(pk, $a_i$ ($2x_i-1$)) and Enc(pk, $b_i$ $r_i$ ($2y_i-1$))) and the hash values (H($a_i$ $b_i$ $r_i$)) (i=1, . . . , n), the matching apparatus 140 may shuffle the sequence on the index i.

The verification apparatus 150 obtains a first decryption result ($z_a$) and a second decryption results ($z_b$) by decrypting the third encrypted data (Enc(pk, $a_i$ ($2x_i-1$))) and the fourth encrypted data (Enc(pk, $b_i$ $r_i$ ($2y_i-1$))) by using a secret key (sk). The verification apparatus 150 calculates hash values (H($z_a z_b$)) of the product of the first and second decryption results. Next, the verification apparatus 150 determines whether a count number of mismatched elements between the hash values H(($z_a$ $z_b$)) and the hash values (H($a_i$ $b_i$ $r_i$)) received from the matching apparatus 140 is less than or equal to a predetermined value. If the number of mismatched elements is less than or equal to the predetermined value, the verification apparatus 150 determines acceptance. Otherwise, the verification apparatus 150 determines rejection.

<Third Mode; Variation 1>

Figure 23:
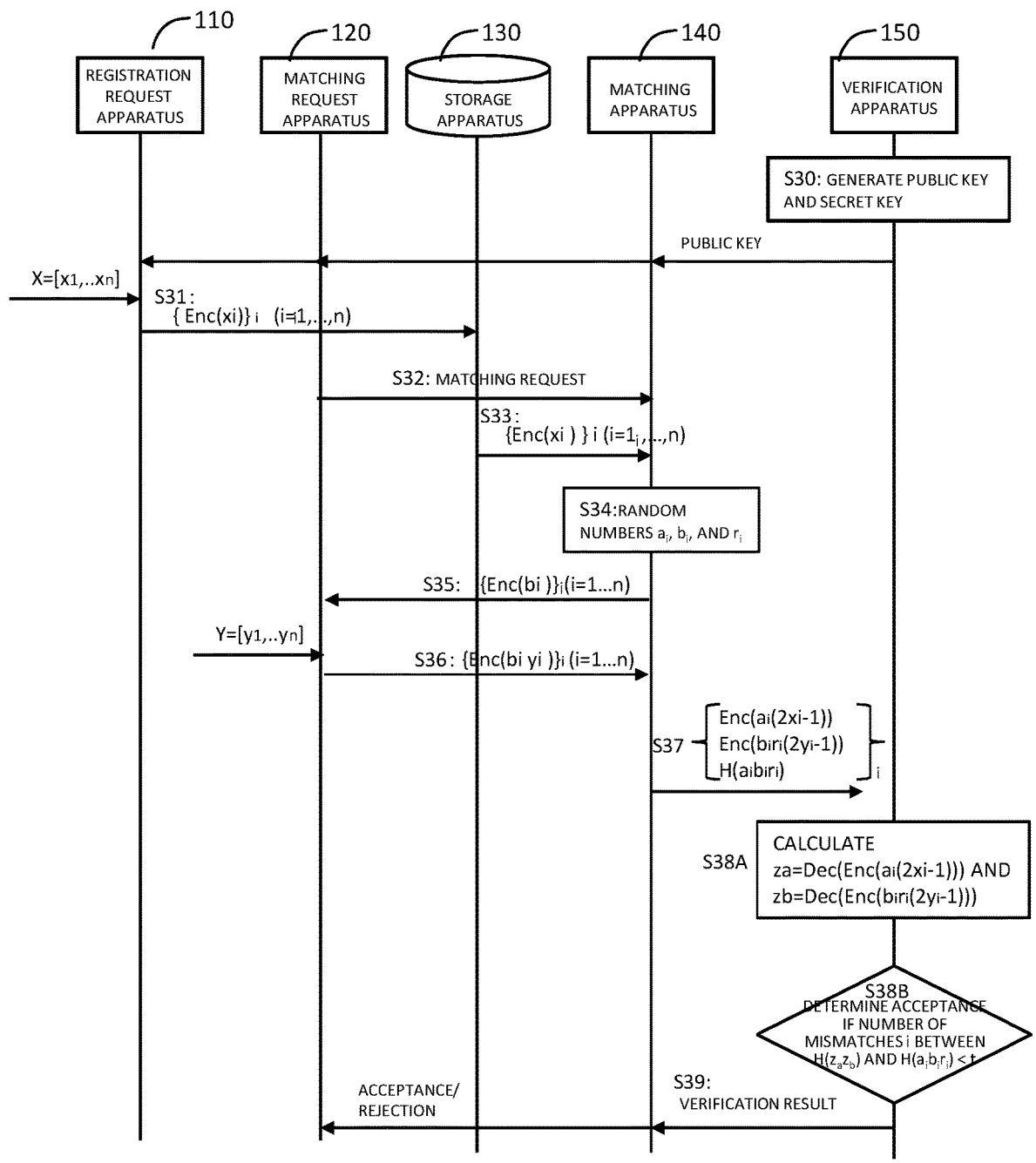
FIG. 23 is a diagram illustrating an operation sequence according to variation 1 of the third example embodiment of the present invention.

According to a variation of a third mode, with reference to FIG. 23, the registration request apparatus 110 transmits first encrypted data (Enc(pk, $x_i$)) (i=1, . . . , n) obtained by encrypting individual elements $\{x_i\}$ (i=1, . . . , n) of the registration target n-dimensional first binary vector $X=[x_1, \ldots, x_n]$ by using a public key (pk) to the storage apparatus 130. The storage apparatus 130 holds the first encrypted data (Enc(pk, $x_i$)) (i=1, . . . , n).

On reception of a matching request from the matching request apparatus 120, the matching apparatus 140 generates the first to third random numbers ($b_i$, $a_i$, and $r_i$) (i=1, . . . , n). In addition, the matching apparatus 140 receives the encrypted data (Enc(pk, $x_i$)) (i=1, . . . , n) from the storage apparatus 130 and generates first encrypted data (Enc(pk, ($2x_i-1$))) (i=1, . . . , n) through a scalar operation and an additive homomorphic operation with the encrypted data (Enc(pk, $x_i$)) (i=1, . . . , n) being kept in an encrypted state. The matching apparatus 140 transmits encrypted data (Enc(pk, $b_i$)) (i=1, . . . , n) of the first random number $\{b_i\}$ (i=1, . . . , n) to the matching request apparatus 120. The matching request apparatus 120 obtains second encrypted data (Enc(pk, $b_i$($2y_i-1$))) (i=1, . . . , n) by performing a scalar operation of an operation result ($2y_i-1$) (i=1, . . . , n) of each of elements $\{y_i\}$ of a matching target binary vector $Y=[y_i, \ldots, y_n]$ to the encrypted data (Enc(pk, $b_i$)) (i=1, . . . , n) of the first random number. Next, the matching request apparatus 120 transmits the second encrypted data (Enc(pk, $b_i$($2y_i-1$))) (i=1, . . . , n) to the matching apparatus 140. The subsequent processing of the matching apparatus 140 and the verification apparatus 150 is the same as that in the above third mode. Alternatively, the storage apparatus 130 may receive the encrypted data (Enc(pk, $x_i$)) (i=1, . . . , n) from the registration request apparatus 110, generate the first encrypted data (Enc(pk, ($2x_i-1$))) (i=1, . . . , n) through a scalar operation and an additive homomorphic operation with the encrypted data (Enc(pk, $x_i$)) (i=1, . . . , n) being kept in an encrypted state, and hold the resultant data as registered data.

<Third Mode: Variation 2>

Figure 25:
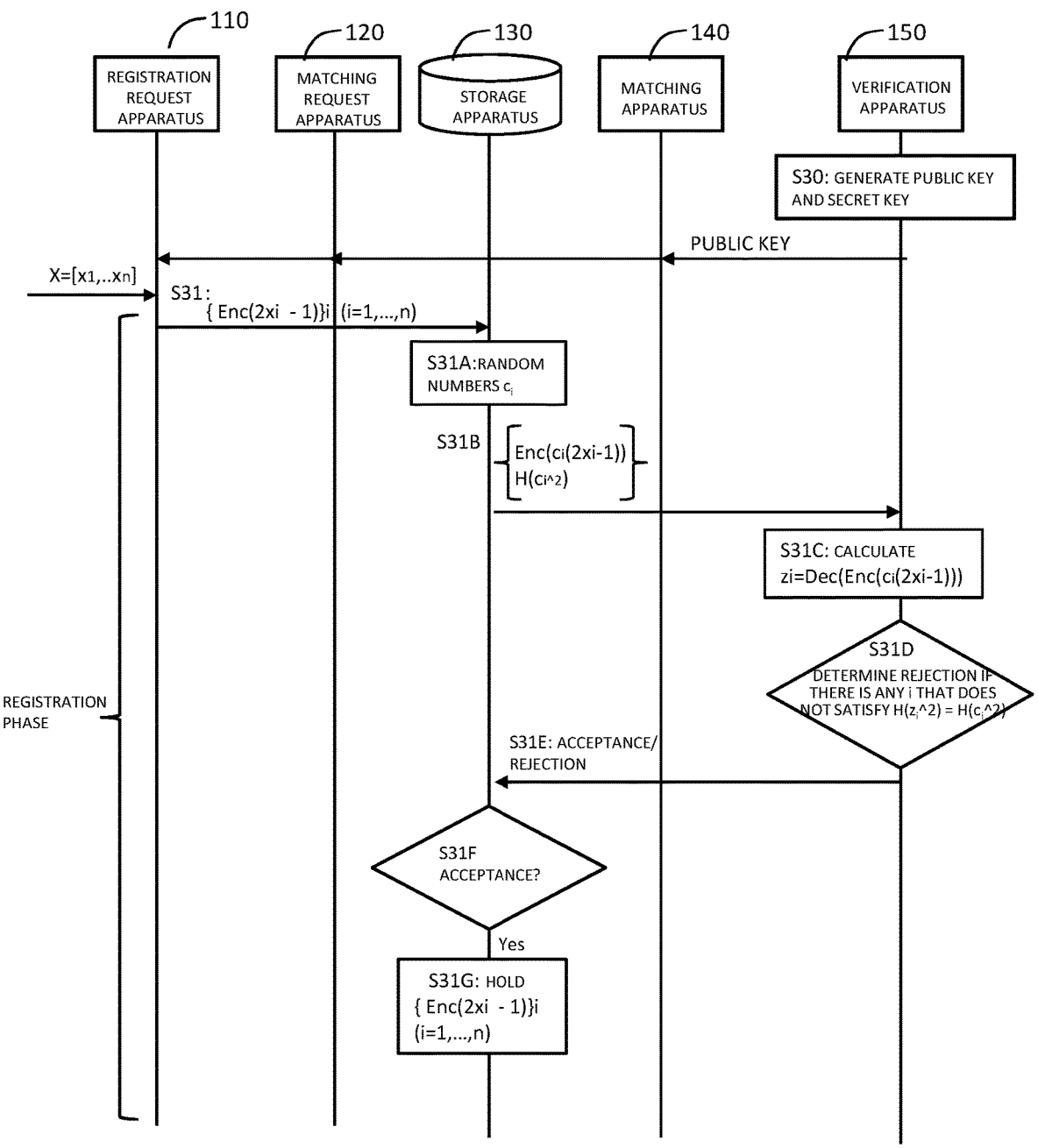
FIG. 25 is a diagram illustrating an operation sequence of a registration phase according to variation 2 of the third example embodiment of the present invention.

In variation 2 of the third mode of the present invention, with reference to FIG. 25, the registration request apparatus 110 transmits first encrypted data (Enc(pk, ($2x_i-1$))) (i=1, . . . , n) obtained by encrypting first calculated values ($2x_i-1$) about individual elements $\{x_i\}$ (i=1, . . . , n) of the n-dimensional first binary vector $X=[x_1, \ldots, x_n]$ with additive homomorphic encryption by using a public key (pk) to the storage apparatus 130.

The storage apparatus 130 includes means that generates random numbers ($c_i$) (i=1, . . . , n) ($c_i \in F_q$) for the respective encrypted data (Enc(pk, ($2x_i-1$))) (i=1, . . . , n) of the first calculated values of the individual elements $\{x_i\}$ (i=1, . . . , n) of the first binary vector $X=[x_i, \ldots, x_n]$ and generates encrypted data (Enc(pk, $c_i$ ($2x_i-1$))) (i=1, . . . , n) obtained by performing a scalar operation of each random number $c_i$ (i=1, . . . , n) to the encrypted data (Enc(pk, ($2x_i-1$))) (i=1, . . . , n). In addition, the storage apparatus 130 includes means that generates hash values (H($c_i\hat{\;}2$)) of the squares ($c_i\hat{\;}2$) of the respective random number $c_i$. The storage apparatus 130 transmits the encrypted data (Enc(pk, $c_i$ ($2x_i-1$))) (i=1, . . . , n) obtained by multiplying each random number $c_i$ (i=1, . . . , n) to the encrypted data (Enc(pk, ($2x_i-1$))) (i=1, . . . , n) through a scalor operation and the hash values (H($c_i\hat{\;}2$)) (i=1, . . . , n) to the verification apparatus 150.

The verification apparatus 150 decrypts the encrypted data (Enc(pk, $c_i$ ($2x_i-1$))) (i=1, . . . , n) transmitted from the storage apparatus 130 by using a secret key (sk) and obtains hash values (H($z_i\hat{\;}2$)) of the individual decrypted values ($z_i$). The verification apparatus 150 determines whether the hash values (H($z_i\hat{\;}2$) of the individual decrypted values ($z_i$) match the respective hash values (H($c_i\hat{\;}2$)) transmitted from the storage apparatus 130. For example, if there is any mismatched hash value, the verification apparatus 150 determines rejection. Only when all the hash values match their respective hash values, the verification apparatus 150 determines acceptance. If the verification result from the verification apparatus 150 indicates acceptance, the storage apparatus 130 holds the encrypted data of the first calculated values.

<Fourth Mode>

In a fourth mode of the present invention, with reference to FIG. 26, the registration request apparatus 110 transmits first encrypted data (Enc(pk, ($2x_i-1$))) (i=1, . . . , n) obtained by encrypting first calculated values ($2x_i-1$) about individual elements $\{x_i\}$ of the registration target first binary vector $X=[x_1, \ldots, x_n]$ by using additive homomorphic encryption using a public key (pk) to the storage apparatus 130. The storage apparatus 130 holds the first encrypted data (Enc(pk, ($2x_i-1$))) (i=1, . . . , n).

On reception of a matching request from the matching request apparatus 120, the matching apparatus 140 generates first and second random numbers ($b_i$ and $a_i$) (i=1, . . . , n).

The matching apparatus 140 transmits encrypted data (Enc (pk, $b_i$)) (i=1, ..., n) obtained by encrypting the first random number $\{b_i\}$ (i=1, ..., n) by using the public key (pk) to the matching request apparatus 120.

The matching request apparatus 120 obtains encrypted data (Enc(pk, ($2y_i-1$))) (i=1, ..., n) by encrypting calculated values ($2y_i-1$) (i=1, ..., n) about individual elements $\{y_i\}$ of a matching target binary vector Y=[$y_i$, ..., $y_n$] by using the public key (pk). In addition, the matching request apparatus 120 calculates second encrypted data (Enc(pk, $b_i(2y_i-1)$)) (i=1, ..., n) by multiplying the encrypted data Enc(pk, $b_i$) (i=1, ..., n) of the first random number $\{b_i\}$ in an encrypted state to the encrypted data (Enc(pk, ($2y_i-1$))) (i=1, ..., n). Next, the matching request apparatus 120 transmits the second encrypted data (Enc(pk, $b_i$ ($2y_i-1$))) (i=1, ..., n) to the matching apparatus 140.

The matching apparatus 140 multiplies the generated second random numbers $\{a_i\}$ (i=1, ..., n) and the first encrypted data (Enc(pk, ($2x_i-1$))) (i=1, ..., n) transmitted from storage apparatus 130, to obtain encrypted data (Enc (pk, $a_i(2x_i-1)$)) (i=1, ..., n). The matching apparatus 140 multiplies the encrypted data (Enc(pk, $a_i(2x_i-1)$)) (i=1, ..., n) and the second encrypted data (Enc(pk, $b_i$ ($2y_i-1$))) (i=1, ..., n) transmitted from the matching request apparatus 120, for example, in an encrypted state (a multiplicative homomorphic operation), to obtain encrypted data (Enc(pk, $aib_i$ ($2x_i-1$)($2y_i-1$))). In addition, the matching apparatus 140 generates hash values (H($a_i b_i$)) of products ($a_i b_i$) (i=1, ..., n) of the first and second random numbers. Next, the matching apparatus 140 transmits the calculated encrypted data (Enc(pk, $aib_i$ ($2x_i-1$)($2y_i-1$))) and the hash values (H($a_i b_i$)) to the verification apparatus 150. In this transmission of the encrypted data (Enc(pk, $aib_i$ ($2x_i-1$) ($2y_i-1$))) and the hash values (H($a_i b_i$)) (i=1, ..., n), the matching apparatus 140 may shuffle the sequence relating to the index i.

The verification apparatus 150 decrypts the encrypted data (Enc(pk, $aib_i$ ($2x_i-1$)($2y_i-1$))) (i=1, ..., n) by using a secret key (sk) to obtain decryption results ($z_i$) (i=1, ..., n). The verification apparatus 150 calculates hash values (H($z_i$)) of the decrypted values ($z_i$) (i=1, ..., n). The verification apparatus 150 determines whether a count number of mismatched elements between the hash values (H($z_i$)) (i=1, ..., n) and the hash values (H($a_i b_i$)) (i=1, ..., n) received from the matching apparatus 140 is less than or equal to a predetermined value.

For example, if the number of mismatched elements is less than or equal to the predetermined value, the verification apparatus 150 determines acceptance. Otherwise, the verification apparatus 150 determines rejection.

<Fourth Mode: Variation>

Figure 27:
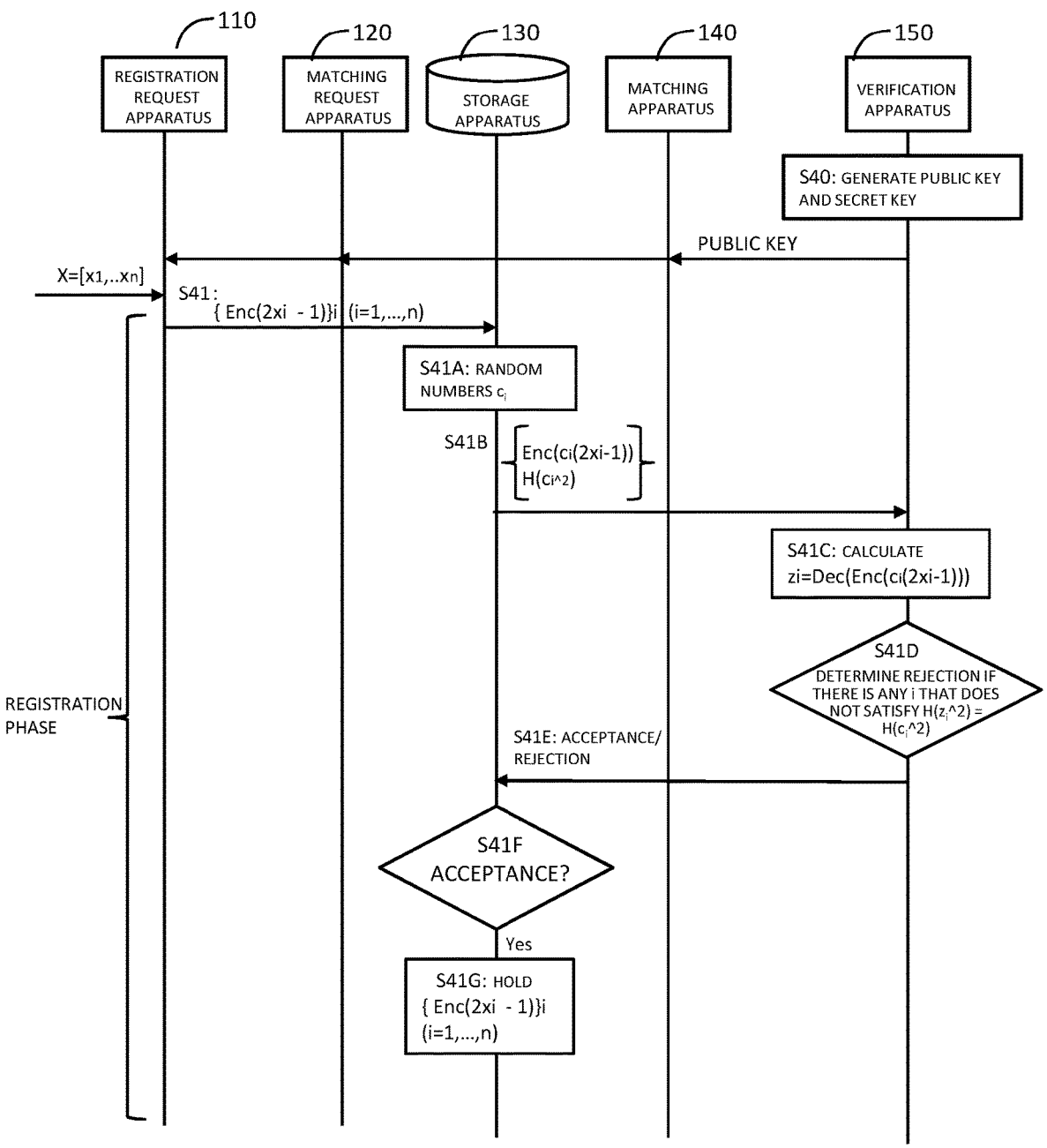
FIG. 27 is a diagram illustrating an operation sequence of a registration phase according to variation 1 of the fourth example embodiment of the present invention.

In a variation of the fourth mode of the present invention, with reference to FIG. 27, the registration request apparatus 110 transmits the first encrypted data (Enc(pk, ($2x_i-1$))) (i=1, ..., n) obtained by encrypting the first calculated values ($2x_i-1$) about the individual elements $\{x_i\}$ of the first binary vector X=[$x_1$, ..., $x_n$] by using an multiplicative homomorphic encryption scheme using a public key (pk) to the storage apparatus 130.

The storage apparatus 130 includes means that generates random numbers ($c_i$) (i=1, ..., n) ($ci \in F_q$) for the respective encrypted data (Enc(pk, ($2x_i-1$))) (i=1, ..., n) of the first calculated values of the individual elements x of the first binary vector X=[$x_1$, ..., $x_n$] and generates the encrypted data (Enc(pk, $c_i$ ($2x_i-1$))) (i=1, ..., n) by multiplying the encrypted data Enc(pk, $c_i$) of the random numbers ($c_i$) to the encrypted data (Enc(pk, ($2x_i-1$))) (i=1, ..., n). In addition, the storage apparatus 130 includes means that generates hash values H($c_i$^2) of the squares of the respective random numbers ($c_i$). The storage apparatus 130 transmits the encrypted data (Enc(pk, $c_i$ ($2x_i-1$))) (i=1, ..., n) and the hash values (H($c_i$^2))(i=1, ..., n) to the verification apparatus 150.

The verification apparatus 150 decrypts the encrypted data (Enc(pk, $c_i$ ($2x_i-1$))) (i=1, ..., n) transmitted from the storage apparatus 130 by using a secret key (sk). Next, the verification apparatus 150 calculates hash values (H($z_i$^2)) (i=1, ..., n) of the decrypted values ($z_i$) of the encrypted data (Enc(pk, $c_i$ ($2x_i-1$))) (i=1, ..., n). The verification apparatus 150 determines whether the hash values (H($z_i$^2)) (i=1, ..., n) match the respective hash values (H($c_i$^2)) (i=1, ..., n) transmitted from the storage apparatus 130. For example, if there is any mismatched hash value, the verification apparatus 150 determines rejection. Only when all the hash values match their respective hash values, the verification apparatus 150 determines acceptance. If the verification result outputted from the verification apparatus 150 indicates acceptance, the storage apparatus 130 holds the encrypted data (Enc(pk, ($2x_i-1$))) (i=1, ..., n) of the first calculated values.

A comparative example will hereinafter be described before description of example embodiments of the present invention.

First, an operation of an individual algorithm of Modified-Elgamal encryption will be described. First, the key generation algorithm receives a security parameter 1^κ as input data.

Next, a group G whose order is a x-bit prime q and its generator g are generated. Next, $x \in F_q$={0, 1, ..., q-1} is randomly selected, and h=g^κ is set (^ denotes an exponentiation operator).

Finally, a public key pk=(g, h=g^κ) and a secret key sk=x are outputted.

First, the encryption algorithm receives the public key pk and a message m as input data.

Next, a random number r is randomly selected r∈$F_q$.

Next, C[0]=g^r and C[1]=h^r·g^m are calculated.

Finally, a ciphertext C=(C[0], C[1]) is outputted.

First, the decryption algorithm receives the secret key sk=x and the ciphertext C=(C[0], C[1]) as input data.

Next, as a decryption result, M=C[1]/(C[0]^κ) is outputted.

For a ciphertext of a certain message m,

Enc(*pk,m*)=(*C*[0],*C*[1])=(*g*^*r*,*h*^*r*·*g*^*m*), the following relationship holds.

Dec(*sk*,(*c*[0],*c*[1]))=*c*[1]/(*c*[0]^*x*)=*g*^*m*

The decryption algorithm may output g^m, instead of the message m. Use of the Modified-Elgamal encryption enables calculation of ciphertexts in an encrypted state corresponding to addition of plaintexts or enables calculation of a ciphertext in an encrypted state corresponding to multiplication of a plaintext by a constant.

In the case of addition, when a public key pk=(g, h=g^κ), and ciphertexts of two messages m and m' are given as,

*C*=Enc(*pk,m*)=(*C*[0],*C*[1])=(*g*^*r*,*h*^*r*·*g*^*m*), and

*C'*=Enc(*pk,m'*)=(*C*[0],*C*[1])=(*g*^*r'*,*h*^*r'*·*g*^*m'*), the following holds.

(*C*[0]·*C*[0],*C*[1]·*C*[1])=(*g*^{*r*+*r'*},*h*^{*r*+*r'*}·*g*^{*m*+*m'*})=Enc(*pk,m*+*m'*)

In the case of multiplication by constant, when the public key pk=(g, h=g^κ), an arbitrary constant=z, and a ciphertext c=Enc(pk, m)=(c[0], c[1])=(g^r, h^r·g^m), the following holds (c[0]^z,c[1]^z)=(g^{zr},h^{zr}·g^{zm})=Enc(pk,zm)

That is, for Enc(pk, x)=C, Enc(pk, x')=C', and an integer z, if addition and scalor operation are defined as Add(C,C')=(C[0]·C'[0],C[1]·C'[1]) and Scl(z,C)=(C[0]^z,C[1]^z), the following holds.

Add(C,C')=Enc(pk,x+x' mod q), and

Scl(z,C)=Enc(pk,zx mod q)

where "x+x' mod q" and "zx mod q" are results obtained by calculating x+x' and zx on a field $F_q$.

Comparative Example

The following comparative example is based on the disclosure of NPL 1.

The registration target data is expressed as an n-dimensional vector X=[$x_1$, . . . , $x_n$]∈{0, 1, . . . , 1}$^n$
where n denotes a predetermined value (a natural number) and $x_i$ (i=1, . . . , n) is any value (for example, an integer) from 0 to 1.

The target data to be matched (authenticated) is given as Y=[$y_1$, . . . , $y_n$]∈{0, 1, . . . , 1}$^n$
where {$y_i$} (i=1, . . . , n) is any value (for example, an integer) from 0 to 1.

Figure 2:
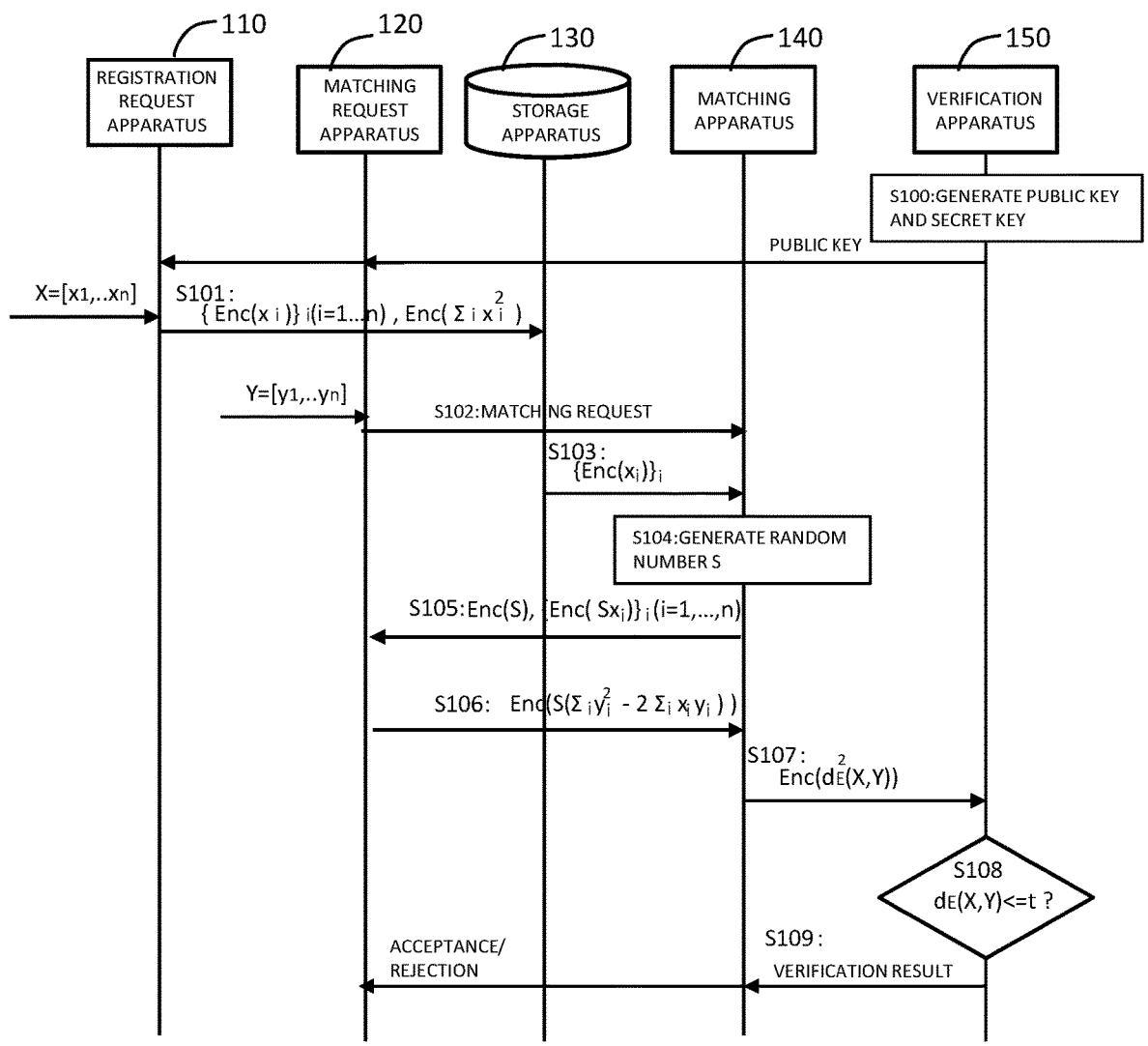
FIG. 2 is a diagram illustrating a comparative example.

The processing in the matching system is basically divided into
- a preparation phase,
- a registration phase, and
- a matching phase. As illustrated in FIG. 2, as the preparation, for example, a verification apparatus 150 generates a public key pk and a secret key sk by using a security parameter 1^κ and disseminates the public key pk (S100).

The following distance: $d_E^2$ (X, Y) between the registered data (an n-dimensional vector) and the matching target data (an n-dimensional vector) is divided as follows.

$$d_E^2(X, Y) = \sum_{i=1}^{n}(x_i - y_i)^2 = \sum_{i=1}^{n} x_i^2 - 2\sum_{i=1}^{n} x_i y_i + \sum_{i=1}^{n} y_i^2 = D_1 + D_2 \quad (1)$$

$$D_1 = \sum_{i=1}^{n} X_i^2 \quad (2)$$

$$D_2 = -2\sum_{i=1}^{n} x_i y_i + \sum_{i=1}^{n} y_i^2 \quad (3)$$

Regarding the registered data X=[x1, . . . , xn], a registration request apparatus 110 transmits the following data as a template to a storage apparatus 130:
the encrypted data
Enc(pk, xi) (i=1, . . . , n) of the n elements $x_i$ (i=1, . . . , n); and the encrypted data $$Enc\left(pk, \sum_{i=1}^{n} x_i^2\right)$$

of a sum $$\sum_{i=1}^{n} x_i^2$$

of the squares of the n elements $x_i$ (S101).
The storage apparatus 130 stores
Enc(pk, xi) (i=1, . . . , n), and $$Enc\left(pk, \sum_{i=1}^{n} x_i^2\right)$$

in association with a registration identifier Id (Identity), etc.

The matching request apparatus 120, when the matching target data Y=[$y_1$, . . . , $y_n$] is to be matched, transmits a matching request to a matching apparatus 140 (S102).

The matching apparatus 140 obtains the registered template Enc(pk, $x_1$), . . . , Enc(pk, $x_n$), and $$Enc\left(pk, \sum_{i=1}^{n} x_i^2\right)$$

from the storage apparatus 130 based on a user ID (S103).
The matching apparatus 140 generates a random number S (S104), creates encrypted data Enc(pk,S$x_1$), . . . ,Enc(pk,S$x_n$)

by multiplying the random number S to the registered template Enc(pk, $x_i$) (i=1, . . . , n) though a scalar operation, and transmits the created encrypted data to the matching request apparatus 120 (S105).

Preferably, each time, the matching apparatus 140 selects a different number as the random number S∈$F_q$={0,1, . . . ,q−1}.

The matching apparatus 140 does not transmit the encrypted data $$Enc\left(pk, \sum_{i=1}^{n} x_i^2\right)$$

(a second template) of $$\sum_{i=1}^{n} x_i^2$$

to the matching request apparatus 120.
From the matching target data Y=[y1, . . . , yn], the matching request apparatus 120 calculates $$\sum_{i=1}^{n} y_i^2.$$

Next, the matching request apparatus 120, by performing a scalar operation to the received Enc(pk, S), $$Scl\left(\sum_{i=1}^{n} y_i^2, Enc(pk, S)\right) \quad (4)$$

generates $$Enc\left(pk, S\sum_{i=1}^{n} y_i^2\right) \quad (5)$$

More specifically, it is assumed that the encrypted data of the random number S that the matching request apparatus 120 has received is given as $$Enc(pk,S)=C=(g\hat{\ }r, g\hat{\ }S \cdot h\hat{\ }r)=(C[0],C[1]) \quad (6)$$

For Enc(pk, S)=C=(C[0], C[1]), the matching request apparatus 120 calculates the following.

$$\left(C[0]\hat{\ }\left(\sum_{i=1}^{n} y_i^2\right), C[1]\hat{\ }\left(\sum_{i=1}^{n} y_i^2\right)\right) \quad (7)$$

This is equivalent to $$Enc\left(pk, S\sum_{i=1}^{n} y_i^2\right)$$

in Expression (5).

In addition, the matching request apparatus 120 multiplies, through a scalor operation, each of elements {$y_i$} of the matching target vector to n {Enc(pk, Sxi)}i (i=1, ..., n) received from the matching apparatus 140:

$$Scl((-2y_i),Enc(pk,Sx_i))(i=1, \ldots ,n)$$

and obtains the following n encrypted data.

$$Enc(pk,(-2y_i)Sxi)=Enc(pk,-2Sx_iy_i)(i=1, \ldots ,n) \quad (8)$$

The matching request apparatus 120 performs an additive operation of the homomorphic encryption to obtain $$Enc\left(pk, -2S\sum_{i=1}^{n} x_i y_i\right) \quad (9)$$

Next, the matching request apparatus 120 performs a homomorphic addition of the above and $$Enc\left(pk, S\sum_{i=1}^{n} y_i^2\right) \quad (10)$$

to obtain $$Enc\left(pk, S\left(\sum_{i=1}^{n} y_i^2 - 2\sum_{i=1}^{n} x_i y_i\right)\right) = Enc(pk, SD_2) \quad (11)$$

and transmit the obtained encrypted data to the matching apparatus 140 (S106).

The matching apparatus 140 performs a scalar operation of a reciprocal of S ($S\hat{\ }(-1)=S\hat{\ }(q-2)$ mod q) to the received encrypted data Enc(pk, $SD_2$)

$$Scl(S\hat{\ }(-1),Enc(pk,SD_2)) \quad (12)$$

Based on the following relationship, $$Scl(S\hat{\ }(-1),Enc(pk,SD_2))=Enc(pk,S\hat{\ }(-1)SD_2)=Enc(pk, D_2) \quad (13)$$

the matching apparatus 140 calculates $$Enc\left(pk, \sum_{i=1}^{n} y_i^2 - 2\sum_{i=1}^{n} x_i y_i\right) \quad (= Enc(pk, D_2)) \quad (14)$$

From the registered templates $$Enc\left(pk, \sum_{i=1}^{n} x_i^2\right) \text{ and } Enc\left(pk, \sum_{i=1}^{n} y_i^2 - 2\sum_{i=1}^{n} x_i y_i\right),$$

the matching apparatus 140 performs an additive homomorphic operation to obtain the encrypted data of the distance $d_E^2$ (X, Y) as follows.

$$Enc(pk, d_E^2(x, y)) = Enc\left(pk, \sum_{i=1}^{n} x_i^2\right) + Enc\left(pk, -2\sum_{i=1}^{n} x_i y_i + \sum_{i=1}^{n} y_i^2\right) \quad (15)$$

The matching apparatus 140 transmits the encrypted data Enc(pk, $d_E^2$(X, Y)) to the verification apparatus 150 (S107).

The verification apparatus 150 decrypts the encrypted data Enc(pk, $d_E^2$ (X, Y)) of the distance by using the secret key sk to obtain $$Dec(sk,Enc(pk,d_E^2(X,Y)))=d_E^2(X,Y).$$

Next, the verification apparatus 150 determines whether the distance $d_E^2$(X, Y) is less than or equal to a predetermined threshold=t (S108). In the Modified-Elgamal encryption, the decryption result is $g\hat{\ }(d_E^2(X, Y))$, and whether this matches any one of $g\hat{\ }0, g\hat{\ }1, \ldots,$ and $g\hat{\ }t$ is determined.

The verification apparatus 150 may transmit the verification result (acceptance/rejection) to the matching apparatus 140 (S109).

Problems with Comparison Example

The Hamming distance between binary vectors can be calculated by the same method used to calculate a Euclidean distance between multivalued vectors. Thus, a system in which the above multivalued-vector-type biometric information is matched by using the Euclidean distance $d_E^2$ (X, Y) seems to be capable of handling binary-vector-type biometric information.

In the case of the individual elements $x_i$ of the binary vector X=[$x_1, \ldots, x_n$]∈ {0,1}$^n$, the following holds.

$$x_i\hat{\ }2=x_i(i==1, \ldots ,n) \quad (16)$$

Thus, Enc(pk, $Sx_i\hat{\ }2$) can be calculated from {Enc(pk, $Sx_i$)} received in S106 in FIG. 2.

As described above, the matching apparatus 140 performs a scalar operation of a reciprocal $S\hat{\ }(-1)$ of S to Enc(pk, $SD_2$) transmitted from the matching request apparatus 120 to calculate Enc(pk, $D_2$), calculates Enc(pk, $D_1$)+Enc(pk, $D_2$) by performing an additive homomorphic operation, and transmits the result to the verification apparatus 150 as the encrypted distance Enc(pk, $d_E^2$ (X, Y)). In the case of the binary-vector type biometric information, if $x_i \in \{0,1\}, x_i\textasciicircum 2 = x_i$.

Thus, in the matching request apparatus 120, the encrypted data Enc(pk, $Sx_i$) received from the matching apparatus 140 matches Enc(pk, $Sx_i\textasciicircum 2$).

Figure 3:
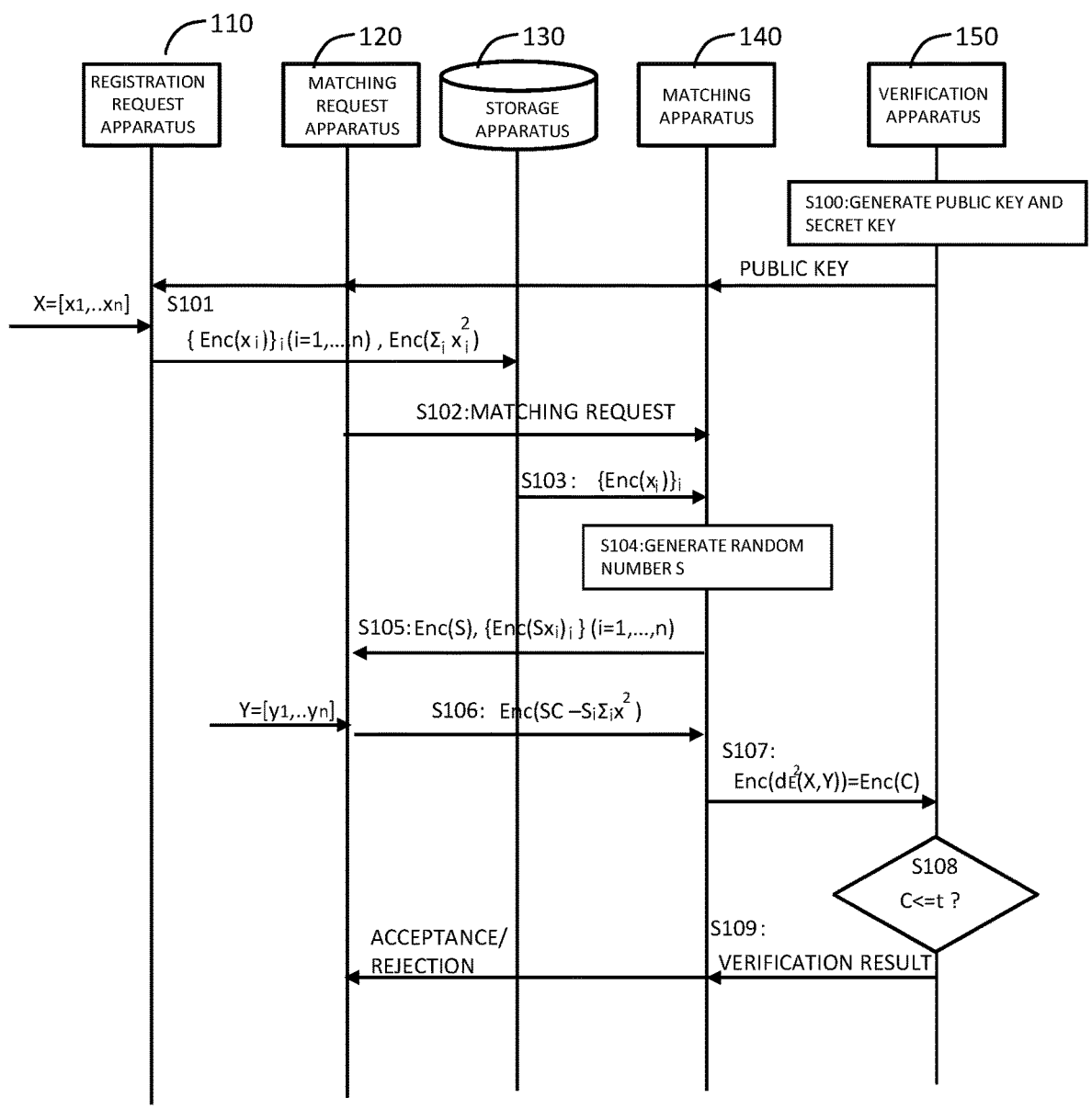
FIG. 3 is a diagram illustrating an example of a problem (a spoofing attack) with the comparative example.

In addition, with reference to FIG. 3, in S106, the matching request apparatus 120 uses the encrypted data Enc(pk, S) of the random number S received from the matching apparatus 140 to calculate $$Enc\left(pk, S\left(c - \sum_{i=1}^{n} x_i^2\right)\right) \quad (17)$$

and transmits the result to the matching apparatus 140. Namely, the matching request apparatus 120 obtains Enc(pk, cS) by performing a scalar operation Scl(c, Enc(pk, S)).

Furthermore, since the following holds, $$\sum_{i=1}^{n} Enc(pk, Sx_i) = \sum_{i=1}^{n} Enc(pk, Sx_i^2) = Enc\left(pk, \sum_{i=1}^{n} Sx_i^2\right) \quad (18)$$

the following is calculated.

$$Enc\left(pk, S\sum_{i=1}^{n} x_i^2\right) \quad (19)$$

Next, from the following scalar operation $$Scl\left(-1, Enc\left(pk, S\sum_{i=1}^{n} x_i^2\right)\right) = Enc\left(pk, -S\sum_{i=1}^{n} x_i^2\right) \quad (20)$$

the following is calculated.

$$Enc\left(pk, -S\sum_{i=1}^{n} x_i^2\right) \quad (21)$$

By adding the above Expression (21) to Enc(pk, cS) in an encrypted state, the following is calculated.

$$Enc(pk, cS) + Enc\left(pk, -S\sum_{i=1}^{n} x_i^2\right) = Enc\left(pk, S\left(c - \sum_{i=1}^{n} x_i^2\right)\right) \quad (22)$$

The matching apparatus 140 handles $$Enc\left(pk, S\left(c - \sum_{i=1}^{n} x_i^2\right)\right)$$

transmitted from the matching request apparatus 120, as Enc(pk, $SD_2$) transmitted from the matching request apparatus 120 and calculates Enc(pk, $D_2$) by performing a scalar operation of a reciprocal of $S\textasciicircum(-1)$ of S to the encrypted data. Next, by performing an additive homomorphic operation, the matching apparatus 140 transmits a sum of Enc(pk, $D_2$) and Enc(pk, $D_1$) to the verification apparatus 150 as an encrypted distance Enc(pk, $d_E^2$ (X, Y)).

In this case, Enc(pk, $d_E^2$(X, Y)) that the matching apparatus 140 transmits to the verification apparatus 150 is given as follows.

$$Enc(pk, d_E^2(x, y)) = Enc\left(pk, \sum_{i=1}^{n} x_i^2\right) + Enc\left(pk, c - \sum_{i=1}^{n} x_i^2\right) = \quad (23)$$

$$Enc\left(pk, \sum_{i=1}^{n} x_i^2 + c - \sum_{i=1}^{n} x_i^2\right) = Enc(pk, c)$$

The verification apparatus 150 decrypts Enc(pk, $d_E^2$(X, Y)) by using the secret key sk. The verification apparatus 150 determines whether the decryption result (g\textasciicircum c) matches any one of g\textasciicircum 0, g\textasciicircum 1, ..., and g\textasciicircum t (t is a threshold) and outputs the determination result as a verification result (acceptance if the decryption result (g\textasciicircum c) matches any one of g\textasciicircum 0, g\textasciicircum 1, ..., and g\textasciicircum t).

Thus, by selecting c that is less than or equal to t in the matching request apparatus 120, the distance between the registered biometric information X and the biometric information Y used in authentication is calculated as follows.

$$D_1 + D_2 = c \leq t \quad (24)$$

Thus, in the example in FIG. 2, a query that is certainly accepted can be transmitted to the verification apparatus 150.

As described above, when the biometric information is a binary vector, an eavesdropper can impersonate an arbitrary user.

Irises (iris codes), palm prints (competitive codes), etc. are widely known as binary-vector-type biometric information having a very low error rate. Whether two items of biometric information have been extracted from the same person is determined by the Hamming distance between the two items of biometric information. Namely, if the Hamming distance is less than or equal to a threshold, the two items of biometric information are determined to have been extracted from the same person. Otherwise, the two items of biometric information are determined to have been extracted from different persons. Hereinafter, some example embodiments will be described with reference to drawings.

First Example Embodiment

FIG. 4 illustrates a first example embodiment of the present invention. In the present example embodiment, for example, a Hamming distance between n-dimensional binary vectors $X = [x_1, \ldots, x_n] \in \{0,1\}^n$ and $Y = [y_1, \ldots, y_n] \in \{0,1\}^n$ is divided as follows.

$$d_H(X, Y) = \sum_{i=1}^{n} x_i - 2\sum_{i=1}^{n} x_i y_j + \sum_{i=1}^{n} y_i = \sum_{i=1}^{n} x_i + \sum_{i=1}^{n} (1 - 2x_i) y_i \quad (25)$$

$$D_1 = \sum_{i=1}^{n} x_i \quad (26)$$

$$D_2 = \sum_{i=1}^{n} (1 - 2x_i) y_i \quad (27)$$

As described above, D1 does not depend on the values of the matching target vector Y.

A public key and a secret key are generated (S10) in the preparation phase as described above.

Based on the binary vector X=[x1, ..., xn]∈{0, 1}, the registration request apparatus 110 transmits the following encrypted data to the storage apparatus 130 (S11).

$$Enc(pk, 1 - 2x_1), \ldots, Enc(pk, 1 - 2x_n) \quad (28)$$

$$Enc\left(pk, \sum_{i=1}^{n} x_i\right) \quad (29)$$

The storage apparatus 130 holds the encrypted data $$Enc(pk, 1 - 2x_i) \; (i = 1, \ldots, n) \text{ and}$$

$$Enc\left(pk, \sum_{i=1}^{n} x_i\right)$$

in association with a registration identifier Id.

The matching apparatus 140 receives a matching request from the matching request apparatus 120 (S12). The matching apparatus 140 receives the encrypted data Enc(pk, 1−2x$_i$), ..., Enc(pk, 1−2x$_1$) stored in association with the Id from the storage apparatus 130 (S13). The matching apparatus 140 generates a random number S (S14).

Next, by performing a scalar operation Scl(S, Enc(pk, 1−2x$_i$)) (i=1, ... n) by using the random number S, the matching apparatus 140 calculates the following encrypted data.

$$Enc(pk, S(1-2x_i))(i=1, \ldots, n) \quad (30)$$

The matching apparatus 140 transmits the encrypted data Enc(pk, S(1-2x$_i$)) (i=1, ..., n) to the matching request apparatus 120 (S15).

From Y=[y1, ..., y$_n$]∈{0, 1}n and the encrypted data Enc(pk, S(1−2x$_i$)) (i=1, ..., n) received from the matching apparatus 140, the matching request apparatus 120 performs a scalar operation Scl(y$_i$, Enc(pk, S(1−2x$_i$))), to calculate the following encrypted data.

$$Enc(pk, S(1-2x_i)y_i)(i=1, \ldots, n) \quad (31)$$

Next, by adding these encrypted data, the matching request apparatus 120 calculates the following encrypted data.

$$\sum_{i=1}^{n} Enc(pk, S(1 - 2x_i)y_i) = Enc\left(pk, S\left(\sum_{i=1}^{n} (1 - 2x_i)y_i\right)\right) = Enc(pk, SD_2) \quad (32)$$

The matching request apparatus 120 transmits Enc(pk, SD$_2$) to the matching apparatus 140 (S16).

The matching apparatus 140 does not transmit Enc(pk, S) to the matching request apparatus 120. Thus, the matching request apparatus 120 cannot calculate the following encrypted data.

$$Enc\left(pk, S\left(\sum_{i=1}^{n} x_i\right)\right) \quad (33)$$

Thus, the client cannot falsify the Hamming distance.

The matching apparatus 140 performs a scalor operation of the reciprocal S^(−1) of the random number S to the encrypted data $$Enc\left(pk, S\left(\sum_{i=1}^{n} (1 - 2x_i)y_i\right)\right) = Enc(pk, SD_2)$$

transmitted from the matching request apparatus 120.

$$Scl\left(S^{-1}, Enc\left(pk, S\left(\sum_{i=1}^{n} (1 - 2x_i)y_i\right)\right)\right) \quad (34)$$

The matching apparatus 140 consequently calculates the following encrypted data.

$$Enc\left(pk, \sum_{i=1}^{n} (1 - 2x_i)y_i\right) = Enc(pk, D_2) \quad (35)$$

The matching apparatus 140 adds the following template (36) registered in the storage apparatus 130 to Enc(pk, D$_2$) in Expression (35).

$$Enc\left(pk, \sum_{i=1}^{n} x_i\right) = Enc(pk, D_1) \quad (36)$$

to calculate the following encrypted Hamming distance.

$$Enc(pk, d_H(X,Y)) = Enc(pk, D_1) + Enc(pk, D_2) \quad (37)$$

The matching apparatus 140 transmits the encrypted Hamming distance Enc(pk, d$_H$(X, Y)) to the verification apparatus 150 (S17).

The verification apparatus 150 decrypts Enc(pk, d$_H$ (X, Y)) by using the secret key sk. The verification apparatus 150 determines whether the decryption result (d$_H$ (X, Y)) matches any one of g^0, g^1, ..., and g^t (t is a threshold) (S18). The verification apparatus 150 outputs the determination result as the verification result (acceptance if the decryption result matches any one of g^0, g^1, ..., and g^t) (S19).

Figure 5:
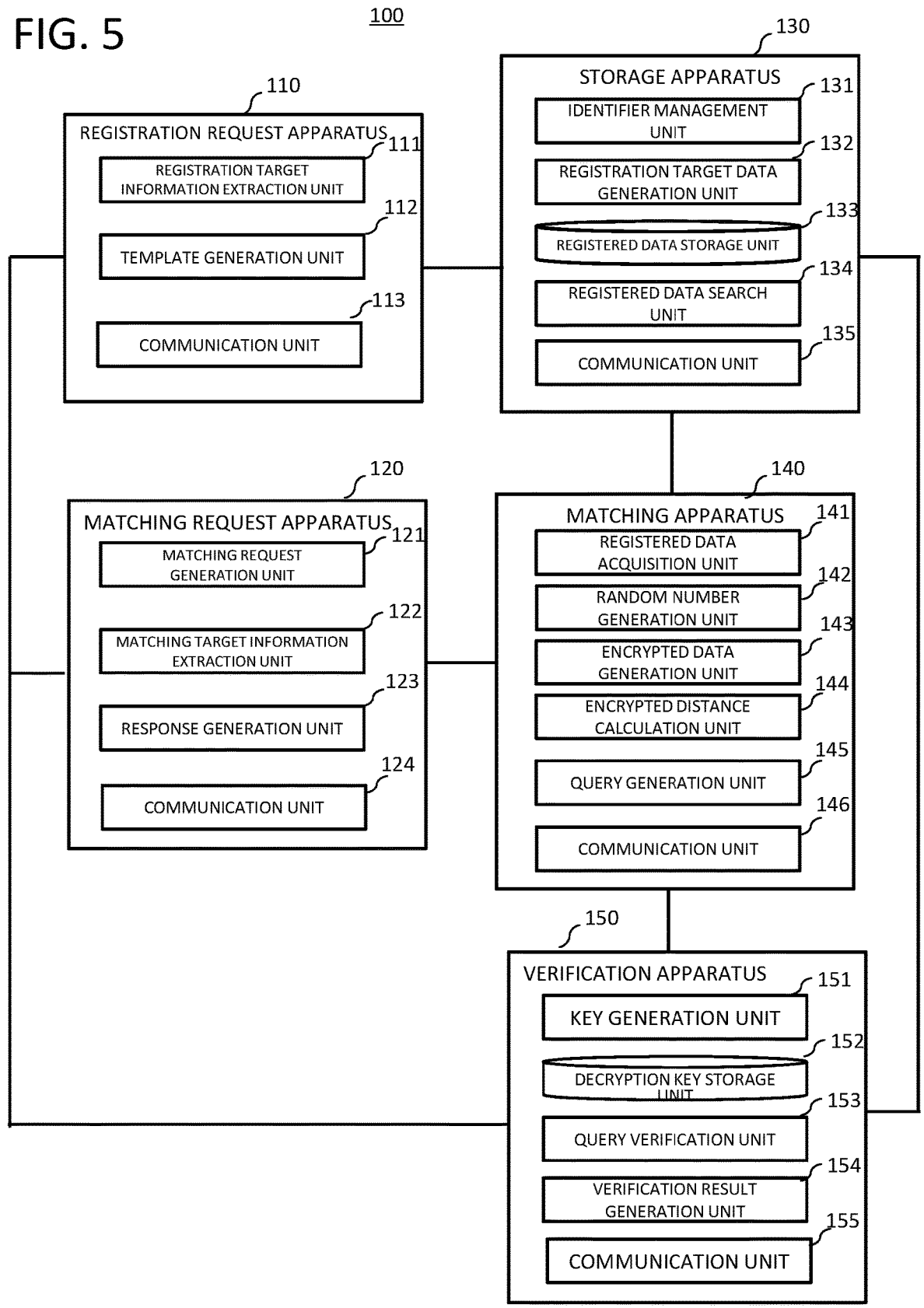
FIG. 5 is a diagram illustrating a configuration example according to the first example embodiment of the present invention.

FIG. 5 illustrates a configuration according to the first example embodiment of the present invention. The matching system 100 is composed by an information processing system such as a computer system. The matching system 100 according to the first example embodiment includes the registration request apparatus 110, the storage apparatus 130, the matching request apparatus 120, the matching apparatus 140, and the verification apparatus 150.

The registration request apparatus 110 includes a registration target information extraction unit 111, a template generation unit 112, and a communication unit 113.

The storage apparatus 130 includes, in addition to a storage apparatus that holds information, an operation part that processes the information. Namely, the storage apparatus 130 includes an identifier management unit 131, a registration target data generation unit 132, a registered data storage unit 133, a registered data search unit 134, and a communication unit 135.

The matching request apparatus 120 includes a matching request generation unit 121, a matching target information extraction unit 122, a response generation unit 123, and a communication unit 124.

The matching apparatus 140 includes a registered data acquisition unit 141, a random number generation unit 142, an encrypted data generation unit 143, an encrypted distance calculation unit 144, a query generation unit 145, and a communication unit 146.

The verification apparatus 150 includes a key generation unit 151, a decryption key storage unit 152, a query determination unit 153, a verification result generation unit 154, and a communication unit 155.

For example, the registration request apparatus 110 and the storage apparatus 130, the storage apparatus 130 and the matching apparatus 140, the matching request apparatus 120 and the matching apparatus 140, and the matching apparatus 140 and the verification apparatus 150 may be connected to each other via respective communication units (each of which includes a transmitter (an interface) and a receiver (an interface) not illustrated) of these apparatuses and a communication network (for example, a local area network (LAN) or a wide area network (WAN)). Alternatively, at least two of the registration request apparatus 110, the storage apparatus 130, the matching apparatus 140, the matching request apparatus 120, and the verification apparatus 150 may be implemented in a single unit, and these apparatuses may be connected to each other by a bus (an inter-apparatus bus or an intra-apparatus bus) in the unit. For example, the verification apparatus 150 generates an encryption key and a decryption key based on a homomorphic encryption scheme, and the registration request apparatus 110, the storage apparatus 130, the matching apparatus 140, and the matching request apparatus 120 are configured to be able to obtain the public key (the encryption key) disseminated by the verification apparatus 150.

In the matching system 100, the registration request apparatus 110 and the matching request apparatus 120 may collectively be referred to as a "first node". In the matching system 100, the storage apparatus 130 and the matching apparatus 140 may collectively be referred to as a "second node". In addition, in the matching system 100, the verification apparatus 150 may be referred to as a "third node". For example, the registration request apparatus 110 and the matching request apparatus 120 may be configured as a client apparatus, and the storage apparatus 130 and the matching apparatus 140 may be configured as a server apparatus. In addition, the verification apparatus 150 may be configured as a decryption apparatus that is connected to the server apparatus.

An operation in the matching system 100 according to the present example embodiment will be described. Processing in the matching system 100 according to the first example embodiment of the present invention will be described.

The processing in the matching system 100 is basically divided into:

a preparation phase, a registration phase, and a matching phase.

First, an outline of the processing in the individual phase will be described. In the matching system 100 according to the first example embodiment of the present invention, a homomorphic encryption scheme having a homomorphic property in addition and a scalar operation is used. For convenience of description, as the encryption scheme, the Modified-Elgamal encryption described above is used. Alternatively, elliptic Elgamal encryption or Paillier encryption may be used.

The elliptic Elgamal encryption is defined to a group on an elliptic curve on a finite field.

<Key Generation>: Parameters a, b, p, and q of an elliptic curve and a base point G on the elliptic curve are received as input data, and a public key pk=G, H=x(*)G and a secret key sk=x are outputted. A message space is a field $F_q=0, 1, \ldots, q-1$. In general, a prime equal to or more than 128 bits is selected as q.

<Encryption>: The public key pk and a message $m \in F_q$ are received as input data, a random number $r \in F_q$ is selected, and the following ciphertext is outputted.

$$C=(C[0]=R(*)G, C[1]=(m(*)G)(+)(r(*)H)) \qquad (38)$$

Namely, the following is satisfied.

$$C[1]=(m+rx)(*)G \qquad (39)$$

<Decryption>: The secret key sk and the ciphertext C=(C[0], C[1]) are received as input data, and the following M is outputted.

$$M=C[1](-)(sk(*)C[0]). \qquad (40)$$

Namely, the following relationship is satisfied.

$$C[1](-)(sk(*)C[0])=(m+rx)(*)G(-)x(*)(r(*)G)=m(*)G \qquad (41)$$

The decryption algorithm may return m(*)G, instead of the message m.

In each of the above algorithms, the following notation is used.

Addition of points A and B on an elliptic curve: A(+)B

Subtraction of a point B from a point A and on an elliptic curve: A(−)B

Multiplication of a point A on an elliptic curve by z: z(*)A

In the preparation phase, mainly, a public key and a secret key are generated by using a security parameter $1^\kappa$.

In the registration phase, mainly, a template is created by encrypting an extracted registration target vector by using the public key (encryption key) generated in the preparation phase and is stored.

In the matching phase, mainly, a distance between a newly extracted matching target vector and a single registered vector is calculated by using the secret key (decryption key) generated in the preparation phase.

Next, processing that the matching system 100 performs in the individual phases described above will be described in detail.

Figure 6:
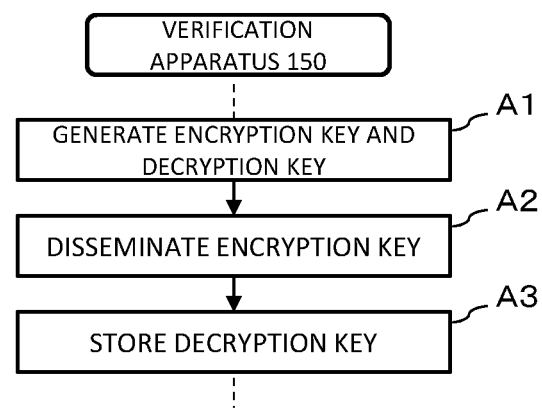
FIG. 6 is a diagram illustrating a preparation phase according to the first example embodiment of the present invention.

FIG. 6 is a flowchart illustrating an example of the processing that the matching system 100 according to the first example embodiment performs in the preparation phase. The processing that the matching system 100 according to the present example embodiment performs in the preparation phase will be described with reference to FIG. 6.

The key generation unit 151 in the verification apparatus 150 receives a security parameter and generates an encryption key (a public key) pk and a decryption key (a secret key) sk by using the received security parameter, for example, in accordance with the key generation algorithm (step A1). The generated encryption key and decryption key are compliant with a public key encryption scheme (for example, the Modified-Elgamal encryption) having a homomorphic property of addition and scalar multiplication.

The key generation unit 151 disseminates the generated encryption key pk in the matching system 100 (step A2).

The key generation unit 151 stores the generated decryption key sk in the decryption key storage unit 152 (step A3).

The processing that the matching system 100 according to the present example embodiment performs in the preparation phase is, as a matter of course, not limited to the mode illustrated as an example in FIG. 6.

Figure 7:
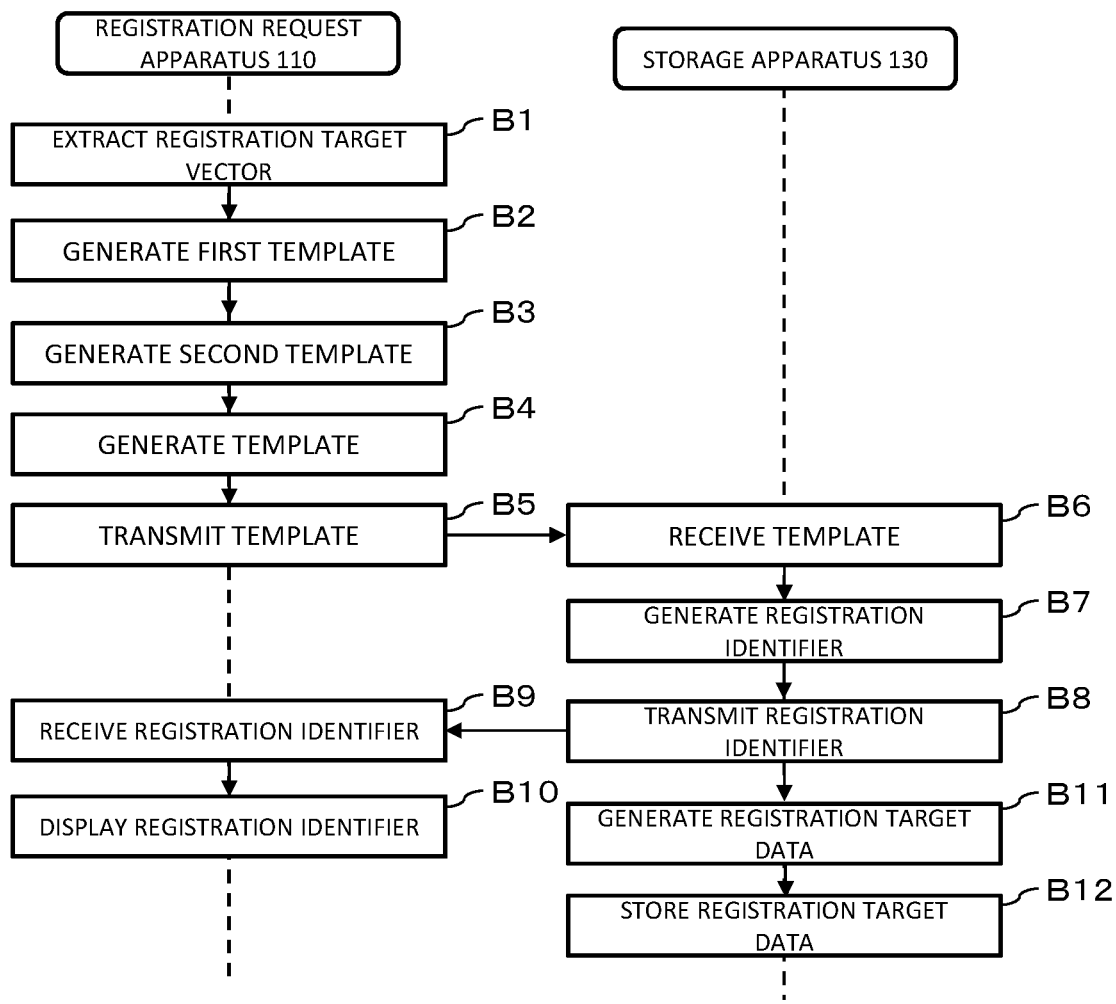
FIG. 7 is a diagram illustrating a registration phase according to the first example embodiment of the present invention.

FIG. 7 is a flowchart illustrating an example of the processing that the matching system 100 according to the first example embodiment performs in the registration phase. The processing that the matching system 100 according to the first example embodiment performs in the registration phase will be described with reference to FIG. 7.

The registration target information extraction unit 111 in the registration request apparatus 110 extracts biometric information $$X=[x[1], \ldots, x[n]]$$

(which will be referred to as a "registration target vector") from a registration target biometric characteristic (step B1). Herein, the notation x[i] (i=1, . . . , n) in which the suffix i of xi (i=1, . . . , n) is included in a bracket will be used, simply for clarification of operational expressions.

Next, the template generation unit 112 in the registration request apparatus 110 generates the following n templates obtained by encrypting $1-2x_i$ (i=1, . . . , n) by using the encryption key pk (step B2).

$$Enc(pk,1-2x[1]), \ldots ,Enc(pk,1-2x[n]) \quad (42)$$

The ciphertexts calculated in step B2 will also be referred to as "first templates".

Next, the template generation unit 112 in the registration request apparatus 110 generates a single template by encrypting x[1]+, . . . +x[n] by using the encryption key pk (step B3).

$$Enc(pk,x[1]+, \ldots +x[n]) \quad (43)$$

The ciphertext calculated in step B3 will also be referred to as a "second template".

$$Enc(pk,1-2x[1])(=CT[1]),$$

$$\ldots,$$

$$Enc(pk,1-2x[n])(=C1[n]),$$

$$Enc(pk,x[1]+,+x[n])(CC1) \quad (44)$$

In the Modified-Elgamal encryption, the template generation unit 112 selects a plurality of values rr1[1], . . . , r1[n] and rr1 from $Z_q$.

The template generation unit 112 reads the generator g and the value h from the public key pk and creates the following ciphertexts for the binary vector X.

$$(g^{\{r1[1]\}},g^{\{1-2x[1]\}} \times h^{\{r1[1]\}})=(C1[1][0],C1[1][1])(=C1[1])$$

$$\ldots,$$

$$(g^{\{r1[n]\}},g^{\{1-2x[n]\}} \times h^{\{r1[n]\}})=(C1[n][0],C1[n][1])(=C1[n])\}\})$$

$$(g^{\{rr1\}},g^{\{x[1]+ \ldots +x[n]\}} \times h^{\{rr1\}}))=(CC1[0],CC1[1])(=CC1) \quad (45)$$

Next, the template generation unit 112 in the registration request apparatus 110 combines the first templates and the second template to create the following template (step B4).

$$(C1[1], \ldots ,C1[n],CC1) \quad (46)$$

The communication unit 113 in the registration request apparatus 110 transmits the template $$(C1[1], \ldots ,C1[n],CC1)$$

to the storage apparatus 130 (step B5).

The communication unit 135 in the storage apparatus 130 receives the template (C1 [1], . . . , C1 [n], CC1) from the registration request apparatus 110 (step B6).

The identifier management unit 131 in the storage apparatus 130 determines a unique registration identifier id for the template received from the registration request apparatus 110 (step B7).

The communication unit 135 in the storage apparatus 130 transmits the registration identifier id to the registration request apparatus 110 (step B8).

Next, the communication unit 113 in the registration request apparatus 110 receives the registration identifier id from the storage apparatus 130 (step B9).

The registration request apparatus 110 displays the received registration identifier id on a user interface (UI) such as a display (step B10). Alternatively, the registration request apparatus 110 may store the received registration identifier id in an IC (integrated circuit) card such as an employee card or an identifier card.

Next, the registration target data generation unit 132 in the storage apparatus 130 combines the template and the registration identifier id as registration target data (step B11).

$$(C1[1], \ldots ,C1[n],CC1,id) \quad (47)$$

The registration target data generation unit 132 stores the registration target data in the registered data storage unit 133 in the storage apparatus 130 (step B12).

The processing that the matching system 100 according to the present example embodiment performs in the registration phase is not limited to the mode illustrated as an example in FIG. 3. For example, steps B11 and B12 may be performed before step B8. Namely, before transmitting the registration identifier id to the registration request apparatus 110, the storage apparatus 130 may store the registration target data in the registered data storage unit 133.

Figure 8:
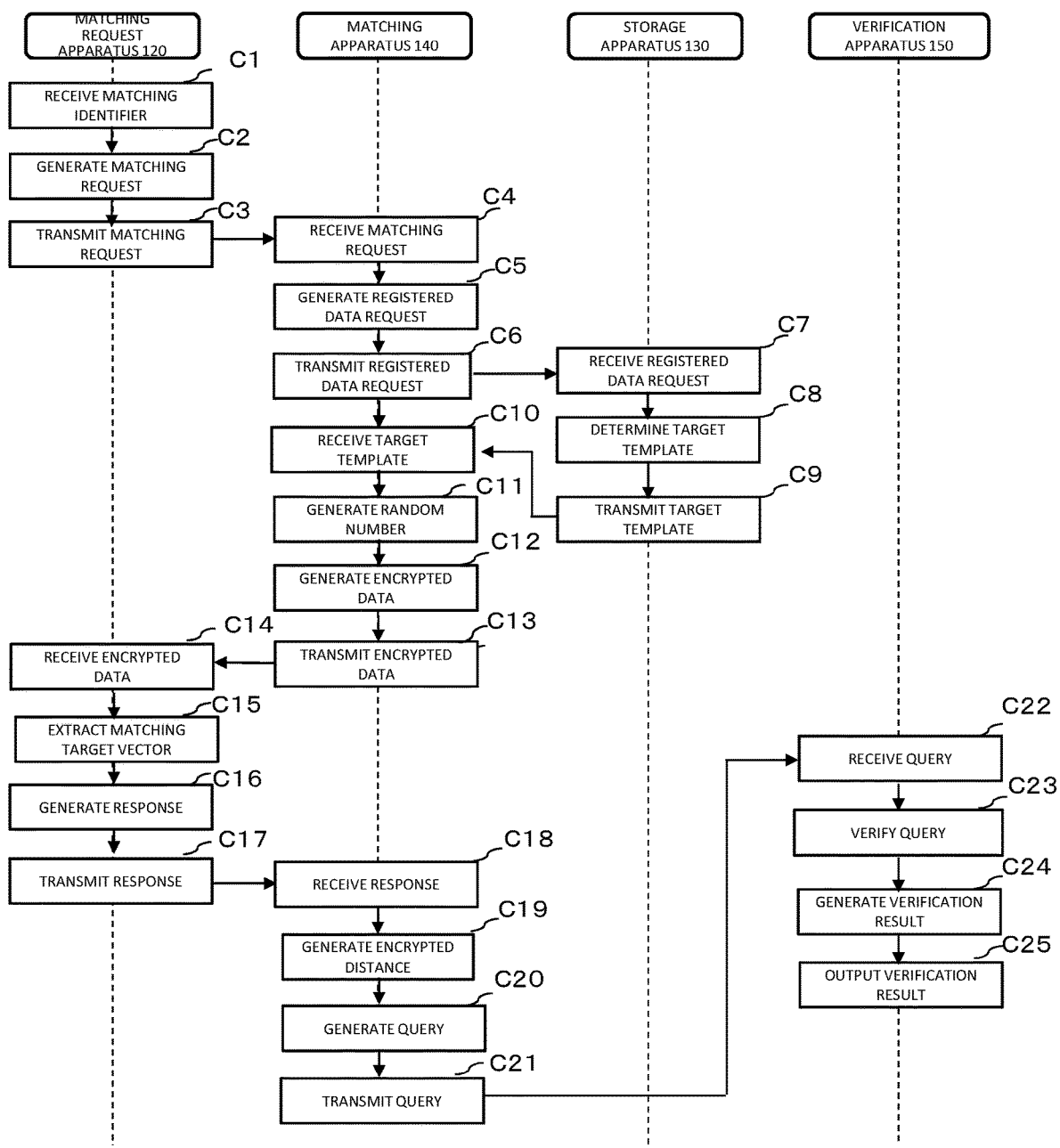
FIG. 8 is a diagram illustrating a matching phase according to the first example embodiment of the present invention.

FIG. 8 is a flowchart illustrating an example of the processing that the matching system 100 according to the first example embodiment performs in the matching phase. The processing that the encryption matching system 100 performs in the matching phase will be described with reference to FIGS. 8 and 5.

The matching request apparatus 120 receives an identifier (which will be referred to as a "matching identifier") of a matching (authentication) target (step C1).

Next, the matching request generation unit 121 in the matching request apparatus 120 generates a matching request including the received matching identifier (step C2).

The communication unit 124 in the matching request apparatus 120 transmits the matching request to the matching apparatus 140 (step C3).

The communication unit 146 in the matching apparatus 140 receives the matching request from the matching request apparatus 120 (step C4).

Next, the registered data acquisition unit 141 in the matching apparatus 140 generates a registered data request including the matching identifier included in the matching request transmitted from the matching request apparatus 120 (step C5).

The communication unit 146 in the matching apparatus 140 transmits the registered data request to the storage apparatus 130 (step C6).

Next, the communication unit 135 in the storage apparatus 130 receives the registered data request from the matching apparatus 140 (step C7).

The registered data search unit 134 in the storage apparatus 130 determines the registered data (which will also be referred to as a "target template") including the matching identifier included in the registered data request (step C8) from the registered data stored in the registered data storage unit 133.

The communication unit 135 in the storage apparatus 130 transmits the template:

$$\text{Enc}(pk, 1-2x[1])(=C1[1]),$$

$$\ldots,$$

$$\text{Enc}(pk, 1-2x[n])(=C1[n])$$

$$\text{Enc}(pk, x[1]+ \ldots +x[n])(=CC1) \quad (48)$$

to the matching apparatus 140 (step C9).

The communication unit 146 in the matching apparatus 140 receives the template from the storage apparatus 130 (step C10).

The random number generation unit 142 in the matching apparatus 140 generates an integer (a random number) $S \in F_q$ in accordance with a pseudo random number generation procedure (step C11).

Preferably, the random number generation unit 142 generates a different random number S each time a matching request is made.

Next, the encrypted data generation unit 143 in the matching apparatus 140 using an additive homomorphic scalar operation rule, for the n first templates:

$$\text{Enc}(pk, 1-2x[1])(=CT[1]),$$

$$\ldots,$$

$$\text{Enc}(pk, 1-2x[n])(=C1[n])$$

performs a scalor operation of S: Scl(S, Enc(pk, 1−2x[1])), ..., Scl(S, Enc(pk, 1−2x[n])),
to generate n encrypted data (which will also be referred to as "challenge") (step C12).

$$\text{Enc}(pk, S(1-2x[1]))(C2[1]),$$

$$\ldots$$

$$\text{Enc}(pk, S(1-2x[n]))(C2[n]) \quad (49)$$

That is, for $$C1[1]=(g^{\{r1[1]\}}, g^{\{(1-2x[1])\}} \times h^{\{r1[1]\}})=(C1[1][0], C1[1][1]),$$

$$(C1[1][0]^\wedge S, C1[1][1]^\wedge S)=C2[1] \text{ is obtained.}$$

For $C1[n]=(g^{\{r1[n]\}}, g^{\{(1-2x[n])\}} \times h^{\{r1[n]\}})=(C1[n][0], C1[n][1])(=C1[n]),$ $$(C1[n][0]^\wedge S, C1[n][1]^\wedge S)=C2[n] \text{ is obtained.} \quad (50)$$

The communication unit 146 in the matching apparatus 140 transmits the encrypted data (C2[1], ..., C2[n]) to the matching request apparatus 120 (step C13).

The matching request apparatus 120 receives the encrypted data transmitted from the matching apparatus 140 in step C13 (step C14).

Next, the matching target information extraction unit 122 in the matching request apparatus 120 extracts a matching target vector $$Y=(y[1], y[2], \ldots, y[n])$$

from the authentication target biometric characteristic (step C15).

Next, the response generation unit 123 in the matching request apparatus 120, using a scalar operation and an addition of an additive homomorphic operation, from $$\text{Enc}(pk, S(1-2x[1]))(C2[1]),$$

$$\ldots,$$

$$\text{Enc}(pk, S(1-2x[n]))(C2[n])$$

generates the following encrypted response (step C16).

$$\text{Enc}\left(pk, S\sum_{i=1}^{n}(1-2x[i])y[i]\right) \quad (50)$$

(denoted as CC2)

That is, the response generation unit 123 in the matching request apparatus 120 generates Enc(pk, S(1−2x[1])y[1]) using a scalar operation Scl(y[1], Enc(pk, S(1−2x[1]))). Likewise, the response generation unit 123 generates Enc(pk, S(1−2x[n])y[n]) using Scl(y[n], Enc(pk, S(1−2x[n]))). Next, by adding these responses, the response generation unit 123 generates $$\text{Enc}(pk, S((1-2x[1])y[1]+, \ldots, +(1-2x[n])y[n]))$$
$$(=CC2).$$

Next, the communication unit 124 in the matching request apparatus 120 transmits the response CC2 to the matching apparatus 140 (step C17).

Next, the matching apparatus 140 receives the response CC2 from the matching request apparatus 120 (step C18).

Next, the encrypted distance calculation unit 144 in the matching apparatus 140 performs a scalar operation on Enc(pk, S((1−2x[1])y[1]+, ..., (1−2x[n])y[n])) by using $S^\wedge-1$ as follows.

$$\text{Scl}(S^\wedge(-1), \text{Enc}(pk, S((1-2x[1])y[1]+, \ldots, (1-2x[n])y[n])))$$

As a result, the encrypted distance calculation unit 144 obtains the following encrypted data.

$$\text{Enc}(pk, ((1-2x[1])y[1]+, \ldots, (1-2x[n])y[n])) \quad (52)$$

From this encrypted data and the second template Enc(pk, x[1], ..., x[n])=Enc(pk, D1) received from the storage apparatus 130, the encrypted distance calculation unit 144 obtains an encrypted Hamming distance.

$$\text{Enc}\left(pk, \sum_{i=1}^{n}x[i]\right) + \text{Enc}\left(pk, \sum_{i=1}^{n}(1-2x[i])y[i]\right) = \quad (53)$$

$$\text{Enc}\left(pk, \sum_{i=1}^{n}x[i] + \sum_{i=1}^{n}(1-2x[i])y[i]\right) =$$

$$\text{Enc}\left(pk, \sum_{i=1}^{n}(x[i] + (1-2x[i])y[i])\right) = \text{Enc}(pk, d_H(X, Y))$$

Next, the query generation unit 145 in the matching apparatus 140 generates a query including the encrypted distance Enc(pk, $d_H$ (X, Y)) (step C20).

The communication unit 146 in the matching apparatus 140 transmits the query to the verification apparatus 150 (step C21).

Next, the communication unit 155 in the verification apparatus 150 receives the query Enc(pk, f) from the matching apparatus 140 (step C24).

Next, the query determination unit 153 in the verification apparatus 150 decrypts the encrypted distance Enc(pk, $d_H$ (X, Y)) in the query by using the secret key sk.

$$\text{Dec}(sk, \text{Enc}(pk, d_H(X,Y))) = g\^\{d_H(X,Y)\} \tag{54}$$

Next, the verification result generation unit 154 in the verification apparatus 150 compares $d_H$ (X, Y) with the threshold t (step C23). The verification result generation unit 154 determines whether g^{$d_H$(X, Y)} matches any one of g^0, g^1, and g^t. If g^{$d_H$(X, Y)} matches any one of g^0, g^1, and g^t, the verification result generation unit 154 determines $d_H$ (X, Y)<=t and generates a verification result indicating acceptance. Otherwise, the verification result generation unit 154 determines $d_H$ (X, Y)>t and generates a verification result indicating rejection (step C24).

The verification apparatus 150 outputs the calculated verification result (step C25).

The processing that the matching system 100 according to the present example embodiment performs in the matching phase is not limited to the mode illustrated as an example in FIG. 8. For example, step C11 may be performed before steps C5 to C10.

In addition, in the matching system 100 according to the first example embodiment, even when authentication is performed on the same registered vector, the processing using a random number selected in step C11 in FIG. 7 is performed. Thus, even if a communication content in the matching processing is leaked, the distance equal to the distance obtained in the matching processing when the leakage has occurred cannot be calculated or a smaller value cannot be calculated by retransmitting the leaked content or transmitting data created by using the leaked content. In the first example embodiment, when utilized for authentication in which "acceptance" is output when a distance between a registered vector and an authentication target vector is smaller than a threshold, an attacker who does not know the registered vector is not "accepted". Namely, the first example embodiment has resistance against spoofing attacks.

In particular, the encrypted data (challenge) transmitted from the matching apparatus 140 to the matching request apparatus 120 does not include encrypted data Enc(pk, S) of a random number S. Thus, from the encrypted data Enc(pk, S(1−2x[1])), . . . , Enc(pk, S(1−2x[n])) transmitted from the matching apparatus 140 to the matching request apparatus 120, the matching request apparatus 120 cannot calculate Enc(*pk*,(*x*[1]+ . . . +*x*[*n*])), Enc(*pk*,S((*x*[1]+ . . . +*x*[*n*]))).

Thus, a Hamming distance between X and Y cannot be falsified, and no eavesdropper can impersonate a user.

In addition, the data received by the verification apparatus 150 having a secret key is a ciphertext of a Hamming distance between a registered vector and a matching target vector, and values of the registered vector and matching target vector are not disclosed. Thus, in the matching system 100 according to the first example embodiment, the verification apparatus can calculate a distance between the registered vector and the matching target vector, in such a condition wherein values other than a distance between the registered vector and matching target vector are not leaked to apparatuses other than the apparatuses that extract the respective vectors.

In addition, the matching system 100 according to the first example embodiment can be modified so that a Hamming distance between a registered vector and a matching target vector is not disclosed to the verification apparatus 150 having a decryption key. For example, by applying the same method as discussed in NPL 1, the matching system 100 can be modified to a scheme in which the verification apparatus 150 having the decryption key (secret key) cannot calculate the Hamming distance between the registered vector and the matching target vector. In the scheme in which the distance between the registered vector and the matching target vector is not disclosed to the verification apparatus 150 having the decryption key, since the verification apparatus 150 having the decryption key is prevented from calculating values of the registered vector even in a special situation, higher security can be achieved.

<Variation 1>

FIG. 9 illustrates variation 1 of the first example embodiment. The basic configuration is the same as that according to the first example embodiment. The difference will hereinafter be described. Notation, such as omission of a public key pk in a registration target vector X and encryption Enc( ) is the same as that in FIG. 4.

The registration request apparatus 110 transmits, as templates, Enc(pk, $x_1$), . . . , Enc(pk, $x_n$) to the storage apparatus 130, instead of Enc(pk, (1−2$x_i$)), . . . , Enc(pk, (1−2$x_n$)) (S11A).

By performing an additive homomorphic scalar operation and an addition operation on Enc(pk, $x_1$), . . . , Enc(pk, $x_n$), the storage apparatus 130 calculates and holds the following encrypted data (S11B).

$$\text{Enc}(pk,(1-2x_i)), \ldots, \text{Enc}(pk,(1-2x_n)) \tag{55}$$

$$\text{Enc}(pk, x_i+, \ldots, +x_n) \tag{56}$$

On reception of a matching request from the matching request apparatus 120 (S12), the matching apparatus 140 obtains Enc(*pk*,(1−2$x_i$)), . . . ,Enc(*pk*,(1−2$x_n$)) and Enc(pk, $x_i$+, . . . , +$x_n$) from the storage apparatus 130 (S13). Since the subsequent processing is the same as that in FIG. 4, description thereof will be omitted.

In FIG. 5, the template generation unit 112 in the registration request apparatus 110 generates Enc(pk, $x_i$), . . . , Enc(pk, $x_n$).

The registration target data generation unit 132 in the storage apparatus 130 calculates Enc(*pk*,(1−2$x_i$))=*C*1[1],

. . . ,

Enc(*pk*,(1−2$x_n$))=*C*1[*n*] and Enc(*pk*,$x_i$+, . . . ,+$x_n$)=*CC*1 from Enc(pk, $x_i$), . . . , Enc(pk, $x_n$),
generates registration target data in association with a registration identifier id,
(C1[1], . . . , C1[n], CC1, id), and stores the registration target data in the registered data storage unit 133. According to variation 1, the registration request apparatus 110 has less processing load.

<Variation 2>

FIG. 10 illustrates variation 2 of the first example embodiment. The basic configuration is the same as that according to the first example embodiment. The difference will hereinafter be described. Notation, such as omission of a public key pk in the registration target vector X and encryption Enc( ) is the same as that in FIG. 4.

As in variation 1, the registration request apparatus 110 transmits, as templates, Enc(pk, $x_i$), . . . , Enc(pk, $x_n$) to the storage apparatus 130 (S11A).

The storage apparatus 130 holds the templates.

$$\text{Enc}(pk,x_i), \ldots , \text{Enc}(pk,x_n) \tag{57}$$

On reception of a matching request from the matching request apparatus 120 (S12), the matching apparatus 140 obtains Enc(pk, $x_1$), . . . Enc(pk, $x_1$) from the storage apparatus 130 (S13A) and performs an additive homomorphic scalar operation and an addition operation to calculate $$\text{Enc}(pk,(1-2x_i)), \ldots ,\text{Enc}(pk,(1-2x_1)) \text{ and } \text{Enc}(pk, x_i+,\ldots ,+x_n)$$

(S13B).

Since the subsequent processing is the same as that in FIG. 4, description thereof will be omitted.

Second Example Embodiment

While the first example embodiment described with reference to FIGS. 4 to 9, is safe against Semi-honest attackers, there are still spoofing attacks by attackers. In step S15 in FIG. 4, the matching apparatus 140 transmits Enc(pk, S(1−2$x_1$)), . . . , Enc(pk, S(1−2$x_n$)) to the matching request apparatus 120.

Since the individual elements of the registration target vector X=[$x_1$, . . . , $x_n$]∈{0,1} are binary values, each of Enc(pk, S(1−2$x_i$)), . . . Enc(pk, S(1−2$x_n$)) is any one of the following data.

$$\text{Enc}(pk,S), \text{Enc}(pk,-S) \tag{58}$$

By giving only two tries for an arbitrary value z, Enc(pk, Sz) can be transmitted to the matching apparatus 140. The matching apparatus 140 handles Enc(pk, Sz) received from the matching request apparatus 120 as Enc(pk, D2) and transmits Enc(pk, Sz+$D_1$) obtained by adding Enc(pk, Sz) and Enc(pk, $D_1$) to the verification apparatus 150.

In this case, if the following relationship (59) is established, $$Sz + D_1 = Sz + \sum_{i=1}^{b} x_i \leq t \tag{59}$$

the verification apparatus 150 determines acceptance.

Thus, according to the second example embodiment, instead of transmitting encrypted data Enc(pk, S(1−2$x_i$)) (i=1, . . . , n) obtained by multiplication of a random number to registered templates which are transmitted from the matching apparatus 140 to the matching request apparatus 120, the matching apparatus 140 transmits a transformed value Ai of the registration vector as a challenge to the matching request apparatus 120, which is an element of a first transformed value vector A obtained by transforming the registration target binary vector X=[$x_1$, . . . , $x_n$] in accordance with a certain transformation formula and takes a value other than binary values, wherein an operation result of A with a second transformed vector B obtained by transforming a matching target binary vector Y=[$y_1$, . . . , $y_n$] (an inner product A·B), generates $$\sum_{i=1}^{n}(1-2x_i)y_i \tag{60}$$

The matching request apparatus 120 calculates Enc(pk, SΣ[i=1 to n]Ai·Bi) by performing an additive homomorphic operation of the encrypted data Enc(pk, Ai) of the transformed value Ai and the transformed value Bi related the matching target binary vector Y=[y1, . . . , yn] and transmits Enc(pk, SΣ[i=1 to n] Ai·Bi) to the matching apparatus 140. Enc(pk, SΣ[i=1 to n] Ai·Bi) is equivalent to the following encrypted data.

$$Enc\left(pk, S\sum_{i=1}^{n}(1-2x_i)y_i\right) \tag{61}$$

When the biometric information is a binary vector, spoofing attacks can be avoided. This feature according to the second example embodiment will be described below.

When the registration target vector is X=[$x_1$, . . . , $x_n$]∈{0,1}$^n$ and the matching target vector Y=[$y_1$, . . . , $y_n$]∈{0,1}$^n$, $A_1$, . . . , $A_n$, and $B_1$, . . . , $B_n$ satisfying the following relationship are calculated.

$$\begin{cases} A_1 = a_{1,1} \cdot x_1 + a_{1,2} \cdot x_2 + \ldots + a_{1,n} \cdot x_n + a_{1,n+1} \\ A_2 = a_{2,1} \cdot x_1 + a_{2,2} \cdot x_2 + \ldots + a_{2,n} \cdot x_n + a_{2,n+1} \\ \ldots \\ A_n = a_{n,1} \cdot x_1 + a_{n,2} \cdot x_2 + \ldots + a_{n,n} \cdot x_n + a_{n,n+1} \end{cases} \tag{62}$$

$$\begin{cases} B_1 = b_{1,1} \cdot y_1 + b_{1,2} \cdot y_2 + \ldots + b_{1,n} \cdot y_n \\ B_2 = b_{2,1} \cdot y_1 + b_{2,2} \cdot y_2 + \ldots + b_{2,n} \cdot y_n \\ \ldots \\ B_n = b_{n,1} \cdot y_1 + b_{n,2} \cdot y_2 + \ldots + b_{n,n} \cdot y_n \end{cases} \tag{63}$$

$$\sum_{i=1}^{n} A_i B_i = \sum_{i=1}^{n}(-2x_i y_i + y_i) \tag{64}$$

The number of constraint equations is n(n+1), which is a sum of n^2 about the coefficients of the individual $x_i$ and $y_i$ and n about the individual $y_i$. An unknown number is n(2n+1).

$$((a_{1,1}, a_{1,2}, \ldots, a_{1,n+1}, a_{2,1}, \ldots, a_{n,n+1}), (b_{1,1}, b_{1,2}, \ldots, b_{1,n}, b_{2,1}, \ldots, b_{n,n})) \tag{65}$$

If $b_{i,j}$ (i=1, . . . , n, j=1, . . . , n) are fixed, the number of unknowns is n(n+1) as follows.

$$(a_{1,1}, a_{1,2}, \ldots, a_{1,n+1}, a_{2,1}, \ldots, a_{n,n+1}) \tag{66}$$

Since (number of unknowns)>=(number of constraint equations), there is a solution. In particular, if the individual $b_{i,j}$ (i=1, . . . , n, j=1, . . . , n) are fixed, the individual $a_{i,j}$ (i=1, . . . , n, j=1, . . . , n+1) are uniquely determined.

According to the present example embodiment, the matching apparatus 140 transmits Enc(pk, S$A_i$) (i=1, . . . , n) to the matching request apparatus 120. The matching request apparatus 120 transmits the following encrypted data to the matching apparatus 140.

$$Enc\left(pk, S\sum_{i=1}^{n} A_i B_i\right) = Enc\left(pk, S\sum_{i=1}^{n}(-2x_i y_i + y_i)\right) \tag{67}$$

For ease of description, an example in which a two-dimensional registration target vector $X^T$=[$x_1, x_2$]∈{0,1}$^2$ and a two-dimensional matching target vector $Y=[y_1,y_2] \in \{0,1\}^2$ are used will be described. In these vectors, T denotes a transpose operator. The above formulas (62) and (63) can be expressed by using the following transformation matrixes.

$$\begin{pmatrix} A_1 \\ A_2 \end{pmatrix} = \begin{bmatrix} a_{1,1} & a_{1,2} \\ a_{2,1} & a_{2,2} \end{bmatrix} \begin{pmatrix} x_1 \\ x_2 \end{pmatrix} + \begin{pmatrix} a_{1,3} \\ a_{2,3} \end{pmatrix} \tag{68}$$

$$\begin{pmatrix} B_1 \\ B_2 \end{pmatrix} = \begin{bmatrix} b_{1,1} & b_{1,2} \\ b_{2,1} & b_{2,2} \end{bmatrix} \begin{pmatrix} y_1 \\ y_2 \end{pmatrix} \tag{69}$$

The above formula (64) is given as follows.

$$\sum_{i=1}^{2} A_i B_i = A_1 B_1 + A_2 B_2 = \sum_{i=1}^{2}(-2x_i y_i + y_i) = -2x_1 y_1 + y_1 - 2x_2 y_2 + y_2 \tag{70}$$

By solving this, the individual coefficients are given as follows.

$$a_{1,1} = -2b_{2,2} \cdot L, a_{1,2} = 2b_{2,1} \cdot L, a_{1,3} = (b_{2,2}-b_{2,1})L,$$

$$a_{2,1} = 2b_{1,2} \cdot L, a_{2,2} = -2b_{1,1} \cdot L, a_{2,3} = (b_{1,1}-b_{1,2})L, \tag{71}$$

where L is a reciprocal of a determinant of $$\begin{bmatrix} b_{1,1} & b_{1,2} \\ b_{2,1} & b_{2,2} \end{bmatrix} \tag{72}$$

$$L = (b_{1,1} \cdot b_{2,2} - b_{1,2} \cdot b_{2,1})^{-1}$$

Thus, it is possible to express as follows.

$$\begin{pmatrix} A_1 \\ A_2 \end{pmatrix} = \tag{73}$$

$$\left( \frac{1}{b_{1,1} \cdot b_{2,2} - b_{1,2} \cdot b_{2,1}} \right) \times \left( \begin{bmatrix} -2b_{2,2} & 2b_{2,1} \\ 2b_{1,2} & -2b_{1,1} \end{bmatrix} \begin{pmatrix} x_1 \\ x_2 \end{pmatrix} + \begin{pmatrix} b_{2,2} & -b_{2,1} \\ b_{1,1} & -b_{1,2} \end{pmatrix} \right)$$

In the above expression, when $b_{1,1}=b_{2,2}=1$, $b_{1,2}=b_{2,1}=0$, the following formula (74) holds.

$$\begin{pmatrix} A_1 \\ A_2 \end{pmatrix} = (-2)\begin{pmatrix} x_1 \\ x_2 \end{pmatrix} + \begin{pmatrix} 1 \\ 1 \end{pmatrix} = \begin{pmatrix} 1-2x_1 \\ 1-2x_2 \end{pmatrix} \tag{74}$$

This corresponds to a case in which n=2 according to the first example embodiment.

As a simple specific example, a case in which q=13 (message space: $F_q$) will be described. Assuming that $$(b_{1,1}, b_{1,2}, b_{2,1}, b_{2,2}) = (1,3,3,7)$$

$$L = (-2)^{-1} = 11^{11} \mod 13 = 6. \tag{75}$$

(According to Fermat's little theorem, if q is a prime, $g^{(q-1)}=1 \mod q$, $g \cdot g^{(q-2)}=1 \mod q$. Thus, the inverse is given as follows)

$$g^{(-1)} = g^{(q-2)} \mod q \tag{76}$$

Thus, the following satisfies the constraint equations.

$$(a_{1,1}, a_{1,2}, a_{1,3}, a_{2,1}, a_{2,2}, a_{2,3}) = (-84, 36, 24, 26, -12, -12)$$
$$\mod 13 = (7, 10, 11, 10, 11) \tag{77}$$

$$\begin{pmatrix} A_1 \\ A_2 \end{pmatrix} = \begin{bmatrix} a_{1,1} & a_{1,2} \\ a_{2,1} & a_{2,2} \end{bmatrix} \begin{pmatrix} x_1 \\ x_2 \end{pmatrix} + \begin{pmatrix} a_{1,3} \\ a_{2,3} \end{pmatrix} = \begin{bmatrix} 7 & 10 \\ 10 & 1 \end{bmatrix} \begin{pmatrix} x_1 \\ x_2 \end{pmatrix} + \begin{pmatrix} 11 \\ 1 \end{pmatrix} \mod 13 \tag{78}$$

Figure 11:
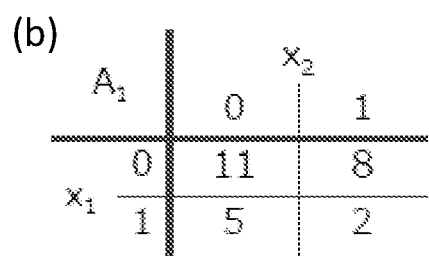
FIG. 11 is a diagram illustrating a second example embodiment of the present invention.
Figure 11:
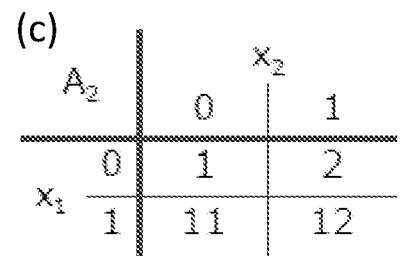

In this case, $A_1$ and $A_2$ vary depending per values (0, 0), (0, 1), (1, 0), (1, 1) of $(x_1, x_2)$ (see (b) and (c) in FIG. 11). $B_1$ and $B_2$ are given as follows.

$$\begin{pmatrix} B_1 \\ B_2 \end{pmatrix} = \begin{bmatrix} b_{1,1} & b_{1,2} \\ b_{2,1} & b_{2,2} \end{bmatrix} \begin{pmatrix} y_1 \\ y_2 \end{pmatrix} = \begin{bmatrix} 1 & 3 \\ 3 & 7 \end{bmatrix} \begin{pmatrix} y_1 \\ y_2 \end{pmatrix} \mod 13$$

Figure 12:
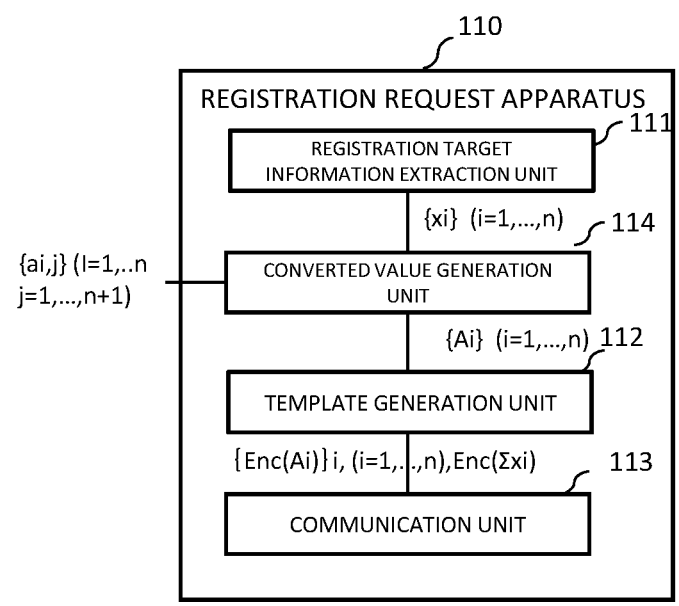
FIG. 12 is a diagram illustrating a configuration example of a registration request apparatus according to the second example embodiment of the present invention.

FIG. 12 illustrates a configuration of the registration request apparatus 110 according to the second example embodiment. The registration request apparatus 110 includes a transformed value generation unit 114 that calculates transformed values $(A_1, \ldots, A_n)$ based on a binary vector $X^T=[x_1, \ldots, x] \in \{0,1\}^n$ extracted by the registration target information extraction unit 111 and preset transformation coefficients $$(a_{1,1}, a_{1,2}, \ldots, a_{1,n+1}, a_{2,1}, \ldots, a_{n,n+1}).$$

Other aspects of the basic configuration are the same as those according to the first example embodiment illustrated in FIG. 5. However, the processing performed by the transformed template generation unit 112 in the registration request apparatus 110, the registration target data generation unit 132 in the storage apparatus 130, the encrypted data generation unit 143 and encrypted distance calculation unit 144 in the matching apparatus 140, and the matching request apparatus 120 differs from that according to the first example embodiment.

Figure 13:
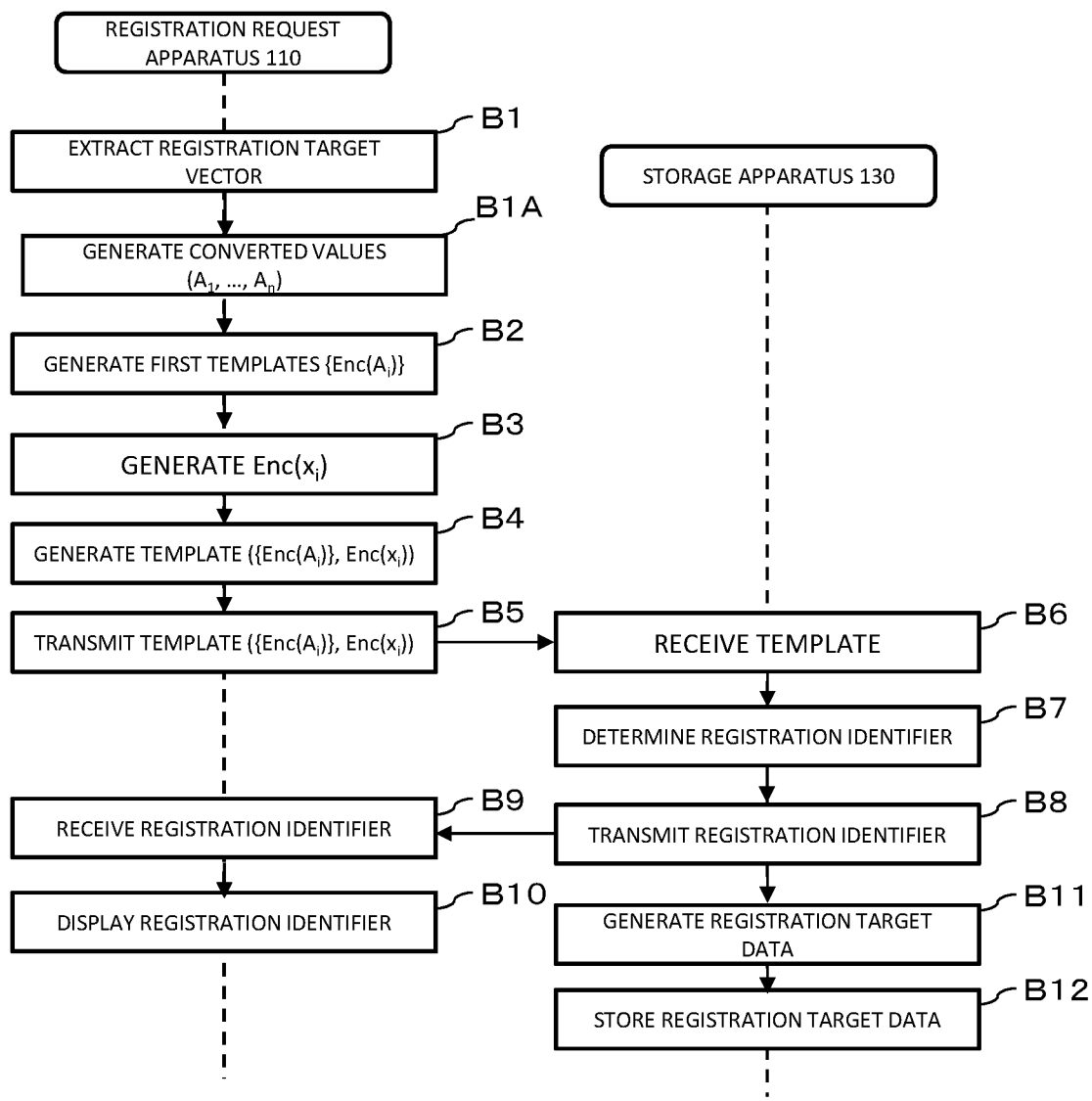
FIG. 13 is a diagram illustrating a registration phase according to the second example embodiment of the present invention.

FIG. 13 illustrates the registration phase. Hereinafter, step B1A added to FIG. 7 will be described. In step B1A, the transformed value generation unit 114 calculates transformed values $(A_1, \ldots, A_n)$ based on the binary vector $X^T=[x_1, \ldots, x_n] \in \{0,1\}^n$ extracted by the registration target information extraction unit 111 and the preset transformation coefficients $(a_{1,1}, a_{1,2}, \ldots, a_{1,n+1}, a_{2,1}, \ldots, a_{n,n+1})$ (B1A).

The template generation unit 112 generates, as first templates, the following encrypted data (B2).

$$\text{Enc}(pk,A_1), \ldots, \text{Enc}(pk,A_n) \tag{79}$$

In addition, the template generation unit 112 generates, as a second template, the following encrypted data (B3).

$$\text{Enc}(pk,x_1), \ldots, \text{Enc}(pk,x_n) \tag{80}$$

The template generation unit 112 combines these templates (B4) and transmits the combined template to the storage apparatus 130 (B5).

FIG. 14 illustrates an operation sequence according to the second example embodiment. FIG. 14 uses the notation in FIGS. 4, 9, etc. The public key and the secret key (S20) are generated as in S10 in FIGS. 4, 9, etc.

As described above, the second example embodiment assumes that the n(n+1) transformation coefficients $$(a_{1,1}, a_{1,2}, \ldots, a_{1,n+1}, a_{2,1}, \ldots, a_{n,n+1})$$

are preset in the registration request apparatus 110. In addition, the n^2 transformation coefficients $$(b_{1,1}, b_{1,2}, \ldots, b_{1,n}, b_{2,1}, \ldots, b_{n,n})$$

are preset in the matching request apparatus 120.

The transformed value generation unit 114 in the registration request apparatus 110 calculates transformed values $(A_i, \ldots, A_n)$ based on the binary vector $X^T=$ $[x_1, \ldots, x] \in \{0,1\}^n$ extracted by the registration target information extraction unit 111 and the preset transformation coefficients $$(a_{1,1}, a_{1,2}, \ldots, a_{1,n+1}, a_{2,1}, \ldots, a_{n,n+1}).$$

Next, the template generation unit 112 in the registration request apparatus 110 generates, as the first templates, the following encrypted data of $A_i$ (i=1, ..., n).

$$\text{Enc}(pk, A_1), \ldots, \text{Enc}(pk, A_n) \quad (81)$$

In addition, the template generation unit 112 generates, as the second templates, the following encrypted data.

$$\text{Enc}(pk, x_1), \ldots, \text{Enc}(pk, x_n) \quad (82)$$

Next, the template generation unit 112 in the registration request apparatus 110 generates the following template from the first and second templates.

$$(\text{Enc}(pk, A_1), \ldots, \text{Enc}(pk, A), \text{Enc}(pk, x) \ldots, \text{Enc}(pk, x)) \quad (83)$$

The template generation unit 112 transmits the generated template to the storage apparatus 130 via the communication unit 113 (S21).

When the storage apparatus 130 receives the template, the identifier management unit 131 generates a registration identifier id and the registration target data generation unit 132 associates the template with the registration identifier id and stores the following resultant data in the registered data storage unit 133.

$$((\text{Enc}(pk, A_1), \ldots, \text{Enc}(pk, A_n), \text{Enc}(pk, x_1) \ldots, \text{Enc}(pk, x_n)), id) \quad (84)$$

When the communication unit 146 in the matching apparatus 140 receives a matching request from the matching request apparatus 120 (S22), the registered data acquisition unit 141 receives $$((\text{Enc}(pk, A_1), \ldots, \text{Enc}(pk, A_n), \text{Enc}(pk, x_1) \ldots, \text{Enc}(pk, x_n)), id)$$

from the storage apparatus 130 (S23A).

The matching apparatus 140 generates encrypted data $\text{Enc}(pk, \Sigma[i=1 \text{ to } n]x_i)$ of a sum of the elements $\{x_i\}$ with $\text{Enc}(pk, x_1), \ldots, \text{Enc}(pk, x_n)$ being kept in an encrypted state (S23B).

The random number generation unit 142 in the matching apparatus 140 generates a random number $S \in F_q$ (S24)

Next, the random number generation unit 142 performs a scalar operation of the random number S to the encrypted data $\text{Enc}(pk, A_1), \text{Enc}(pk, A_n)$ of the transformed values to calculate $$\text{Enc}(pk, SA_1), \ldots, \text{Enc}(pk, SA_n) \quad (85)$$

The random number generation unit 142 transmits the calculated encrypted data to the matching request apparatus 120 via the communication unit 146 (S25).

The values of $\text{Enc}(pk, A_i)$ (i=1, ..., n) vary depending on a combination of the values of $(x_1, \ldots x_n)$. Thus, it is difficult for attackers to estimate $\text{Enc}(pk, S)$ from $\text{Enc}(pk, S \cdot A_i)$ (i=1, ..., n) transmitted from the matching apparatus 140 to the matching request apparatus 120, making it difficult to conduct spoofing attacks.

The response generation unit 123 in the matching request apparatus 120 calculates the following formula (86) from $\{b_{i,j}\}$ (i, j=1, ..., n) and a binary vector $Y=[y_1, \ldots, y_n] \in \{0,1\}^n$ extracted by the matching target information extraction unit 122.

$$Bi = \sum_{j=1}^{n} b_{i,j} \cdot x_j (i = 1, \ldots, n) \quad (86)$$

By using an additive homomorphic addition and a scalar operation, the response generation unit 123 in the matching request apparatus 120 performs a scalar operation $\text{Scl}(B_i, \text{Enc}(pk, SA_i))$ (i=1, ..., n) in an encrypted state of data (challenge) $\text{Enc}(pk, A_i)$ (i=1, ..., n) received from the matching apparatus 140, to calculate the following encrypted data $$\text{Enc}(pk, SA_1 \cdot B_1), \ldots, \text{Enc}(pk, SA_n \cdot B_n) \quad (87)$$

By adding these items of encrypted data in an encrypted state, the response generation unit 123 calculates:

$$\sum_{i=1}^{n} \text{Enc}(pk, SA_i \cdot B_i) = \text{Enc}\left(pk, S\sum_{i=1}^{n} A_i \cdot B_i\right) \quad (88)$$

The response generation unit 123 in the matching request apparatus 120 transmits $$\text{Enc}\left(pk, S\sum_{i=1}^{n} A_i \cdot B_i\right)$$

to the matching apparatus 140 via the communication unit 124 as a response to the challenge (S26).

The encrypted distance calculation unit 144 in the matching apparatus 140 applies a scalar operation of the reciprocal $S^{-1}(S^{q-2} \bmod q)$ of the random number S to $$\text{Enc}\left(pk, S\sum_{i=1}^{n} A_i \cdot B_i\right)$$

to calculate the following encrypted data.

$$\text{Enc}\left(pk, S\sum_{i=1}^{n} A_i \cdot B_i\right) \quad (89)$$

where the following holds.

$$\sum_{i=1}^{n} A_i \cdot B_i = \sum_{i=1}^{n} (-2x_i y_i + y_i) = D_1 \quad (90)$$

From the calculated $D_i$ and the second template received from the storage apparatus 130, the encrypted distance calculation unit 144 in the matching apparatus 140 calculates the encrypted data of a Hamming distance between the binary vectors X and Y with the encrypted data being kept in an encrypted state.

$$\text{Enc}\left(pk, \sum_{i=1}^{n} x_i\right) = \text{Enc}(pk, D_2) \quad (91)$$

-continued $$Enc\left(pk, \sum_{i=1}^{n} A_i \cdot B_i\right) + Enc\left(pk, \sum_{i=1}^{n} x_i\right) = \qquad (92)$$

$$Enc\left(pk, \sum_{i=1}^{n} (-2x_i y_i + y_i)\right) + Enc\left(pk, \sum_{i=1}^{n} x_i\right) =$$

$$Enc\left(pk, \sum_{i=1}^{n} (-2x_i y_i + y_i) + \sum_{i=1}^{n} x_i\right) =$$

$$Enc\left(pk, \sum_{i=1}^{n} ((-2x_i y_i + y_i) + x_i)\right) = Enc(pk, d_H(X, Y))$$

The matching apparatus 140 transmits the encrypted data Enc(pk, $d_H$ (X, Y)) of the Hamming distance between the binary vectors X and Y to the verification apparatus 150 (S27). The verification apparatus 150 decrypts the encrypted data Enc(pk, $d_H$ (X, Y)) using the secret key sk (Dec(sk, Enc(pk, $d_H$ (X, Y)))), determines whether the decrypted result is less than or equal to a threshold t (S28), and outputs a verification result (S29).

<Variation 1>

FIG. 15 illustrates variation 1 of the above second example embodiment. According to the above second example embodiment, the registration request apparatus 110 calculates the transformed values $A_1, \ldots, A_n$ and transmits the encrypted data Enc(pk, $A_1$), . . . , Enc(pk, $A_n$) of the transformed values to the storage apparatus 130 as the first templates. According to variation 1, the template generation unit 112 in the registration request apparatus 110 does not transmit the encrypted data Enc(pk, $A_1$), . . . , Enc(pk, $A_n$) of the transformed values [$A_1, \ldots A_n$] to the storage apparatus 130. As in the first example embodiment, the template generation unit 112 in the registration request apparatus transmits the encrypted data (first template) Enc (pk, $x_1$), . . . , Enc(pk, $x_n$) of the n elements $x_1, \ldots, x_n$ to the storage apparatus 130 (S21).

The registration request apparatus 110 has the same configuration as that illustrated in FIG. 5. Other aspects of the basic configuration are the same as those according to the first example embodiment illustrated in FIG. 5. However, the processing performed by the template generation unit 112 in the registration request apparatus 110, the registration target data generation unit 132 in the storage apparatus 130, the encrypted data generation unit 143 and the encrypted distance calculation unit 144 in the matching apparatus 140, and the matching request apparatus 120 differs from that according to the first example embodiment.

The communication unit 135 in the storage apparatus 130 receives the first templates from the registration request apparatus 110. The registration target data generation unit 132 stores the first template in the registered data storage unit 133 in association with a registration identifier id given by the identifier management unit 131.

In addition, the registration target data generation unit 132 in the storage apparatus 130 generates the encrypted data $$Enc\left(pk, \sum_{i=1}^{n} x_i\right)$$

of a sum of the elements $\{x_i\}$ from the encrypted data of n elements $x_1, \ldots, x_1$ of the n-dimensional binary vector X Enc($pk,x_i$), . . . ,Enc($pk,x_n$)     (93)

in an encrypted state.

The registration target data generation unit 132 in the storage apparatus 130 calculates, from the group of transformation coefficients ($a_{1,1}, a_{1,2}, \ldots, a_{1,n+1}, a_{2,1}, \ldots, a_{n,n+1}$)

which are set in the storage apparatus 130, the encrypted data

Enc($pk,A_1$), . . . ,Enc($pk,A_n$)

of the transformed values $A_1, \ldots, A_n$ with n elements $x_1, \ldots, x_n$ of the n-dimensional binary vector X in an encrypted state (S21B).

Enc(pk, $a_{i,j}$ $x_j$) (j=1, . . . , n) is calculated by performing a scalar operation Scl($a_{i,j}$, Enc(pk, $x_j$)) (j=1, . . . , n) on the encrypted data Enc(pk, $x_j$). In addition, the registration target data generation unit 132 in the storage apparatus 130 calculates Enc(pk, $a_{i,n+1}$) and adds these encrypted data in an encrypted state, to calculate encrypted data Enc(pk, $A_i$) (i=1, . . . , n). The registration target data generation unit 132 stores the calculated encrypted data Enc(pk, $A_i$) (i=1, . . . , n) in the registered data storage unit 133 (S21B).

Enc($pk,A_1$)=Enc($pk,a_{1,1} \cdot x_1$)+, . . . ,Enc($pk,a_{1,n} \cdot x_n$)+
    Enc($pk,a_{1,n+1}$)

. . . ,

Enc($pk,A_n$)=Enc($pk,a_{n,1} \cdot x_1$)+, . . . ,Enc($pk,a_{n,n} \cdot x_n$)+
    Enc($pk,a_{n,n+1}$)     (94)

When the matching apparatus 140 receives a matching request from the matching request apparatus 120, the registered data acquisition unit 141 receives Enc(pk, $A_1$), . . . , Enc(pk, $A_n$) and the encrypted data (second template)

$$Enc\left(pk, \sum_{i=1}^{n} x_i\right)$$

of $$\sum_{i=1}^{n} x_i$$

from the storage apparatus 130 (S23).

The random number generation unit 142 in the matching apparatus 140 generates a random number S (S24). Next, the encrypted data generation unit 143 calculates Enc(pk, $SA_1$), . . . , Enc(pk, $SA_n$) by performing an additive homomorphic scalar operation and transmits the calculated encrypted data to the matching request apparatus 120 via the communication unit 146 (S25).

The response generation unit 123 in the matching request apparatus 120 calculates from the set n^2 transformation coefficients ($b_{1,1}, b_{1,2}, \ldots, b_{1,n}, b_{2,1}, \ldots, b_{n,n}$)

and the binary vector $Y=[y_1, \ldots, y_n] \in \{0,1\}^n$ extracted by the matching target information extraction unit 122, $$Bi = \sum_{j=1}^{n} b_{i,j} \cdot y_j (i = 1, \ldots, n) \tag{95}$$

The response generation unit 123 in the matching request apparatus 120 calculates by performing a scalar operation and an addition operation based on Enc(pk, $SA_1$), ..., Enc(pk, $SA_n$) transmitted from the matching apparatus 140 and the transformed values $B_1, \ldots, B_n$.

$$Enc\left(pk, S\sum_{i=1}^{n} A_i \cdot B_i\right) y \tag{96}$$

The response generation unit 123 transmits the calculated encrypted data to the matching apparatus 140 via the communication unit 124 as a response (S26). Since the subsequent operation sequence is the same as that in FIG. 14, description thereof will be omitted.

<Variation 2>

In the above variation 1, the storage apparatus 130 generates the encrypted data Enc(pk, $A_i$) (i=1, ..., n) of the transformed values $A_1, \ldots A_1$ from the first templates Enc(pk, $x_i$) (i=1, ..., n) transmitted from the registration request apparatus 110. In variation 2, the matching apparatus 140 creates the encrypted data Enc(pk, $A_i$) (i=1, ..., n) of the transformed values A1, ..., An, when a challenge is created. The basic configuration of variation 2 is the same as that according to the first example embodiment illustrated in FIG. 5. However, the processing performed by the template generation unit 112 in the registration request apparatus 110, the registration target data generation unit 132 in the storage apparatus 130, the encrypted data generation unit 143 and the encrypted distance calculation unit 144 in the matching apparatus 140, and the matching request apparatus 120 differs from that according to the first example embodiment.

FIG. 16 illustrates an operation according to variation 2. An operation according to variation 2 will be described with reference to FIGS. 16 and 5.

As in the first example embodiment, the registration request apparatus 110 transmits the encrypted data Enc(pk, xi) (i=1, ..., n) (first templates) of the n elements {$x_i$} (i=1, ..., n) of the n-dimensional binary vector X to the storage apparatus 130 (S21).

The storage apparatus 130 holds the first and second templates in association with a registration id.

On reception of a matching request from the matching request apparatus 120 (S22), the registered data acquisition unit 141 in the matching apparatus 140 receives the encrypted data Enc(pk, $x_1$), ..., Enc(pk, $x_n$) of the n elements {$x_i$} of the n-dimensional binary vector X from the storage apparatus 130 (S23A).

The encrypted data generation unit 143 in the matching apparatus 140 generates encrypted data $$Enc\left(pk, \sum_{i=1}^{n} x_i\right)$$

of a sum of the elements {$x_i$} with Enc(pk, $x_i$), ..., and Enc(pk, $x_n$) being kept in an encrypted state (S23A).

The encrypted data generation unit 143 in the matching apparatus 140 generates the encrypted data Enc(pk, A1), ..., Enc(pk, An) of the transformed values A1, ..., An from the encrypted registered data Enc(pk, $x_1$), ..., Enc(pk, $x_n$) of the n elements $x_1, \ldots, x_n$ and the set group of transformation coefficients ($a_{1,1}, \cdot a_{1,1}, \ldots, a_{1,n+1}, a_{2,1}, \ldots, a_{n,n+1}$) (S24B).

$$Enc(pk,A_1) = Enc(pk, a_{1,1} \cdot x_1) +, \ldots, + a_{1,nEnc}(pk, a_{1,n} \cdot x_n) + Enc(pk, a_{1,n+1})$$

$$\ldots,$$

$$Enc(pk,A_n) = Enc(pk, a_{n,1} \cdot x_1) +, \ldots, + a_{n,n} Enc(pk, a_{n,n} \cdot x_n) + Enc(pk, a_{n,n+1}) \tag{97}$$

The matching apparatus 140 generates a random number S (S24), calculates $$Enc(pk, SA_1), \ldots, Enc(pk, SA_n)$$

using an additive homomorphic scalar operation, and transmits Enc(pk, $SA_1$), ..., Enc(pk, $SA_n$) to the matching request apparatus 120 via the communication unit 146 (S25).

The matching request apparatus 120 calculates from the set n^2 transformation coefficients $$(b_{1,1}, b_{1,2}, \ldots, b_{1,n}, b_{2,1}, \ldots, b_{n,n})$$

and the binary vector $$Y = [y_1, \ldots, y_n] \in \{0, 1\}^n. \tag{98}$$

$$B_i = \sum_{j=1}^{n} b_{i,j} \cdot y_j \ (i = 1, \ldots, n)$$

In addition, from Enc(pk, SA1), ..., Enc(pk, SAn) and the transformed values B1, ..., Bn, the matching request apparatus 120 calculates the following encrypted data.

$$Enc\left(pk, S\sum_{i=1}^{n} A_i \cdot B_i\right) \tag{99}$$

As a response, the matching request apparatus 120 transmits the encrypted data to the matching apparatus 140 (S26). Since the subsequent operation is the same as that according to variation 1 in FIG. 14, description thereof will be omitted.

<Variation 3>

In variation 3, the transformation coefficients $$(a_{1,1}, \cdot a_{1,1}, \ldots, a_{1,n+1}, a_{2,1}, \ldots, a_{n,n+1})$$

are not preset in the registration request apparatus 110. The n^2 transformation coefficients $$(b_{1,1}, b_{1,2}, \ldots, b_{1,n}, b_{2,1}, \ldots, b_{n,n})$$

are not preset in the matching request apparatus 120, either.

In variation 3, each time a challenge is created, the matching apparatus 140 creates the transformation coefficients {$a_{i,j}$} (i=1, ..., n, j=1, ..., n+1).

Figure 17:
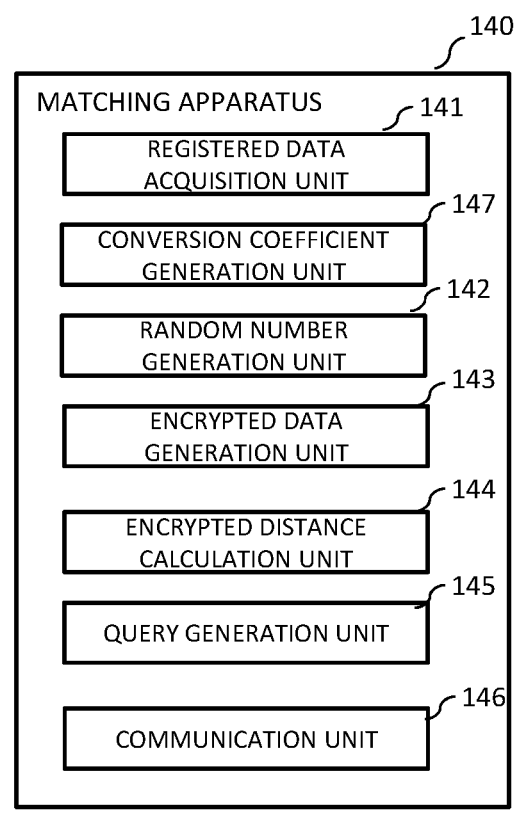
FIG. 17 is a diagram illustrating a configuration example of a matching apparatus according to variation 3 of the second example embodiment of the present invention.

FIG. 17 illustrates a configuration example of the matching apparatus 140 according to variation 3. As illustrated in FIG. 17, the matching apparatus 140 further includes a transformation coefficient generation unit 147 that generates the transformation coefficients {$a_{i,j}$}(i=1, ..., n, j=1, ..., n+1) when a challenge is created.

The encrypted data generation unit 143 calculates the transformed values $A_1, \ldots, A_1$, based on the encrypted data Enc(pk, $x_i$) (i=1, ..., n) of the n elements $x_i$ obtained by the registered data acquisition unit 141 and the created transformation coefficients $\{a_{i,j}\}$ (i=1, ..., n, j=1, ..., n+1) and transmits encrypted data to the matching request apparatus 120 as a challenge.

When transmitting a challenge to the matching request apparatus 120, the matching apparatus 140 transmits the transformation coefficients (a second group of transformation coefficients) $\{b_{i,j}\}$ (i, j=1, ..., n) used for calculation of the transformation coefficients (a first group of transformation coefficients) $\{a_{i,j}\}$ (i=1, ..., n, j=1, n+1) to the matching request apparatus 120.

Figure 18:
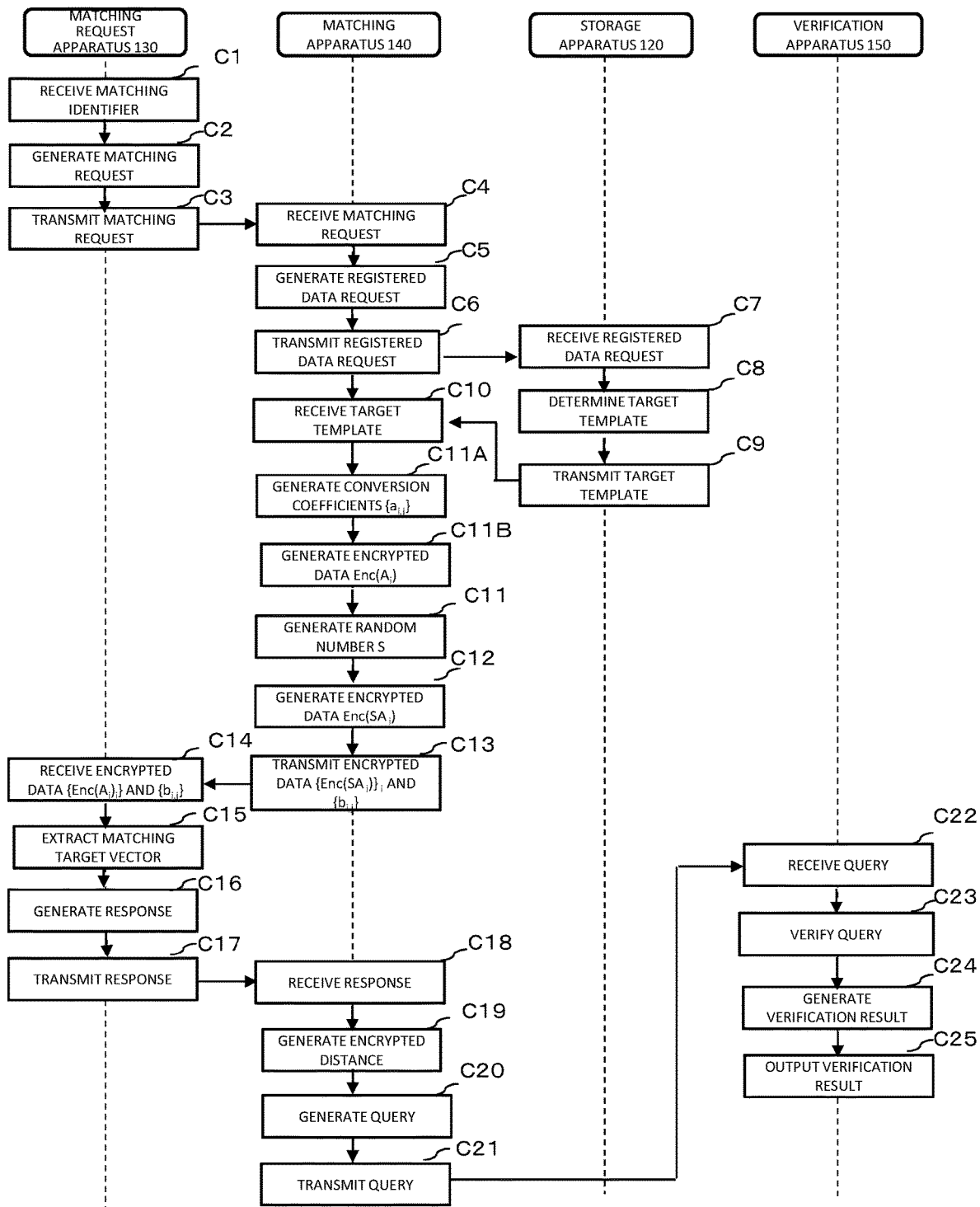
FIG. 18 is a diagram illustrating a matching phase according to variation 3 of the second example embodiment of the present invention.

FIG. 18 illustrates the matching phase according to variation 3. The difference from FIG. 8 and variation 1 will be described.

The transformation coefficient generation unit 147 in the matching apparatus 140 generates the transformation coefficients $\{a_{i,j}\}$ (i=1, ..., n, j=1, ..., n+1) each time a challenge is generated (C11A).

The encrypted data generation unit 143 in the matching apparatus 140 generates the encrypted data Enc(pk, $A_1$), ..., ENc(pk, $A_n$) of the transformed values with the elements $\{x_i\}$ being kept in an encrypted state, based on the transformation coefficients $\{a_{i,j}\}$ (i=1, ..., n, j=1 ..., n+1) and Enc(pk, $x_i$), ..., Enc(pk, $x_n$) (C11B).

The random number generation unit 142 in the matching apparatus 140 generates a random number S and performs a scalar operation of the random number S to the encrypted data of the transformed values, to generate encrypted data Enc(pk, SA1), ..., ENc(pk, SAn) (C12). The matching apparatus 140 transmits the generated encrypted data Enc (pk, $SA_1$), ..., ENc(pk, $SA_1$) and the n^2 transformation coefficients $\{b_{i,j}\}$ (i, j=1, ..., n) to the matching request apparatus 120 (C13).

FIG. 19 illustrates an overall operation sequence according to variation 3. The registration request apparatus 110 transmits the first templates formed by the encrypted data Enc(pk, $x_i$) (i=1, ..., n) of the n elements $\{x_i\}$ of the registration target binary vector X=[$x_1$, ..., $x_n$] to the storage apparatus 130 (S21).

The storage apparatus 130 holds the first templates in association with a registration identifier id.

On reception of a matching request from the matching request apparatus 120 (S22), the registered data acquisition unit 141 in the matching apparatus 140 receives the encrypted data Enc(pk, $x_i$), ..., Enc(pk, $x_n$) of the n elements $\{x_i\}$ of the binary vector X from the storage apparatus 130 (S23).

The encrypted data generation unit 143 in the matching apparatus 140 generates the encrypted data $$Enc\left(pk, \sum_{i=1}^{n} x_i\right)$$

of a sum of the n elements $\{xi\}$ of the binary vector X with the encrypted data being kept in an encrypted state Enc(pk, $x_1$), ..., Enc(pk, $x_n$) of the n elements $\{x_i\}$ of the binary vector X (S23A).

The transformation coefficient generation unit 147 in the matching apparatus 140 generates the transformation coefficients $\{a_{i,j}\}$ (i=1, ..., n, j=1, ..., n+1) each time it generates a challenge (S24A). Thus, there may be a case where the transformation coefficients vary on a per a challenge basis. The transformation coefficients $\{a_{i,j}\}$ (i=1, n, j=1, ..., n+1) are calculated based on $\{b_{i,j}\}$ (i=1, ..., n). The transformation coefficient generation unit 147 in the matching apparatus 140 may set different values for the transformation coefficients $\{b_{i,j}\}$ (i=1, ..., n) each time it generates a challenge.

The encrypted data generation unit 143 in the matching apparatus 140, based on the transformation coefficients $\{a_{i,j}\}$ (i=1, ..., n, j=1, ..., n+1) and the registered encrypted data Enc(pk, $x_1$), ..., Enc(pk, $x_n$) with Enc(p, $x_i$)(i=1, ..., n) being kept in an encrypted state, generates $$Enc(pk, A_1), \ldots, ENc(pk, A_n) \tag{100}$$

(S24B)

The random number generation unit 142 in the matching apparatus 140 generates a random number S (S24), calculates Enc(pk, $SA_1$), ..., ENc(pk, $SA_n$), and transmits Enc(pk, $SA_1$), ..., Enc(pk, $SA_n$) and the n^2 transformation coefficients $\{b_{i,j}\}$ (i, j=1, ..., n) to the matching request apparatus 120 (S25).

The matching request apparatus 120 calculates the following formula (101) from the n^2 transformation coefficients $$(b_{1,1}, b_{1,2}, \ldots, b_{1,n}, b_{2,1}, \ldots, b_{n,n})$$

transmitted from the matching apparatus 140 and the binary vector $$Y = [y_1, \ldots, y_n] \in \{0, 1\}^n. \tag{101}$$

$$B_i = \sum_{j=1}^{n} b_{i,j} \cdot y_j \quad (i = 1, \ldots, n)$$

The matching request apparatus 120 calculates, based on Enc(pk, $SA_1$), ..., Enc(pk, SAI) and the transformed values $B_1, \ldots, B_n$, $$Enc\left(pk, S\sum_{i=1}^{n} A_i \cdot B_i\right) \tag{102}$$

Next, the matching request apparatus 120 transmits this encrypted data to the matching apparatus 140 as a response (S26). Since the processing in which the matching apparatus 140 transmits a query when receiving the response as expressed in the above formula (102) (S27) and the processing that the verification apparatus 150 performs when receiving the query from the matching apparatus 140 (S28 and S29) are the same as those according to variation 2, description thereof will be omitted.

As in the first example embodiment, according the second example embodiment and the individual variations, the registration request apparatus 110 may generate the encrypted data $$Enc\left(pk, \sum_{i=1}^{n} x_i\right)$$

of a sum of the n elements $\{x_i\}$ of the registration target n-dimensional binary vector X and transmit the encrypted data to the storage apparatus 130.

Third Example Embodiment

According to the above first and second example embodiments, a decryptor receives and decrypts a ciphertext of a distance and determines whether the distance is less than or equal to a threshold t. When the Modified-Elgamal encryption is used and the decryption algorithm outputs Dec(sk, Enc(pk, m))=g^m, in stead of a message, the decryptor determines whether the decrypted value matches any one of 1, g, g^2, g^3, ..., and g^t.

When the elliptic Elgamal encryption is used and the decryption algorithm outputs Dec(sk, Enc(pk, m))=m(*)G, in stead of a message, the decryptor may determine whether the decrypted value matches any one of O, G, 2(*)G, 3(*)G, ..., and t(*)G. When the decryption algorithm outputs a message, the decryptor may determine whether the decrypted value matches any one of 0, 1, 2, 3, ..., and t.

In the matching (authentication) processing, if y1, ..., yi−1, yi+1, ..., yn=0 and yi=α are used as y1, ..., yn, the following Hamming distance is calculated.

$$d_H(X, Y) = \begin{cases} \sum_{i=1}^{n} x_i + a \approx \frac{n}{2} + \alpha & (x_i = 0) \\ \sum_{i=1}^{n} x_i - a \approx \frac{n}{2} - \alpha & (x_i = 1) \end{cases} \quad (103)$$

This is because the following relationship holds if an individual $x_i$ (i=1, ..., n) is assumed to take 0 or 1 with a probability of about 50%.

$$\sum_{i=1}^{n} x_i \approx \frac{n}{2} \quad (104)$$

By setting α to satisfy the following relationship, $$0 \le \frac{n}{2} - \alpha \le t < \frac{n}{2} + \alpha \quad (105)$$

acceptance is outputted with a probability of about 50% based on the values of $x_i$. In addition, from a result of acceptance/rejection determined by the verification apparatus 150, a value of $x_i$ can be determined. Namely, when the verification apparatus 150 determines acceptance, $x_i$=1. When the verification apparatus 150 determines rejection, $x_i$=0.

Thus, if an attacker repeats this try on each i=1, ..., n, the attacker is able to know the registered biometric information $x_1$, ..., $x_n$. Thus, in the first and second example embodiments, 1:N authentication cannot be performed. A third example embodiment is configured to handle 1:N authentication.

In addition, the third example embodiment includes a function of determining whether values other than 0 or 1 have been inputted as the matching target vector Y=[$y_i$, ..., $y_n$] in the matching phase.

$$y_i \in \{0, 1\} \quad (106)$$
$$\Leftrightarrow y_i(y_i - 1) = 0$$
$$\Leftrightarrow (2y_i - 1)^2 = 4y_i^2 - 4y_i + 1 = 4y_i(4y_i - 1) + 1 = 1$$

In addition, as described below, whether $x_i$=$y_i$ can be determined by using (2$y_i$−1).

$$(2x_i - 1)(2y_i - 1) = (4x_i y_i - 2x_i - 2y_i + 1) \quad (107)$$
$$= -2(x_i + y_i - 2x_i y_i) + 1$$
$$= \begin{cases} -2y_i + 1, & \text{if } x_i = 0 \\ 2y_i - 1, & \text{if } x_i = 1 \end{cases}$$
$$= \begin{cases} -2y_i + 1, & \text{if } x_i = 0 \\ 2y_i - 1, & \text{if } x_i = 1 \end{cases}$$
$$= \begin{cases} 1 & \text{if } y_i \in \{0, 1\}, x_i = y_i \\ -1 & \text{if } y_i \in \{0, 1\}, x_i \ne y_i \\ \text{others} & \text{if } y_i \notin \{0, 1\} \end{cases}$$

(2$x_i$−1)(2$y_i$−1) assumes
1 if $x_i$=$y_i$ and $y_i$ is 0 or 1;
−1 if $y_i$=0 and $x_i$=1 or if $y_i$=1 and $x_i$=0; and
a value other than 1 and −1 if $y_i$ is a value other than 0 or 1.

The count number of i where $x_i$=$y_i$ does not hold (the count number of mismatches between the elements $x_i$ and $y_i$ in the same index number of the vectors X and Y) may be set as the Hamming distance $d_H$(X, Y).

Figure 20:
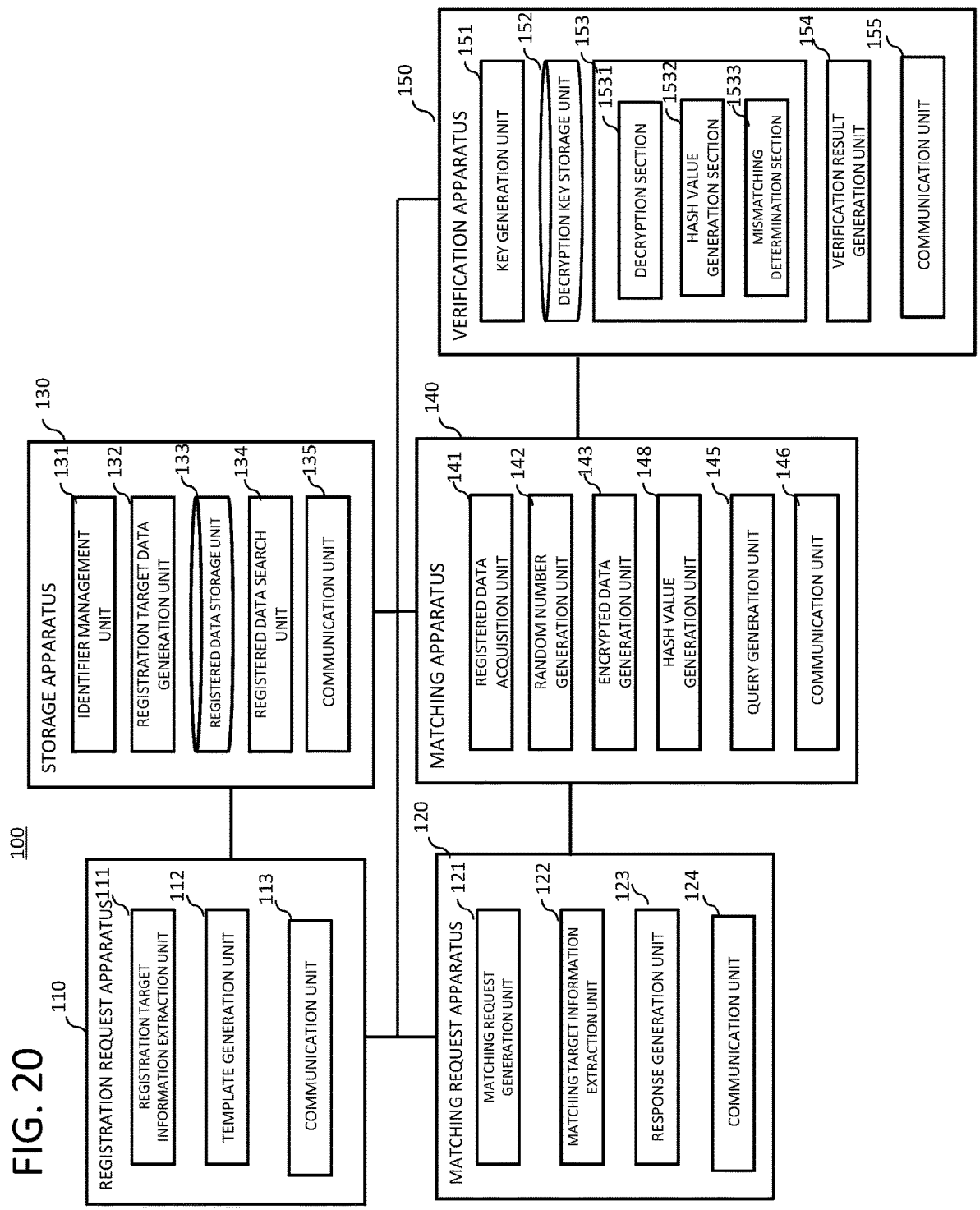
FIG. 20 is a diagram illustrating a configuration example according to a third example embodiment of the present invention.

FIG. 20 illustrates a configuration of the matching apparatus 140 and the verification apparatus 150 according to third example embodiment. The registration request apparatus 110 and the matching request apparatus 120 have the same basic configuration as that illustrated in FIG. 5. However, the processing of the individual parts differs from that according to the first example embodiment. The third example embodiment is applicable to 1:N authentication.

The matching apparatus 140 includes a hash value generation section 148 in addition to the configuration illustrated in FIG. 5.

On reception of a matching request from the matching request apparatus 120, the registered data acquisition unit 141 in the matching apparatus 140 receives encrypted data {Enc(pk, (2$x_i$−1))} (i=1, ..., n) stored in the storage apparatus 130 in association with the registration identifier id.

The random number generation unit 142 in the matching apparatus 140 generates random numbers $a_i$, $b_i$, and $r_i$.

The encrypted data generation unit 143 in the matching apparatus 140 transmits the encrypted data Enc(pk, $b_i$) (i=1, ..., n) of the random number $b_i$ (i=1, ..., n) to the matching request apparatus 120. The encrypted data transmitted to the matching request apparatus 120 does not depend on the registered data (template). Thus, 1:N authentication can be performed.

The response generation unit 123 in the matching request apparatus 120 generates, from Enc(pk, (2$x_i$−1)) received from the storage apparatus 130, Enc(pk, $b_i$ (2$y_i$)−1) (i=1, ..., n) transmitted from the matching request apparatus 120, and the random numbers $a_i$, $b_i$, and $r_i$, the following encrypted data.

Enc(pk,$a_i$(2$x_i$−1))(i=1, ... ,n),

Enc(pk,$b_i r_i$(2$y_i$−1))(i=1, ... ,n) (108)

The hash value generation section 148 calculates the following hash values of the products $a_i$ $b_i$ $r_i$ (mod q) of the random numbers $a_i$, $b_i$, and $r_i$(i=1, ..., n).

H($a_i b_i r_i$) (109)

The query generation unit 145 generates a query including the encrypted data Enc(pk, $a_i$ (2$x_i$−1)) and Enc(pk, $b_i$ $r_i$ (2$y_i$−1)) (i=1, ..., n), and the hash values H($a_i$ $b_i$ $r_i$) (i=1, ..., n) and transmits the query to the verification apparatus 150 via the communication unit 146. H denotes a one-way hash function. In the transmission of the encrypted data Enc(pk, $a_i$ ($2x_i-1$)) and Enc(pk, $b_i$ $r_i$ ($2y_i-1$)) (i=1, ..., n), the query generation unit 145 may shuffle the sequence relating to an index i.

A decryption section 1531 in the query determination unit 153 in the verification apparatus 150 decrypts the encrypted data Enc(pk, $a_i$ ($2x_i-1$)) and Enc(pk, $b_i$ $r_i$ ($2y_i-1$)) (i=1, ..., n) by using the secret key sk and calculates the following.

$$z_a = Dec(sk, Enc(pk, a_i(2x_i-1)))$$

$$z_b = Dec(sk, Enc(pk, b_i r_i(2y_i-1))) \tag{110}$$

In addition, a hash value generation section 1532 in the query determination unit 153 in the verification apparatus 150 calculates hash values $H(z_a z_b)$ of the products of $z_a$ and $z_b$.

A mismatching determination section 1533 in the query determination unit 153 in the verification apparatus 150 determines whether a count number of mismatched i between the calculated hash values $H(z_a z_b)$ and the hash values $H(a_i b_i r_i)$ received from the matching apparatus 140 is less than or equal to t.

If the count number of mismatches is less than or equal to t, the verification result generation unit 154 determines acceptance. Otherwise, the verification result generation unit 154 determines rejection.

$$z_a z_b = a_i b_i r_i (2x_i-1)(2y_i-1) \tag{111}$$

$z_a z_b = a_i b_i r_i$, if $y_i$ is 0 or 1 and $y_i = x_i$;
$z_a z_b = -a_i b_i r_i$, if $y_i$ is 0 or 1 and $y_i \neq x_i$; and
$Z_a z_b$ is a value other than $a_i b_i r_i$ or $-a_i b_i r_i$, if $y_i$ is a value other than 0 or 1.

Thus, if the following relationship holds, $$H(z_a z_b) = H(a_i b_i r_i) \tag{112}$$

$y_i = x_i$ and $y_i = 0$ or 1.
A case in which the following relationship does not hold (hash value $H(z_a z_b) \neq H(a_i b_i r_i)$) is a case in which, while $y_i$ is 0 or 1, $y_i$ is not equal to $x_i$ or $y_i$ is a value other than 0 or 1. Thus, when the count number of mismatches in the above Expression (112) regarding i=1, ..., n is less than or equal to the threshold t, acceptance is determined.

Even when the product $a_i b_i r_i$ of the random numbers generated by the matching apparatus 140 are encrypted by using the public key pk and encrypted data of the product $a_i b_i r_i$ is transmitted to the verification apparatus 150, the verification apparatus 150 can decrypt the products by using the secret key sk. Accordingly, the hash value of $a_i b_i r_i$ is transmitted to the verification apparatus 150. It is difficult to reversely calculate an input u from a hash value v(v=H(u)). Thus, even when an attacker attempts eavesdropping, the attacker cannot read the content.

Figure 21:
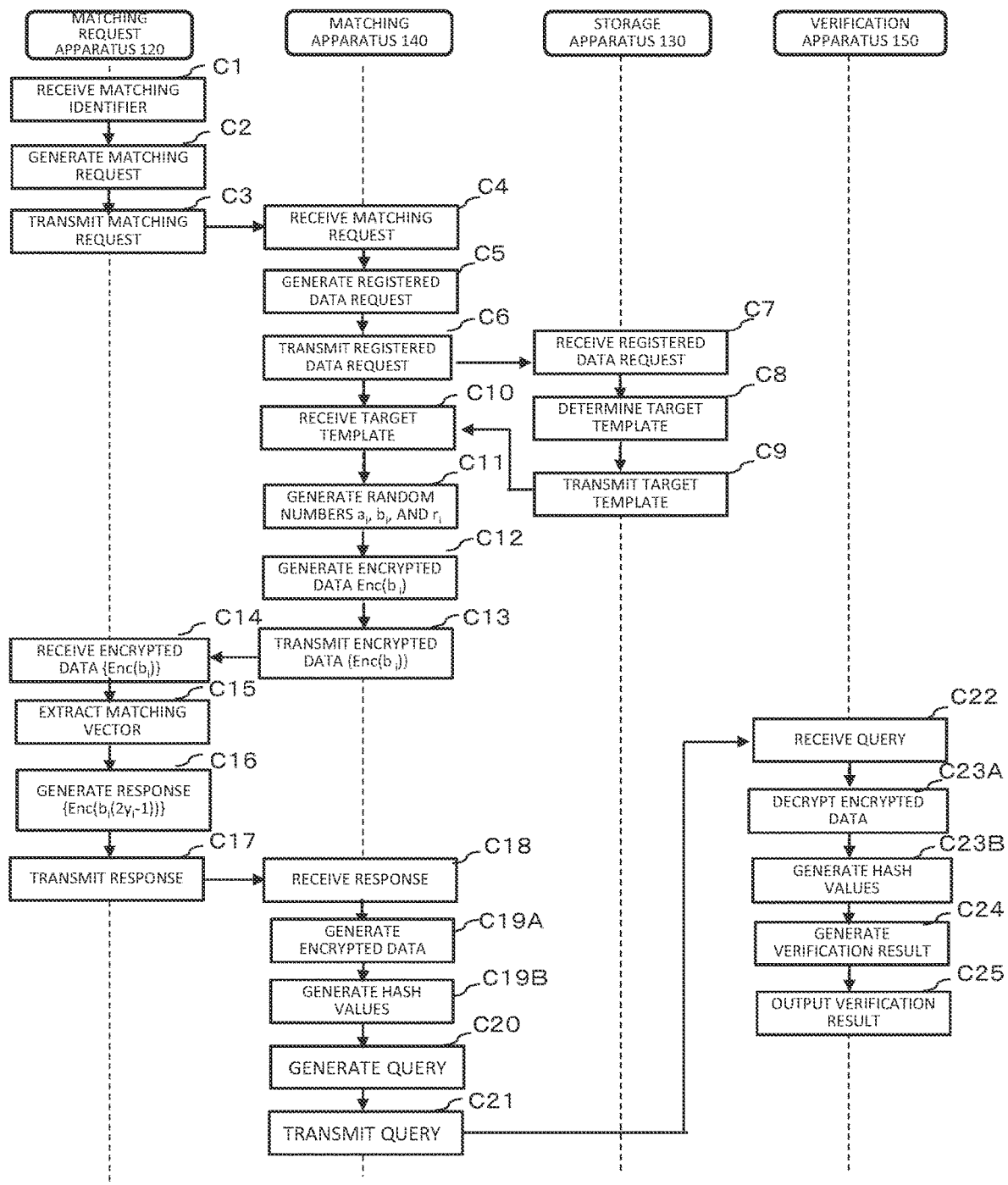
FIG. 21 is a diagram illustrating a matching phase according to the third example embodiment of the present invention.

FIG. 21 illustrates the processing in the matching phase according to the third example embodiment. On reception of a matching request from the matching request apparatus 120 (C4), the registered data acquisition unit 141 in the matching apparatus 140 receives the encrypted data Enc(pk, ($2x_i-1$)) (i=1, ..., n) stored in association with the corresponding Id from the storage apparatus 130 (C4 to C10). The random number generation unit 142 in the matching apparatus 140 generates the random numbers $a_i$, $b_i$, and $r_i$ (C11).

The encrypted data generation unit 143 in the matching apparatus 140 generates encrypted data Enc(pk, $b_i$) (i=1, ..., n) of the random numbers $b_i$ (i=1, ..., n) (C12) and transmits the encrypted data to the matching request apparatus 120 (C13).

The matching request apparatus 120 receives Enc(pk, $b_i$) (i=1, ..., n) from the matching apparatus 140 (C14) and extracts the matching target vector $$Y = [y_1, \ldots, y_n] \in \{0,1\}^n$$

(C15). The response generation unit 123 performs a scalar operation using Enc(pk, $b_i$) (i=1, ..., n) received from the matching apparatus 140 to calculate Scl($2y_i-1$, Enc($b_i$))= Enc($b_i$ ($2y_i-1$)) (i=1, ..., n) (C16). The matching request apparatus 120 transmits Enc(pk, $b_i$ ($2y_i-1$)) (i=1, ..., n) to the matching apparatus 140 (C17).

The matching apparatus 140 receives Enc(pk, $b_i$ ($2y_i-1$)) (i=1, n) (C18) and generates $$Enc(pk, a_i(2x_i-1))(i=1,\ldots,n) \text{ and}$$

Enc(pk, $b_i$ $r_i$ ($2y_i-1$)) (i=1, ..., n) from Enc(pk, ($2x_i-1$)) received from the storage apparatus 130, Enc(pk, $b_i$ ($2y_i-1$)) (i=1, ..., n) transmitted from the matching request apparatus 120, and the random numbers $a_i$, $b_i$, and $r_i$ (C19A). The hash value generation section 148 calculates the hash values $H(a_i b_i r_i)$ of the product $a_i b_i r_i$ (mod q) of the random numbers $a_i$, $b_i$, and $r_i$ (i=1, ..., n) (C19B).

The query generation unit 145 generates a query including the encrypted data Enc(pk, $a_i(2x_i-1)$) and Enc(pk, $b_i$ $r_i$ ($2y_i-1$)) (i=1, ..., n) and the hash values $H(a_i b_i r_i)$ (i=1, ..., n) (C20) and transmits the query to the verification apparatus 150 via the communication unit 146 (C21). H denotes a one-way hash function.

When the communication unit 155 in the verification apparatus 150 receives the query, the decryption section 1531 in the query determination unit 153 decrypts the encrypted data Enc(pk, $a_i$ ($2x_i-1$)) and Enc(pk, $b_i$ $r_i$ ($2y_i-1$)) (i=1, ..., n) by using the secret key sk (C23A). That is, the decryption section 1531 in the query determination unit 153 calculates $$z_a = Dec(sk, Enc(pk, a_i(2x_i-1))), \text{ and}$$

$$Zb = Dec(sk, Enc(pk, b_i r_i(2y_i-1))).$$

Next, the hash value generation section 1532 in the query determination unit 153 in the verification apparatus 150 calculates a hash value $H(z_a z_b)$ of a product of $z_a$ and $z_b$ (C23B).

The mismatching determination section 1533 in the query determination unit 153 in the verification apparatus 150 determines whether a count number of mismatches i between the calculated hash value $H(z_a z_b)$ and the hash values $H(a_i b_i r_i)$ received from the matching apparatus 140 is less than or equal to t. If the count number of mismatches is less than or equal to t, the verification result generation unit 154 determines acceptance. Otherwise, the verification result generation unit 154 determines rejection (C24). Next, the verification result generation unit 154 outputs the verification result (C25).

FIG. 22 illustrates an operation sequence according to the third example embodiment. The registration request apparatus 110 extracts the registration target vector $X=[x_1, \ldots, x_n]$, transmits the encrypted data Enc(pk, ($2x_i-1$)) (i=1, ..., n) of an operation result ($2x_i-1$) of the elements $\{x_i\}$ (i=1, ..., n) to the storage apparatus 130 (S31). The storage apparatus 130 stores the encrypted data in association with a registration identifier Id.

On reception of a matching request from the matching request apparatus 120 (S32), the matching apparatus 140 receives the encrypted data Enc(pk, ($2x_i-1$)) (i=1, ..., n) stored in association with the Id from the storage apparatus 130 (S33).

The matching apparatus 140 generates random numbers $a_i$, $b_i$, and $r_i$ (S34). The matching apparatus 140 transmits encrypted data Enc(pk, $b_i$) (i=1, . . . , n) of the random numbers $b_i$ (i=1, . . . , n) to the matching request apparatus 120 (S35).

The matching request apparatus 120 extracts the matching target vector Y=[$y_i$, . . . , $y_n$], calculates Enc($b_i(2y_i-1)$) (i=1, . . . , n) from Enc(pk, $b_i$) (i=1, . . . , n) received from the matching apparatus 140, and transmits the encrypted data to the matching apparatus 140 (S36).

The matching apparatus 140 generates encrypted data $$\mathrm{Enc}(pk, a_i(2x_i-1))(i=1,\ldots,n) \text{ and}$$

Enc(pk, $b_i$ $r_i$ ($2y_i-1$)) (i=1, . . . , n) from Enc(pk, $b_i(2y_i-1)$) (i=1, . . . , n) transmitted from the matching request apparatus 120, the encrypted data Enc(pk, ($2x_i-1$)) transmitted from the storage apparatus 130, and the random numbers $a_i$, $b_i$, and $r_i$.

The matching apparatus 140 also generates hash values H($a_i$ $b_i$ $r_i$). The matching apparatus 140 transmits these data to the verification apparatus 150 (S37).

The verification apparatus 150 decrypts the encrypted data Enc(pk, $a_i$ ($2x_i-1$)) and Enc(pk, $b_i$ $r_i$ ($2y_i-1$)) by using the secret key sk and calculates a hash value H($z_a$ $z_b$) of a product of the decryption results $z_a$ and $z_b$ (S38A).

The verification apparatus 150 determines whether a count number of mismatches i between the calculated hash value H($z_a$ $z_b$) and the hash values H($a_i b_i r_i$) received from the matching apparatus 140 is less than or equal to t (S38B). If the count number of mismatches is less than or equal to t, the verification apparatus 150 determines acceptance. Otherwise, the verification apparatus 150 determines rejection. Next, the verification apparatus 150 outputs the detection result (acceptance/rejection) (S39).

<Variation 1>

FIG. 23 is a diagram illustrating an operation sequence according to variation 1 of the third example embodiment. The registration request apparatus 110 extracts a registration target vector X=[$x_1$, . . . , $x_n$] and transmits encrypted data Enc(pk, $x_i$) (i=1, . . . , n) of elements {$x_i$} (i=1, . . . , n) to storage apparatus 130 (S31). The storage apparatus 130 stores the encrypted data in association with a registration identifier Id.

On reception of a matching request from the matching request apparatus 120 (S32), the matching apparatus 140 receives the encrypted data Enc(pk, $x_i$) (i=1, . . . , n) stored in association with the Id from the storage apparatus 130 (S33).

The matching apparatus 140 generates random numbers $a_i$, $b_i$, and $r_i$(S34). The matching apparatus 140 calculates Enc(pk, $2x_i-1$) (i=1, . . . , n) with the encrypted data Enc(pk, $x_i$) (i=1, . . . , n) being kept in an encrypted state. The matching apparatus 140 transmits the encrypted data Enc (pk, $b_i$) (i=1, . . . , n) of the random numbers $b_i$(i=1, . . . , n) to the matching request apparatus 120 (S35).

The matching request apparatus 120 extracts a matching target vector Y=[$y_i$, . . . , $y_n$], calculates Enc(pk, $b_i y_i$) (i=1, . . . , n) from Enc(pk, $b_i$) (i=1, . . . , n) received from the matching apparatus 140, and transmits the calculated encrypted data to the matching apparatus 140 (S36).

The matching apparatus 140 receives Enc(pk, $b_i$ $y_i$) (i=1, . . . , n) from the matching request apparatus 120 and generates Enc(pk, $b_i(2yi-1)$) (i=1, . . . , n) with Enc(pk, $b_i y_i$) being kept in an encrypted state. The matching apparatus 140 generates Enc(pk, $a_i$ ($2x_i-1$)) (i=1, . . . , n) from Enc(pk, ($2x_i-1$)) and the random numbers $a_i$ and generates Enc(pk, $b_i$ $r_i(2y_i-1)$) (i=1, . . . , n) from Enc(pk, $b_i(2y_i-1)$) and the random number $r_i$.

The matching apparatus 140 generates and transmits hash values H($a_i$ $b_i$ $r_i$) to the verification apparatus 150 (S37). The matching request apparatus 120 may extract a matching target vector Y=[y1, . . . , yn], generate Enc(pk, bi($2yi-1$)) (i=1, . . . , n) from Enc(pk, $b_i$) (i=1, . . . , n) received from the matching apparatus 140, and transmit the generated encrypted data to the matching apparatus 140.

The verification apparatus 150 decrypts the encrypted data Enc(pk, $a_i$ ($2x_i-1$)) and Enc(pk, $b_i$ $r_i(2y_i-1)$) by using the secret key sk and calculates a hash value H($z_a$ $z_b$) of a product of the decryption result $z_a$ and $z_b$ (S38A).

The verification apparatus 150 determines whether a count number of mismatches i between the calculated hash values H($z_a$ $z_b$) and the hash values H($a_i$ $b_i$ $r_i$) received from the matching apparatus 140 is less than or equal to t (S38B). If the count number of mismatches is less than or equal to t, the verification apparatus 150 determines acceptance. Otherwise, the verification apparatus 150 determines rejection. Next, the verification apparatus 150 outputs the detection result (acceptance/rejection) (S39).

<Variation 2>

In the variation 1 of the third example embodiment, on reception of the encrypted data Enc(pk, $x_i$) (i=1, . . . , n) from the storage apparatus 130, the matching apparatus 140 calculates Enc(pk, $2x_i-1$) (i=1, . . . , n) with the encrypted data Enc(pk, $x_i$) (i=1, . . . , n) being kept in an encrypted state. In variation 2, the storage apparatus 130, on reception of the encrypted data Enc(pk, $x_i$) (i=1, . . . , n) of the elements {$x_i$} (i=1, . . . , n) from the registration request apparatus 110 which extract the registration target vector X=[$x_1$, . . . , $x_n$], may be configured to calculate Enc(pk, $2x_i-1$) (i=1, . . . , n) with the encrypted data Enc(pk, $x_i$) (i=1, . . . , n) being kept in an encrypted state and store the calculated encrypted data in the registered data storage unit 133.

<Variation 3>

In variation 3 of the third example embodiment, a function of checking whether individual data $x_i$ (i=1, . . . , n) of the registration target vector X=[$x_1$, . . . , $x_n$] is $x_i \in \{0, 1\}$ may be implemented.

Figure 24:
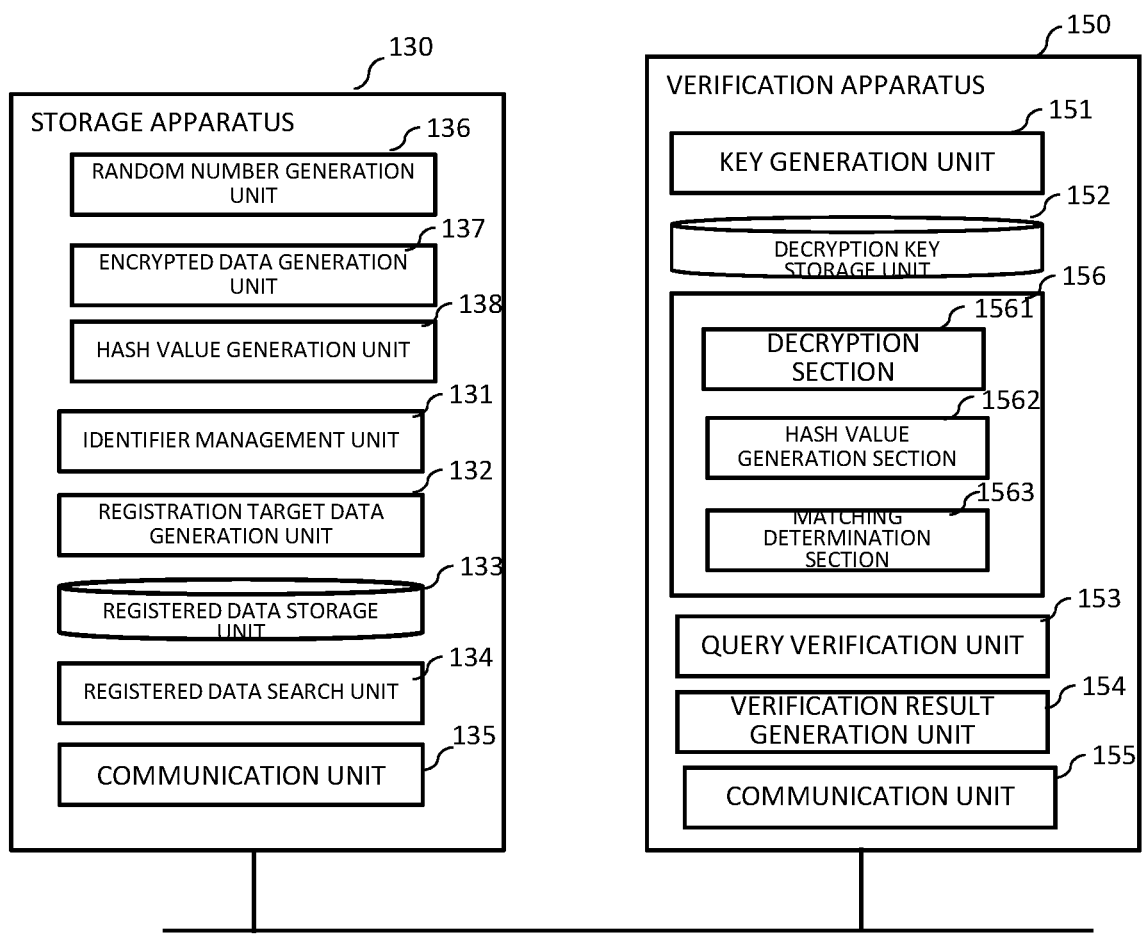
FIG. 24 is a diagram illustrating a configuration according to variation 2 of the third example embodiment of the present invention.

FIG. 24 is a diagram illustrating a variation of the third example embodiment. Referring to FIG. 24, the storage apparatus 130 further includes, in addition to the configuration of the storage apparatus 130 in FIG. 5, a random number generation unit 136, an encrypted data generation unit 137, and a hash value generation section 138.

The verification apparatus 150 includes a registered data check unit 156 including a decryption section 1561, a hash value generation section 1562, and a matching determination section 1563.

FIG. 25 is a diagram illustrating an operation sequence in the registration phase according to the variation. The registration request apparatus 110 calculates ($2x_i-1$), . . . , ($2x_1-1$) from the binary vector $$X=[x_1,\ldots,x_n]\in\{0,1\}^n$$

calculates ($2x_i-1$), . . . , ($2x_1-1$) and by using the public key pk, calculates encrypted data (first templates)

$$\mathrm{Enc}(pk,(2x_i-1)),\ldots,\mathrm{Enc}(pk,(2x_1-1)) \qquad (113)$$

and transmits the encrypted data (first templates) to the storage apparatus 130 (S31).

The random number generation unit 136 in the storage apparatus 130 generates random numbers $c_1, \ldots, c_n$ (S31A).

The encrypted data generation unit 137 in the storage apparatus 130 performs a scalar operation Scl(ci, Enc(pk, (2xi−1))) to generate the following encrypted data.

$$\text{Enc}(pk,c_1(2x_1-1)), \ldots, \text{Enc}(pk,c_1(2x_n-1)) \quad (114)$$

The hash value generation section 138 in the storage apparatus 130 calculates hash values $H(c_1\hat{\ }2), \ldots, H(c_n\hat{\ }2)$ by using a hash function H. The storage apparatus 130 transmits Enc(pk, c1(2$x_i$−1)), … Enc(pk, cn(2$x_n$−1)) and the hash values $H(c_1\hat{\ }2), \ldots, H(c_n\hat{\ }2)$ to the verification apparatus 150 via the communication unit 135 (S31B).

The decryption section 1561 in the verification apparatus 150 decrypts Enc(pk, $c_n$ (2$x_i$−1)) (i=1, . . . , n) by using the secret key sk (S31C).

$$z_i = \text{Dec}(sk, \text{Enc}(pk, c_i(2x_i-1))) = c_i(2x_i-1)(i=1,\ldots,n) \quad (115)$$

Next, the hash value generation section 1562 in the verification apparatus 150 calculates hash values $H(z_i\hat{\ }2)$ (i=1, . . . , n).

The matching determination section 1563 in the verification apparatus 150 determines whether the following holds, for all i from i=1 to n.

$$H(z_i\hat{\ }2) = H(c_i\hat{\ }2) \quad (116)$$

If the above relationship holds, the matching determination section 1563 determines acceptance. If there is any i that does not satisfy $H(z_i\hat{\ }2) = H(c_i\hat{\ }2)$, the matching determination section 1563 determines rejection (S31D).

The verification apparatus 150 notifies the storage apparatus 130 of the verification result (S31E).

If the verification result determined by the verification apparatus 150 is "acceptance" (Yes in S31F), the storage apparatus 130 stores Enc(pk, (2$x_1$−1)), . . . , Enc(pk, (2$x_n$−1)) in the registered data storage unit 133 in association with a registration identifier id (S31G).

The decryption section 1561 and the hash value generation section 1562 may commonly be used as the decryption section 1531 and the hash value generation section 1532 in the query determination unit 153.

Regarding $z_i = c_i$ (2$x_i$−1) (i=1, . . . , n), $$z_i = -c_i \text{ if } x_i \text{ is } 0,$$

$$z_i = c_i \text{ if } x_i \text{ is } 1 \quad (117)$$

Thus, when $x_i \in \{0,1\}$, the hash values satisfy $H(z_i\hat{\ }2) = H(c_i\hat{\ }2)$. When $H(z_1\hat{\ }2) = H(c_1\hat{\ }2), \ldots, H(z_n\hat{\ }2) = H(c_n\hat{\ }2)$, the verification apparatus 150 determines acceptance. In this case, the storage apparatus 130 stores Enc(pk, (2x1−1)), . . . , Enc(pk, (2xn−1)) in the registered data storage unit in association with a registration identifier id.

In contrast, when $x_i$ is not 0 or 1, $z_i = c_i$ (2$x_i$−1) is a value other than +$c_i$ or −$c_i$.

$$H(z_i^2) \neq H(c_i^2)$$

As a result, the verification apparatus 150 determines rejection.

The subsequent processing in the matching phase is the same as that described with reference to FIG. 16.

The registration request apparatus 110 may generate Enc (pk, $x_1$), . . . , Enc(pk, $x_n$) from the binary vector $X = [x_1, \ldots, x_n] \in \{0,1\}^n$ and transmit the encrypted data to the storage apparatus 130. The storage apparatus 130 may calculate Enc(pk, (2$x_1$−1)), . . . , Enc(pk, (2$x_n$−1)), generate random numbers c1, . . . , cn, and generate Enc(pk, $c_1$(2$x_i$−1)), . . . Enc(pk, $c_n$(2$x_n$−1)) from a scalar operation Scl($c_i$, Enc(pk, (2$x_i$−1))). In this case, also in the first example embodiment, whether the individual data xi (i=1, . . . , n) of the registration target vector X=[$x_1, \ldots, x_n$] is $x_i \in \{0,1\}$ can be checked.

According to the third example embodiment, the verification apparatus calculates a product of messages obtained by decrypting ciphertexts. Thus, encryption in which a product of decrypted values is not defined cannot be used. For example, the Modified-Elgamal encryption in which the decryption algorithm outputs Dec(sk, Enc(pk, m))=g^m, not messages, or the ECElgamal encryption in which the decryption algorithm outputs Dec(sk, Enc(pk, m))=m(*)G, not messages, cannot be used. In the message space Fq in the Modified-Elgamal encryption and the ECElgamal encryption and the message space in the Paillier encryption, a product is defined on $Z_N = \{0, 1, \ldots, N-1\}$. Thus, when the decryption algorithm outputs a message, the decryptor only needs to determine whether the decrypted value matches any one of 0, 1, 2, 3, . . . , and t. However, in the Modified-Elgamal encryption and ECElgamal encryption, generally, it is difficult to configure a decryption algorithm that outputs a message.

The first and second example embodiment can handle binary vectors as biometric information, have resistance against spoofing attacks, and do not need somewhat homomorphic encryption or pairing calculation. The above PTLs 2 and 3 are problematic in resistance against spoofing attacks and need somewhat homomorphic encryption or pairing calculation. In addition, PTL 5 is problematic in resistance against spoofing attacks and needs somewhat homomorphic encryption or pairing calculation.

The third example embodiment can handle binary vectors as biometric information and have resistance against spoofing attacks. In addition, the third example embodiment does not need somewhat homomorphic encryption or pairing calculation and is applicable to 1:N authentication.

Fourth Example Embodiment

A fourth example embodiment of the present invention will be described. The basic configuration according to the fourth example embodiment of the present invention is the same as that in FIG. 20 according to the third example embodiment. While in the third example embodiment, an additive homomorphic encryption scheme is used, in the fourth example embodiment, for example, a multiplicative homomorphic encryption scheme such as ElGamal encryption or RSA encryption is used.

In the key generation in ElGamal encryption, a generator g corresponding to a group G (multiplicative group $Z^*_q$) whose order q (the bit number is a security parameter k) is a prime is selected. In addition, x is selected from $\{0, 1, \ldots, q-1\}$, where h=g^x. Next, (h, g, q) is used as a public key, and x is used as a secret key. In the encryption, a random number r is randomly selected from $\{0, 1, \ldots, q-1\}$ for a plaintext m, and $$c_1 = g\hat{\ }r \mod q \text{ and}$$

$$c_2 = m \cdot h\hat{\ }r \mod q$$

are calculated to obtain ciphertexts ($c_1$, c2).

In the decryption, m=$c_2$ ($c_1$^x)^(−1) is set for the received ciphertexts. Herein, the ciphertexts of plaintexts $m_1, m_2 \in G$ are as follows.

$$\text{Enc}(pk, m_1) = (g\hat{\ }r_1, m_1 \cdot h\hat{\ }r_1),$$

$$\text{Enc}(pk, m_2) = (g\hat{\ }r_2, m_2 \cdot h\hat{\ }r_2)$$

Multiplication of these two ciphertexts gives $$(g\hat{\ }(r_1+r_2), (m_1 \times m_2) h\hat{\ }(r_1+r_2)) = \text{Enc}(pk, m_1 \times m_2).$$

Thus, the following holds.

$$\text{Enc}(pk, (m_1 \times m_2)) = \text{Enc}(pk, m_1) \times \text{Enc}(pk, m_2).$$

In the RSA encryption, a suitable positive integer e is selected, two large primes {p, q} are generated, and the public key {e, n} is generated by using a product n (=pq) and e. In addition, in the RSA encryption, d=e^(−1) (mod(p−1)(q−1)) is used as the secret key. The encryption of a plaintext m is given as $c = m\hat{\ }e \bmod n,$ while the decryption is given as $m = c\hat{\ }d \bmod n.$ When the two ciphertexts $\text{Enc}(pk, m_1) = m_1\hat{\ }e \bmod n$ and $\text{Enc}(pk, m_2) = m_2\hat{\ }e \bmod n$ of the two plaintexts $m_1, m_2 \in Z^*_n$ are multiplied by each other, $(m_1 \times m_2)\hat{\ }e \bmod n = \text{Enc}(pk, (m_1 \times m_2)).$ Thus, the following holds.

$\text{Enc}(pk, (m_1 \times m_2)) = \text{Enc}(pk, m_1) \times \text{Enc}(pk, m_2).$ As illustrated in FIG. 20, according to the fourth example embodiment, when the matching apparatus 140 receives a matching request from the matching request apparatus 120, the registered data acquisition unit 141 receives the encrypted data $\{\text{Enc}(pk, (2x_i-1))\}$ (i=1, ..., n) stored in association with the corresponding registration identifier id from the storage apparatus 130.

The random number generation unit 142 in the matching apparatus 140 generates random numbers $a_i$ and $b_i$.

The encrypted data generation unit 143 in the matching apparatus 140 transmits encrypted data $\text{Enc}(pk, b_i)$ (i=1, ..., n) obtained by encrypting the random numbers $b_i$ (i=1, ..., n) by using the public key pk to the matching request apparatus 120 (S45). The encrypted data transmitted to matching request apparatus 120 does not depend on the registered data (templates). Thus, 1:N authentication can be performed.

The response generation unit 123 in the matching request apparatus 120 encrypts the operation results $(2y_i-1)$ of the elements $\{y_i\}$ of the matching target vector $Y=[y_1, ..., y_n]$ by using the public key pk to generate $\text{Enc}(pk, (2y_i-1))$ (i=1, ..., n). The response generation unit 123 in the matching request apparatus 120 multiplies $\text{Enc}(pk, b_i)$ received from the matching apparatus 140 by $\text{Enc}(pk, (2y_i-1))$ (i=1, ..., n) with these encrypted data kept in an encrypted state (multiplicative homomorphic encryption) to generate $\text{Enc}(pk, b_i(2y_i-1))$. Next, the matching request apparatus 120 transmits $\text{Enc}(pk, b_i(2y_i-1))$ to the matching apparatus 140.

The matching apparatus 140 obtains encrypted data $\text{Enc}(pk, a_i)$ (i=1, ..., n) by encrypting the random numbers $a_i$ (i=1, ..., n) by using the public key pk and generates the following formula (118) from $\text{Enc}(pk, (2x_i-1))$ and $\text{Enc}(pk, b_i(2y_i-1))$ from the matching request apparatus 120 by using multiplicative homomorphic encryption.

$$\text{Enc}(pk, a_i b_i (2x_i-1)(2y_i-1))(i=1,\ldots,n) \quad (118)$$

The hash value generation section 148 calculates a hash value of the products $a_i b_i$ (mod q) of the random numbers $a_i$ and $b_i$ (i=1, ..., n) as expressed by $$H(a_i b_i) \quad (119)$$

The query generation unit 145 generates a query including the encrypted data $\text{Enc}(pk, a_i b_i (2x_i-1)(2y_i-1))$ (i=1, ..., n) and the hash values $H(a_i b_i)$ (i=1, ..., n) and transmits the query to the verification apparatus 150 via the communication unit 146 (S47). H denotes a one-way hash function. In the transmission of the encrypted data $\text{Enc}(pk, a_i b_i (2x_i-1)(2y_i-1))$ (i=1, ..., n), the query generation unit 145 may shuffle the sequence relating to the index i.

The decryption section 1531 in the query determination unit 153 in the verification apparatus 150 decrypts the encrypted data $\text{Enc}(pk, aa_i b_i (2x_i-1)(2y_i-1))$ (i=1, ..., n) by using the secret key sk.

$$z_i = \text{Dec}(sk, \text{Enc}(pk, a_i b_i (2x_i-1)(2y_i-1)))(i=1,\ldots,n) \quad (120)$$

The hash value generation section 1532 in the query determination unit 153 in the verification apparatus 150 further calculates hash values $H(z_i)$ (i=1, ..., n) of $z_i$.

The mismatching determination section 1533 in the query determination unit 153 in the verification apparatus 150 determines whether a count number of mismatched i between the calculated hash values $H(z_i)$ (i=1, ..., n) and the hash values $H(a_i b_i)$ received from the matching apparatus 140 is less than or equal to t.

If the count number of mismatches is less than or equal to t, the verification result generation unit 154 determines acceptance. Otherwise, the verification result generation unit 154 determines rejection.

$$z_i = a_i b_i (2x_i-1)(2y_i-1) \quad (121)$$

where $z_i = a_i b_i$, if $y_i$ is 0 or 1 and $y_i = x_i$;
$z_i = -a_i b_i$, if $y_i$ is 0 or 1 and $y_i \neq x$; and
$z_i$ is a value other than $a_i b_i$ or $-a_i b_i$, if $y_i$ is a value other than 0 or 1.
Thus, when the following holds $$H(z_i) = H(a_i b_i) \quad (122)$$

$y_i = x_i$ and $y_i = 0$ or 1.
Otherwise (hash values $H(z) \neq H(a_i b_i)$), while $y_i$ is 0 or 1, $y_i \neq x_i$ or $y_i$ is a value other than 0 or 1.
When the count number of mismatches with $x_i$ is less than or equal to t, the verification result generation unit 154 determines acceptance.

FIG. 26 is a diagram illustrating an operation sequence according to the fourth example embodiment. The registration request apparatus 110 extracts the registration target vector $X = [x_1, ..., x_n]$, transmits encrypted data $\text{Enc}(pk, (2x_i-1))$ (i=1, ..., n) of an operation result $(2x_i-1)$ of elements $\{x_i\}$ (i=1, ..., n) to the storage apparatus 130 (S41), and stores the encrypted data in the storage apparatus 130 in association with a registration identifier Id.

On reception of a matching request from the matching request apparatus 120 (S42), the matching apparatus 140 receives the encrypted data $\text{Enc}(pk, (2x_i-1))$ (i=1, ..., n) stored in association with the Id from the storage apparatus 130 (S43).

The matching apparatus 140 generates random numbers $a_i$ and $b_i$ (S44). The matching apparatus 140 transmits encrypted data $\text{Enc}(pk, b_i)$ (i=1, ..., n) of the random numbers $b_i$ (i=1, ..., n) to the matching request apparatus 120 (S45).

The matching request apparatus 120 extracts a matching target binary vector $Y = [y_1, ..., y_n]$, obtains encrypted data $\text{Enc}(pk, (2y_i-1))$ (i=1, ..., n) of an operation results $(2y_i-1)$ of individual elements $\{y_i\}$, and calculates $\text{Enc}(pk, b_i(2y_i-1))$ (i=1, ..., n) based on the $\text{Enc}(pk, b_i)$ (i=1, ..., n) received from the matching apparatus 140 and $\text{Enc}(pk, (2y_i-1))$ (i=1, ..., n), and transmits the calculated encrypted data to the matching apparatus 140 (S46).

The matching apparatus 140 generates Enc(pk, $a_i b_i (2x_i-1)(2y_i-1)$) (i=1, ..., n) based on Enc(pk, $b_i(2y_i-1)$) (i=1, ..., n) received from the matching request apparatus 120, Enc(pk, $(2x_i-1)$) received from the storage apparatus 130, and the random numbers $a_i$, $b_i$ and generates hash values $H(a_i b_i)$ for transmission to the verification apparatus 150 (S47).

The verification apparatus 150 decrypts the encrypted data Enc(pk, $a_i b_i r(2x_i-1)(2y_i-1)$) by using the secret key sk and calculates a hash value $H(z_i)$ based on the decryption result $z_i$ (S48A).

The verification apparatus 150 determines whether a count number of mismatched i between the calculated hash values $H(z_i)$ and the hash values $H(a_i b_i)$ received from the matching apparatus 140 is less than or equal to t (S48B). If the count number of mismatches is less than or equal to t, the verification apparatus 150 determines acceptance. Otherwise, the verification apparatus 150 determines rejection. Next, the verification apparatus 150 outputs the detection result (acceptance/rejection) (S49).

<Variation 1>

As in variation 3 of the third example embodiment, according to the fourth example embodiment, a function of checking whether the individual elements $\{x_i\}$ (i=1, ..., n) of the registration target vector $X=[x_1, \ldots, x_n]$ is $x_i \in \{0, 1\}$ may be implemented. The configuration according to a variation of the fourth example embodiment is the same as that of the storage apparatus 130 and the verification apparatus 150 in FIG. 24. According to variation 1 of the fourth example embodiment, for example, a multiplicative homomorphic scheme such as RSA encryption or ElGamal encryption may be used.

FIG. 27 illustrates an operation sequence of the registration phase in this variation. While the sequence in FIG. 27 is the same as that in FIG. 25, the encrypted data operation processing differs in that a multiplicative homomorphic scheme is used. The registration request apparatus 110 calculates $(2x_i-1), \ldots, (2x_n-1)$ from the registration binary vector $X=[x_1, \ldots, x_n] \in \{0,1\}^n$ and transmits the following data (first templates) obtained by encrypting $(2x_i-1), \ldots, (2x_n-1)$ by using the public key pk to the storage apparatus 130 (S41).

$$\text{Enc}(pk,(2x_1-1)), \ldots, \text{Enc}(pk,(2x_n-1)) \qquad (123)$$

The random number generation unit 136 in the storage apparatus 130 generates random numbers $c_1, \ldots, c_n$ (S41A).

The encrypted data generation unit 137 in the storage apparatus 130 generates based on encrypted data Enc(pk, ci) (i=1, ..., n) obtained by encrypting the random numbers $c_1, \ldots, c_n$ by using the public key pk and Enc(pk, $(2x_i-1)$) (i=1, ..., n), generates the following encrypted data.

$$\text{Enc}(pk,c_1(2x_1-1)), \ldots, \text{Enc}(pk,c_n(2x_n-1)) \qquad (124)$$

The hash value generation section 138 in the storage apparatus 130 calculates hash values $H(c_1^2), \ldots, H(c_n^2)$ by using a hash function H. The storage apparatus 130 transmits Enc(pk, $c1(2x_1-1)), \ldots,$ Enc(pk, $cn(2x_n-1)$) and the hash values $H(c_1^2), \ldots, H(c_n^2)$ to the verification apparatus 150 via the communication unit 135 (S41B).

The decryption section 1561 in the verification apparatus 150 decrypts Enc(pk, $c_n (2x_i-1)$) (i=1, ..., n) by using the secret key sk (S41C).

$$z_i = \text{Dec}(sk, \text{Enc}(pk, c_i(2x_i-1))) = c_i(2x_i-1)(i=1, \ldots, n) \qquad (125)$$

Next, the hash value generation section 1562 in the verification apparatus 150 calculates hash values $H(z_i^2)$ (i=1, ..., n).

If the following relationship holds for all i=1, ..., n, the matching determination section 1563 in the verification apparatus 150 determines acceptance.

$$H(z_i^2) = H(c_i^2) \qquad (126)$$

If there is any i that does not satisfy $H(z_i^2)=H(c_i^2)$, the matching determination section 1563 in the verification apparatus 150 determines rejection (S41D).

The verification apparatus 150 notifies the storage apparatus 130 of the verification result (S41E).

If the verification apparatus 150 determines "acceptance" as the verification result (Yes in S41F), the storage apparatus 130 stores Enc(pk, $(2x_1-1)), \ldots,$ Enc(pk, $(2x_1-1)$) in the registered data storage unit 133 in association with a registration identifier id (S41G).

The decryption section 1561 and the hash value generation section 1562 may commonly be used as the decryption section 1531 and the hash value generation section 1532 in the query determination unit 153.

$z_i=c_i (2x_i-1)$ (i=1, ..., n) takes a value of $-c_i$, if $x_i$ is 0, while $c_i$ if $x_i$ is 1, \qquad (127)

Thus, when $x_i \in \{0,1\}$, the following relationship (128) is satisfied.

$$\text{hash values } H(z_i^2) = H(c_i^2) \qquad (128)$$

That is, when $H(z_1^2)=H(c_1^2), \ldots, H(z_n^2)=H(c_n^2)$ holds, the verification apparatus 150 determines acceptance. In this case, the storage apparatus 130 stores Enc(pk, $(2x1-1)), \ldots,$ Enc(pk, $(2xn-1)$) in the registered data storage unit in association with the registration identifier id. In contrast, when xi is not 0 or 1, $z_i=c_i (2x_i-1)$ is a value other than $+c_i$ and $-c_i$. Namely, since $H(z_i^2) \neq H(c_i^2)$, the verification apparatus 150 determines rejection.

<Variation 2>

According to the fourth example embodiment, for example, when the verification apparatus 150 is able to acquire communication contents in steps S45 and S46 in FIG. 26, the verification apparatus 150 is able to know values of individual elements $\{yi\}$ (i=1, ..., n) of the matching target binary vector by using the secret key. Thus, according to variation 2 of the fourth example embodiment, this leakage is prevented, for example, by using the same method as that described in NPL 1. Namely, the communication between the matching apparatus 140 and the matching request apparatus 120 is encrypted as ciphertexts corresponding to a key different from the keys held by the verification apparatus 150.

For example, the secret key and the public key of ElGamal encryption are set to x and (h, g, q), respectively, and the ciphertext of a plaintext m is set to (c1, c2). (c1^t, c2) calculated for a random number t that is randomly selected from $\{0, 1, \ldots, q-1\}$ is the ciphertext of a plaintext m corresponding to a secret key x/t and a public key (h, g^t, q). When the ElGamal encryption scheme is used, the matching apparatus 140 receives a matching request from the matching request apparatus 120 (S42). Each time the matching apparatus 140 receives a matching request, the matching apparatus 140 generates a different random number t. In step S45, the matching apparatus 140 transmits the ciphertext corresponding to the public key (h, g^t, q) and the public key (h, g^t, q).

The matching request apparatus 120 transmits the ciphertext corresponding to the public key (h, g^t, q) received from the matching apparatus 140 to the matching apparatus 140 (S46).

By using t, the matching apparatus 140 can restore the ciphertext corresponding to the original public key (h, g, q) from the ciphertext received from the matching request apparatus 120 in step S46.

In the fourth example embodiment, the encryption scheme is not limited to multiplicative homomorphic encryption such as RSA encryption and ElGamal encryption. For example, a public key encryption scheme having an additive and multiplicative homomorphic property such as a somewhat homomorphic encryption scheme or C. Gentry's "Fully Homomorphic Encryption Using Ideal Lattices (see "In Symposium on Theroy of Computing—STOC 2009, ACM, 169-178, 2009) may be used.

Fifth Example Embodiment

Figure 28:
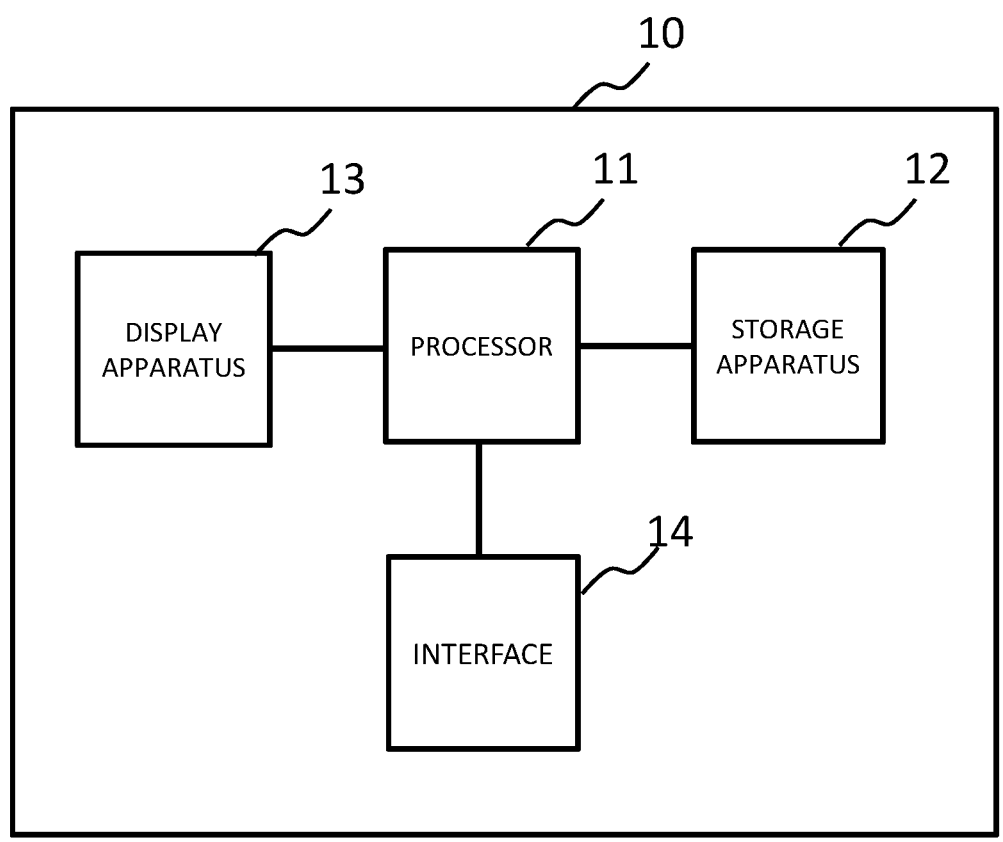
FIG. 28 is a diagram illustrating a configuration according to a fifth example embodiment of the present invention.

As illustrated in FIG. 28, the matching apparatus 140 may be implemented on a computer system. As illustrated in FIG. 28, a computer system 10 such as a server computer includes a processor (a CPU (central processing unit) or a data processing device) 11, a storage apparatus 12, a display apparatus 13, a communication interface 14. The storage apparatus 12 may include at least one of a semiconductor memory (for example, a RAM (a random access memory), a ROM (a read-only memory), an EEPROM (an electrically erasable and programmable ROM)), an HDD (hard disk drive), a CD (compact disc), a DVD (a digital versatile disc), etc. The communication interface 14 connects to and communicates with the registration request apparatus 110, the matching request apparatus 120, the storage apparatus 130, and the verification apparatus 150. The matching apparatus 140 according to each example embodiment described above may be realized by storing a program that realizes functions of the matching apparatus 140 described in each example embodiment described above in the storage apparatus 12 and causing the processor 11 to read and execute the program. Alternatively, the storage apparatus 12 and, for example, the registered data storage unit 133 in the storage apparatus 130 in FIG. 5, etc. may be configured as the same storage apparatus, and the processor 11 may be configured to perform the processing of the identifier management unit 131, the registration target data generation unit 132, and the registered data search unit 134 in the storage apparatus 130 in FIG. 5, etc. The computer system 10 may be implemented as a cloud server that provides clients with cloud services.

The registration request apparatus 110 according to each example embodiment described above may also be implemented on the computer system 10 with reference to FIG. 28. In addition, the matching request apparatus 120 according to each example embodiment described above may also be implemented as the computer system 10. The registration request apparatus 110 and the matching request apparatus 120 may be configured as separate computer systems or a single apparatus that performs both registration and matching. The registration request apparatus 110 and the matching request apparatus 120 according to each example embodiment described above may be realized by storing a program that realizes the functions of the registration request apparatus 110 and the matching request apparatus 120 in FIG. 5, etc. in the storage apparatus 12 and causing the processor 11 to read and execute the program. The processors 11 in the registration request apparatus 110 and the matching request apparatus 120 may acquire biometric information such as fingerprints from sensors (not illustrated) via the interface 14 and extract binary vectors X and Y from the acquired information. The verification apparatus 150 according to each example embodiment escribed above may of course be implemented by a program executed on a computer, with reference to FIG. 28.

The disclosure of each of the above PTLs 1 to 5 and NPL 1 is incorporated herein by reference thereto. Variations and adjustments of the example embodiments and examples are possible within the scope of the overall disclosure (including the claims) of the present invention and based on the basic technical concept of the present invention. Various combinations and selections of various disclosed elements (including the elements in the claims, example embodiments, examples, drawings, etc.) are possible within the scope of the claims of the present invention. Namely, the present invention of course includes various variations and modifications that could be made by those skilled in the art according to the overall disclosure including the claims and the technical concept.

The above example embodiments can be described as, but not limited to, the following supplementary notes.

(Note 1)

A matching system, comprising:

a matching apparatus that generates a random number, and transmits encrypted data obtained by performing an operation of each of first values related to a first binary vector encrypted with an encryption key, and the random number, with each of the first values being kept in an encrypted state, or encrypted data obtained by encrypting the generated random number with the encryption key, to a matching request apparatus;

the matching request apparatus that performs an operation of the encrypted data transmitted from the matching apparatus and elements of a matching target second binary vector, with the encrypted data being kept in an encrypted state to generate and transmit encrypted data to the matching apparatus;

wherein the matching apparatus, based on a second value related to the first binary vector encrypted with the encryption key, the encrypted data transmitted from the matching request apparatus, and the random number, generates encrypted data or the encrypted data and auxiliary data, each thereof for use of verification of a mismatch degree between the second binary vector and the first binary vector, and transmits the generated data as a query to a verification apparatus; and the verification apparatus that determines whether a count number of mismatched elements between the second binary vector and the first binary vector is less than or equal to a predetermined number, based on a decrypted value obtained by decrypting, with a decryption key, the encrypted data included in the query transmitted from the matching apparatus, or the decrypted value and the auxiliary data included in the query.

(Note 2)

The matching system according to note 1, further comprising:

a registration request apparatus that transmits encrypted data obtained by encrypting at least one of each element of the first binary vector for registration and a result of a specific operation on the each element, with the encryption key; and a storage apparatus that receives the encrypted data of at least one of the each element of the first binary vector and the encrypted data of the result of the specific operation on the each element transmitted from the registration request apparatus and holds the encrypted data as registered data.

(Note 3)
The matching system according to note 1, wherein the matching apparatus calculates, in response to a matching request from the matching request apparatus, calculates second encrypted data obtained by operating the random number to each item of first encrypted data obtained by encrypting with the encryption key, a first calculated value related to each element of the first binary vector and transmits the second encrypted data to the matching request apparatus,
  wherein the matching request apparatus calculates third encrypted data that is a sum of values obtained by performing a scalar operation of each element of the second binary vector for each item of the second encrypted data transmitted from the matching apparatus, with the each item of the second encrypted data being kept in an encrypted state, and transmits the third encrypted data to the matching apparatus,
  wherein the matching apparatus adds fourth encrypted data obtained by removing the random number from the third encrypted data transmitted from the matching request apparatus and fifth encrypted data obtained by encrypting with the encryption key a second calculated value related to each element of the first binary vector, with the fourth and fifth encrypted data being kept in an encrypted state, to calculate sixth encrypted data of a distance between the first and second binary vectors and transmits the sixth encrypted data to the verification apparatus, and
  wherein the verification apparatus outputs acceptance or rejection based on a comparison between a distance between the first and second binary vectors and a predetermined threshold, the distance between the first and second binary vector obtained by decrypting the sixth encrypted data with the decryption key.

(Note 4)
The matching system according to note 3, comprising:
  a registration request apparatus that generates the first encrypted data by encrypting the first calculated value related to the first binary vector with encryption key, and the fifth encrypted data by encrypting the second calculated value related to individual elements of the first binary vector with the encryption key and transmits the first encrypted data and the fifth encrypted data to a storage apparatus; and
  the storage apparatus that receives the first encrypted data and the fifth encrypted data from the registration request apparatus, holds the first and fifth encrypted data as registered data, and supplies the first and fifth encrypted data to the matching apparatus.

(Note 5)
The matching system according to note 3, comprising:
  a registration request apparatus that transmits encrypted data obtained by encrypting each element of the first binary vector with the encryption key to a storage apparatus; and
  the storage apparatus that receives each item of the encrypted data of the each element of the first binary vector from the registration request apparatus, calculates the first encrypted data and the fifth encrypted data by calculating the first calculated values and the second calculated value, regarding the each element of the first binary vector, holds the first and fifth encrypted data as registered data, and supplies the first and fifth encrypted data to the matching apparatus.

(Note 6)
The matching system according to note 3, comprising:
  a registration request apparatus that encrypts the individual elements of the first binary vector by using an encryption key and transmits the encrypted data to a storage apparatus; and
  the storage apparatus that holds the encrypted data of each element of the first binary vector;
  wherein the matching apparatus calculates the first and second calculated values regarding each element of the first binary vector as the first and fifth encrypted data with the encrypted data of each element of the first binary vector being kept in an encrypted state.

(Note 7)
The matching system according to note 1, wherein, on reception of a matching request from the matching request apparatus, the matching apparatus performs an operation of the random number and first encrypted data obtained by encrypting, with the encryption key, first transformed values that are obtained by applying preset first transformation to the first binary vector to calculate second encrypted data and transmits the second encrypted data to the matching request apparatus;
  wherein the matching request apparatus performs an operation of each of second transformed values which are obtained by applying preset second transformation to the second binary vector and the second encrypted data transmitted from the matching apparatus to calculate encrypted data, each of which is a result of a multiplication of the second transformed value and a value which is obtained by operating the random number to the first transformed values, and transmits a sum of the encrypted data to the matching apparatus as third encrypted data;
  wherein the matching apparatus removes the random number from the third encrypted data transmitted from the matching request apparatus, calculates fourth encrypted data which is a sum of values obtained by multiplying the first transformed values by the second transformed values, and adds fifth encrypted data obtained by encrypting a sum of each element of the first binary vector with the encryption key to the fourth encrypted data with the encrypted data being kept in an encrypted state to calculate sixth encrypted data of a distance between the first and second binary vectors and transmits the sixth encrypted data to the verification apparatus; and
  wherein the verification apparatus obtains a distance between the first and second binary vectors by decrypting the sixth encrypted data with the decryption key to output acceptance or rejection based on a comparison between the distance between the first and second binary vectors and a predetermined threshold.

(Note 8)
The matching system according to note 7, comprising:
  a registration request apparatus that calculates the n first transformed values by applying the first transformation to the registration target n-dimensional first binary vector, generates the first encrypted data by encrypting the n first transformed values by using an encryption key, and transmits the first encrypted data and encrypted data of the individual elements of the registration target n-dimensional first binary vector to a storage apparatus; and
  the storage apparatus that generates the fifth encrypted data by encrypting a sum of the elements of the first binary vector, holds the first and fifth encrypted data as registered data, and transmits the first and fifth encrypted data to the matching apparatus.

(Note 9)
The matching system according to note 7, comprising:
a registration request apparatus that transmits encrypted data of the individual elements of the registration target n-dimensional first binary vector to a storage apparatus; and
the storage apparatus that includes means for calculating encrypted data of the n first transformed values by applying the first transformation to the first binary vector with the encrypted data of each element of the first binary vector being kept in an encrypted state and means for generating fifth encrypted data by encrypting a sum of elements of the first binary vector and holds the first encrypted data of the n first transformed values and the fifth encrypted data obtained by encrypting a sum of elements of the first binary vector,
wherein, on reception of a matching request from the matching request apparatus, the matching apparatus obtains the encrypted data of the n first transformed values from the storage apparatus, generates a random number, calculates second encrypted data by operating the random number to individual items of the first encrypted data of the n first transformed values, and transmits the second encrypted data to the matching request apparatus;
wherein the matching request apparatus calculates the second transformed values by applying the second transformation to the second binary vector, performs an operation of each of the second transformed values and each of the second encrypted data received from the matching apparatus, obtains encrypted data by multiplying each of the second transformed values by each of values obtained by operating the random number to the first transformed values, and transmits third encrypted data of a sum of the encrypted data to the matching apparatus; and
wherein the matching apparatus calculates sixth encrypted data by removing the random number from the third encrypted data transmitted from the matching request apparatus, calculates the fourth encrypted data of a sum of values obtained by multiplying the first transformed values by the second transformed values, and adds the fourth encrypted data and the fifth encrypted data registered in the storage apparatus and transmits the sixth encrypted data to the verification apparatus.

(Note 10)
The matching system according to note 7, wherein the matching apparatus includes:
means for acquiring, on reception of a matching request from the matching request apparatus, encrypted data of each element of the first binary vector and generating encrypted data of a sum of elements with the elements of the first binary vector being kept in an encrypted state;
means for calculating first encrypted data of the n first transformed values by applying the first transformation to the first binary vector with the encrypted data of each element of the first binary vector being kept in an encrypted state;
means for generating fifth encrypted data by encrypting a sum of the elements of the first binary vector, wherein the matching apparatus generates a random number, calculates the second encrypted data by operating the random number to individual items of the first encrypted data of the n first transformed values, and transmits the second encrypted data to the matching request apparatus;
wherein the matching request apparatus calculates the n second transformed values by applying the second transformation to the second binary vector, performs an operation of the individual second transformed values and the individual elements of the second encrypted data, obtains encrypted data by multiplying each of the second transformed values by each of values obtained by operating the random number to the first transformed values, and transmits third encrypted data of a sum of the encrypted data to the matching apparatus; and
wherein the matching apparatus removes the random number from the third encrypted data transmitted from the matching request apparatus, calculates fourth encrypted data of a sum of values obtained by multiplying the first transformed values by the second transformed values,
calculates sixth encrypted data by adding the fourth encrypted data and the fifth encrypted data registered in the storage apparatus and transmits the sixth encrypted data to the verification apparatus.

(Note 11)
The matching system according to note 7, wherein the matching apparatus includes:
means for acquiring, on reception of a matching request from the matching request apparatus, encrypted data of each element of the first binary vector, and generating fifth encrypted data by encrypting a sum of the elements of the first binary vector;
means for generating a first group of transformation coefficients constituting the first transformation; and
means for calculating the n first transformed values by applying the first transformation to the first binary vector, with the encrypted data of each element of the first binary vector being kept in an encrypted state,
wherein the matching apparatus generates a random number, calculates the second encrypted data by operating the random number to individual items of the first encrypted data of the n first transformed values, transmits the second encrypted data to the matching request apparatus, and transmits a second group of transformation coefficients constituting the second transformation used to generate the first group of transformation coefficients to the matching request apparatus;
wherein the matching request apparatus calculates the second transformed values by applying the second transformation defined by the second group of transformation coefficients from the matching apparatus to the second binary vector, performs an operation of each of the second transformed values and each of the second encrypted data received from the matching apparatus, obtains encrypted data by multiplying each of the second transformed values by each of values obtained by operating the random number to the first transformed values, and transmits third encrypted data of a sum of the encrypted data to the matching apparatus; and
wherein the matching apparatus removes the random number from the third encrypted data transmitted from the matching request apparatus, obtains encrypted data of a sum of values obtained by multiplying the first transformed values by the second transformed values, calculates sixth encrypted data by adding the encrypted data of the sum and the fifth encrypted data, and transmits the sixth encrypted data to the verification apparatus.

(Note 12)

The matching system according to note 9 or 10, comprising:
a registration request apparatus that generates encrypted data of individual elements of the registration target n-dimensional first binary vector and transmits the encrypted data to a storage apparatus, and
the storage apparatus stores the encrypted data of each element of the first binary vector transmitted from the registration request apparatus.

(Note 13)

The matching system according to note 1, wherein, on reception of a matching request from the matching request apparatus, the matching apparatus generates first to third random numbers and transmits first encrypted data obtained by encrypting the first random number with the encryption key to the matching request apparatus;
wherein the matching request apparatus calculates second encrypted data, which is a first operation result of a first calculated value of each element of a matching target second binary vector and the encrypted data of the first random number, and transmits the second encrypted data to the matching apparatus;
wherein the matching apparatus transmits third encrypted data obtained by performing an operation of the second encrypted data transmitted from the matching request apparatus and the second random number, fourth encrypted data which is an operation result of encrypted data of a first calculated value of each element of the first binary vector encrypted with the encryption key and the third random number, and a hash value based on the generated first to third random numbers to the verification apparatus; and
wherein the verification apparatus decrypts the third and fourth encrypted data transmitted from the matching apparatus with the decryption key, calculates hash values based on the decrypted values, determines whether a count number of mismatched elements between the hash values and the hash values transmitted from the matching apparatus is less than or equal to a predetermined value, determines acceptance if the number of mismatched elements is less than or equal to the predetermined value, and determines rejection if the number of mismatched elements is over the predetermined value.

(Note 14)

The matching system according to note 1, wherein, on reception of a matching request from the matching request apparatus, the matching apparatus generates first and second random numbers and transmits first encrypted data obtained by encrypting the first random number with the encryption key to the matching request apparatus,
wherein the matching request apparatus calculates second encrypted data, which is a first operation result of a first calculated value of each element of a matching target second binary vector and the encrypted data of the first random number, and transmits the second encrypted data to the matching apparatus,
wherein the matching apparatus transmits third encrypted data which is an operation result of the second encrypted data transmitted from the matching request apparatus, encrypted data of a first calculated value of each element of the first binary vector encrypted with the encryption key and the second random number, and hash values based on the generated first and second random numbers to the verification apparatus, and
wherein the verification apparatus decrypts the third encrypted data transmitted from the matching apparatus by using the decryption key, calculates hash values of the decrypted values, determines whether a count number of mismatched elements between the hash values and the hash values transmitted from the matching apparatus is less than or equal to a predetermined value, determines acceptance if the number of mismatched elements is less than or equal to the predetermined value, and determines rejection if the number of mismatched elements is over the predetermined value.

(Note 15)

The matching system according to note 13 or 14, comprising:
a registration request apparatus that transmits encrypted data obtained by encrypting the first calculated values of the individual elements of the first binary vector by using the encryption key to the storage apparatus; and
the storage apparatus that holds the encrypted data transmitted from the registration request apparatus.

(Note 16)

The matching system according to note 13 or 14, comprising:
a registration request apparatus that transmits encrypted data obtained by encrypting the first calculated values of the individual elements of the first binary vector by using the encryption key to the storage apparatus; and
a storage apparatus that includes:
means for generating random numbers for the respective encrypted data of the first calculated values of individual elements of the first binary vector;
means for generating hash values of the individual random numbers; and
means for transmitting encrypted data obtained by operation of the respective random numbers to the respective encrypted data of the first calculated values and the hash values to the verification apparatus;
wherein the verification apparatus decrypts the individual encrypted data transmitted from the storage apparatus by using the decryption key, calculates hash values of the individual decrypted values, determines whether the individual hash values match the respective hash values transmitted from the storage apparatus, determines rejection if there is any mismatched hash value, and determines acceptance if all the individual hash values match the respective hash values transmitted from the storage apparatus; and
wherein, if a verification result from the verification apparatus indicates acceptance, the storage apparatus holds the encrypted data of the first calculated values.

(Note 17)

A matching method, comprising steps of:
(a) by a matching apparatus, generating a random number and transmitting encrypted data obtained by performing an operation of each of first values related to a first binary vector encrypted with an encryption key, and the random number, with each of the first values being kept in an encrypted state, or encrypted data obtained by encrypting the generated random number with the encryption key, to a matching request apparatus;
(b) by the matching request apparatus, performing an operation of the encrypted data transmitted from the matching apparatus and elements of a matching target second binary vector, with the encrypted data being kept in an encrypted state to generate and transmitting encrypted data to the matching apparatus;

(c) by the matching apparatus, based on a second value related to the first binary vector encrypted with the encryption key, the encrypted data transmitted from the matching request apparatus, and the random number, generating encrypted data or the encrypted data and auxiliary data, each thereof for use of verification of a mismatch degree between the second binary vector and the first binary vector, and transmitting the generated data as a query to a verification apparatus; and (d) by the verification apparatus, determining whether a count number of mismatched elements between the second binary vector and the first binary vector is less than or equal to a predetermined number, based on a decrypted value obtained by decrypting, with a decryption key, the encrypted data included in the query transmitted from the matching apparatus, or the decrypted value and the auxiliary data included in the query.

(Note 18)

The matching method according to note 17, further comprising, before the step (a), steps of:

(e) by a registration request apparatus, transmitting encrypted data obtained by encrypting at least one of each element of the first binary vector for registration and a result of a specific operation on the each element, with the encryption key; and (f) by a storage apparatus, receiving the encrypted data of at least one of the each element of the first binary vector and the encrypted data of the result of the specific operation on the each element transmitted from the registration request apparatus to hold the encrypted data as registered data.

(Note 19)

The matching method according to note 17, wherein, in the step (a), the matching apparatus calculates, in response to a matching request from the matching request apparatus, calculates second encrypted data obtained by operating the random number to each item of first encrypted data obtained by encrypting with the encryption key, a first calculated value related to each element of the first binary vector and transmits the second encrypted data to the matching request apparatus, wherein, in the step (b), the matching request apparatus calculates third encrypted data that is a sum of values obtained by performing a scalar operation of each element of the second binary vector for each item of the second encrypted data transmitted from the matching apparatus, with the each item of the second encrypted data being kept in an encrypted state, and transmits the third encrypted data to the matching apparatus, wherein, in the step (c), the matching apparatus adds fourth encrypted data obtained by removing the random number from the third encrypted data transmitted from the matching request apparatus and fifth encrypted data obtained by encrypting with the encryption key a second calculated value related to each element of the first binary vector, with the fourth and fifth encrypted data being kept in an encrypted state, to calculate sixth encrypted data of a distance between the first and second binary vectors and transmits the sixth encrypted data to the verification apparatus, and wherein, in the step (d), the verification apparatus outputs acceptance or rejection based on a comparison between a distance between the first and second binary vectors and a predetermined threshold, the distance between the first and second binary vector obtained by decrypting the sixth encrypted data with the decryption key.

(Note 20)

The matching method according to note 19, comprising, before the step (a), steps of:

(e) by a registration request apparatus generating the first encrypted data by encrypting the first calculated value related to the first binary vector with encryption key, and the fifth encrypted data by encrypting the second calculated value related to individual elements of the first binary vector with the encryption key and transmitting the first encrypted data and the fifth encrypted data to a storage apparatus; and (f) by the storage apparatus, receiving the first encrypted data and the fifth encrypted data from the registration request apparatus, holding the first and fifth encrypted data as registered data, and supplying the first and fifth encrypted data to the matching apparatus.

(Note 21)

The matching method according to note 19, comprising, before the step (a), steps of:

(e) by a registration request apparatus, transmitting encrypted data obtained by encrypting each element of the first binary vector with the encryption key to a storage apparatus; and (f) by the storage apparatus, receiving each item of the encrypted data of the each element of the first binary vector from the registration request apparatus, calculating the first encrypted data and the fifth encrypted data by calculating the first calculated values and the second calculated value, regarding the each element of the first binary vector, holding the first and fifth encrypted data as registered data, and supplying the first and fifth encrypted data to the matching apparatus.

(Note 22)

The matching method according to note 19, comprising, before the step (a), steps of:

(e) by a registration request apparatus, encrypting the individual elements of the first binary vector by using an encryption key and transmits the encrypted data to a storage apparatus; and (f) by the storage apparatus, holding the encrypted data of each element of the first binary vector, wherein the matching apparatus calculates the first and second calculated values regarding each element of the first binary vector as the first and fifth encrypted data with the encrypted data of each element of the first binary vector being kept in an encrypted state.

(Note 23)

The matching method according to note 17, wherein, in the step (a), on reception of a matching request from the matching request apparatus, the matching apparatus performs an operation of the random number and first encrypted data obtained by encrypting, with the encryption key, first transformed values that are obtained by applying preset first transformation to the first binary vector to calculate second encrypted data and transmits the second encrypted data to the matching request apparatus;

wherein, in the step (b), the matching request apparatus performs an operation of second transformed values which are obtained by applying preset second transformation to the second binary vector and the second encrypted data transmitted from the matching apparatus to calculate encrypted data, each of which is a result of a multiplication of the second transformed value and a value which is obtained by operating the random number to the first transformed values, and transmits a sum of the encrypted data to the matching apparatus as third encrypted data;

wherein, in the step (c), the matching apparatus removes the random number from the third encrypted data transmitted from the matching request apparatus, calculates fourth encrypted data which is a sum of values obtained by multiplying the first transformed values by the second transformed values, and adds fifth encrypted data obtained by encrypting a sum of each element of the first binary vector with the encryption key to the fourth encrypted data with the encrypted data being kept in an encrypted state to calculate sixth encrypted data of a distance between the first and second binary vectors and transmits the sixth encrypted data to the verification apparatus; and wherein, in the step (d), the verification apparatus obtains a distance between the first and second binary vectors by decrypting the sixth encrypted data with the decryption key to output acceptance or rejection based on a comparison between the distance between the first and second binary vectors and a predetermined threshold.

(Note 24)

The matching method according to note 23, comprising, before the step (a), steps of:

(e) by a registration request apparatus, calculating the n first transformed values by applying the first transformation to the registration target n-dimensional first binary vector, generates the first encrypted data by encrypting the n first transformed values by using an encryption key, and transmitting the first encrypted data and encrypted data of the individual elements of the registration target n-dimensional first binary vector to a storage apparatus; and (f) by the storage apparatus, generating the fifth encrypted data by encrypting a sum of the elements of the first binary vector, holding the first and fifth encrypted data as registered data, and transmitting the first and fifth encrypted data to the matching apparatus.

(Note 25)

The matching method according to note 23, comprising, before the step (a), steps of:

(e) by a registration request apparatus, transmitting encrypted data of the individual elements of the registration target n-dimensional first binary vector to a storage apparatus; and (f) by the storage apparatus, calculating encrypted data of the n first transformed values by applying the first transformation to the first binary vector with the encrypted data of each element of the first binary vector being kept in an encrypted state, and generating fifth encrypted data by encrypting a sum of elements of the first binary vector and holds the first encrypted data of the n first transformed values and the fifth encrypted data obtained by encrypting a sum of elements of the first binary vector, wherein, on reception of a matching request from the matching request apparatus, the matching apparatus obtains the encrypted data of the n first transformed values from the storage apparatus, generates a random number, calculates second encrypted data by operating the random number to individual items of the first encrypted data of the n first transformed values, and transmits the second encrypted data to the matching request apparatus;

wherein the matching request apparatus calculates the second transformed values by applying the second transformation to the second binary vector, performs an operation of each of the second transformed values and each of the second encrypted data received from the matching apparatus, obtains encrypted data by multiplying each of the second transformed values by each of values obtained by operating the random number to the first transformed values, and transmits third encrypted data of a sum of the encrypted data to the matching apparatus; and wherein the matching apparatus calculates sixth encrypted data by removing the random number from the third encrypted data transmitted from the matching request apparatus, calculates the fourth encrypted data of a sum of values obtained by multiplying the first transformed values by the second transformed values, and adds the fourth encrypted data and the fifth encrypted data registered in the storage apparatus and transmits the sixth encrypted data to the verification apparatus.

(Note 26)

The matching method according to note 23;

wherein the step (a) includes the steps of:

by the matching apparatus, acquiring, on reception of a matching request from the matching request apparatus, encrypted data of each element of the first binary vector and generating encrypted data of a sum of elements with the elements of the first binary vector being kept in an encrypted state;

calculating first encrypted data of the n first transformed values by applying the first transformation to the first binary vector with the encrypted data of each element of the first binary vector being kept in an encrypted state;

generating fifth encrypted data by encrypting a sum of the elements of the first binary vector;

generating a random number; calculating the second encrypted data by operating the random number to individual items of the first encrypted data of the n first transformed values; and transmitting the second encrypted data to the matching request apparatus;

wherein, in the step (b), the matching request apparatus calculates the n second transformed values by applying the second transformation to the second binary vector, performs an operation of the individual second transformed values and the individual elements of the second encrypted data, obtains encrypted data by multiplying each of the second transformed values by each of values obtained by operating the random number to the first transformed values, and transmits third encrypted data of a sum of the encrypted data to the matching apparatus; and wherein, in the step (c), the matching apparatus removes the random number from the third encrypted data transmitted from the matching request apparatus, calculates fourth encrypted data of a sum of values obtained by multiplying the first transformed values by the second transformed values, calculates sixth encrypted data by adding the fourth encrypted data and the fifth encrypted data registered in the storage apparatus and transmits the sixth encrypted data to the verification apparatus.

(Note 27)

The matching method according to note 23, wherein the step (a) includes steps of:

by the matching apparatus, on reception of a matching request from the matching request apparatus, acquiring encrypted data of each element of the first binary vector, and generating fifth encrypted data by encrypting a sum of the elements of the first binary vector;

generating a first group of transformation coefficients constituting the first transformation;

calculating the n first transformed values by applying the first transformation to the first binary vector, with the encrypted data of each element of the first binary vector being kept in an encrypted state;

generating a random number;

calculating the second encrypted data by operating the random number to individual items of the first encrypted data of the n first transformed values, transmitting the second encrypted data to the matching request apparatus; and transmitting a second group of transformation coefficients constituting the second transformation used to generate the first group of transformation coefficients to the matching request apparatus, wherein, in the step (b), the matching request apparatus calculates the second transformed values by applying the second transformation defined by the second group of transformation coefficients from the matching apparatus to the second binary vector, performs an operation of each of the second transformed values and each of the second encrypted data received from the matching apparatus, obtains encrypted data by multiplying each of the second transformed values by each of values obtained by operating the random number to the first transformed values, and transmits third encrypted data of a sum of the encrypted data to the matching apparatus; and wherein, in the step (c), the matching apparatus removes the random number from the third encrypted data transmitted from the matching request apparatus, obtains encrypted data of a sum of values obtained by multiplying the first transformed values by the second transformed values, calculates sixth encrypted data by adding the encrypted data of the sum and the fifth encrypted data, and transmits the sixth encrypted data to the verification apparatus.

(Note 28)
The matching method according to note 26 or 27, comprising, before the step (a), steps of:
(e) by a registration request apparatus, generates encrypted data of the individual elements of the registration target n-dimensional first binary vector and transmits the encrypted data to a storage apparatus; and
(f) by the storage apparatus, storing the encrypted data of each element of the first binary vector transmitted from the registration request apparatus.

(Note 29)
The matching method according to note 17, wherein, in the step (a), on reception of a matching request from the matching request apparatus, the matching apparatus generates first to third random numbers and transmits first encrypted data obtained by encrypting the first random number with the encryption key to the matching request apparatus;
wherein, in the step (b), the matching request apparatus calculates second encrypted data, which is a first operation result of a first calculated value of each element of a matching target second binary vector and the encrypted data of the first random number, and transmits the second encrypted data to the matching apparatus;

wherein, in the step (c), the matching apparatus transmits third encrypted data obtained by performing an operation of the second encrypted data transmitted from the matching request apparatus and the second random number, fourth encrypted data which is an operation result of encrypted data of a first calculated value of each element of the first binary vector encrypted with the encryption key and the third random number, and a hash value based on the generated first to third random numbers to the verification apparatus; and wherein, in the step (d), the verification apparatus decrypts the third and fourth encrypted data transmitted from the matching apparatus with the decryption key, calculates hash values based on the decrypted values, determines whether a count number of mismatched elements between the hash values and the hash values transmitted from the matching apparatus is less than or equal to a predetermined value, determines acceptance if the number of mismatched elements is less than or equal to the predetermined value, and determines rejection if the number of mismatched elements is over the predetermined value.

(Note 30)
The matching method according to note 17, wherein, in the step (a), on reception of a matching request from the matching request apparatus, the matching apparatus generates first and second random numbers and transmits first encrypted data obtained by encrypting the first random number with the encryption key to the matching request apparatus,
wherein, in the step (b), the matching request apparatus calculates second encrypted data, which is a first operation result of a first calculated value of each element of a matching target second binary vector and the encrypted data of the first random number, and transmits the second encrypted data to the matching apparatus, wherein, in the step (c), the matching apparatus transmits third encrypted data which is an operation result of the second encrypted data transmitted from the matching request apparatus, encrypted data of a first calculated value of each element of the first binary vector encrypted with the encryption key and the second random number, and hash values based on the generated first and second random numbers to the verification apparatus, and wherein, in the step (d), the verification apparatus decrypts the third encrypted data transmitted from the matching apparatus by using the decryption key, calculates hash values of the decrypted values, determines whether a count number of mismatched elements between the hash values and the hash values transmitted from the matching apparatus is less than or equal to a predetermined value, determines acceptance if the number of mismatched elements is less than or equal to the predetermined value, and determines rejection if the number of mismatched elements is over the predetermined value.

(Note 31)
The matching method according to note 29 or 30, comprising, before the step (a), steps of:
(e) by a registration request apparatus, transmitting encrypted data obtained by encrypting the first calculated values of the individual elements of the first binary vector by using the encryption key to the storage apparatus; and (f) by a storage apparatus, generating random numbers for the respective encrypted data of the first calculated values of individual elements of the first binary vector;
(g) by a storage apparatus, generating hash values of the individual random numbers; and
(h) by a storage apparatus, transmitting encrypted data obtained by operation of the respective random numbers to the respective encrypted data of the first calculated values and the hash values to the verification apparatus;
(i) by the verification apparatus, decrypting the individual encrypted data transmitted from the storage apparatus by using the decryption key, calculating hash values of the individual decrypted values, determines whether the individual hash values match the respective hash values transmitted from the storage apparatus, determining rejection if there is any mismatched hash value, and determining acceptance if all the individual hash values match the respective hash values transmitted from the storage apparatus; and
(j) if a verification result from the verification apparatus indicates acceptance, holding, by the storage apparatus, the encrypted data of the first calculated values.

(Note 32)
A matching apparatus, comprising:
means for generating a random number, and transmitting encrypted data obtained by performing an operation of each of first values related to a first binary vector encrypted with an encryption key, and the random number, with each of the first values being kept in an encrypted state, or encrypted data obtained by encrypting the generated random number with the encryption key, to a matching request apparatus;
means for receiving, from the matching request apparatus, encrypted data obtained by an operation of each element of a matching target second binary vector, with the encrypted data being kept in an encrypted state;
means for generating, based on a second value related to the first binary vector encrypted with the encryption key, the encrypted data transmitted from the matching request apparatus, and the random number,
encrypted data or the encrypted data and auxiliary data, each thereof for use of verification of a mismatch degree between the second binary vector and the first binary vector, and transmits the generated data as a query to a verification apparatus; and
means for receiving a verification result from the verification apparatus that determines whether a count number of mismatched elements between the second binary vector and the first binary vector is less than or equal to a predetermined number, based on a decrypted value obtained by decrypting, with a decryption key, the encrypted data included in the query transmitted from the matching apparatus, or the decrypted value and the auxiliary data.

(Note 33)
A matching apparatus, including:
means for generating, in response to a matching request from a matching request apparatus, a random number, obtain second encrypted data by performing an operation of the random number and individual elements of first encrypted data obtained by encrypting first calculated values about individual elements of a first binary vector encrypted by using an encryption key by using the encryption key, and transmitting the second encrypted data to the matching request apparatus; and
means for receiving third encrypted data, which is a sum of values obtained by performing a scalar operation of individual elements of the second encrypted data and individual elements of a matching target second binary vector with the encrypted data being kept in an encrypted state from the matching request apparatus;
means for calculating sixth encrypted data about a distance between the first and second binary vectors by adding fourth encrypted data obtained by removing the random number from the third encrypted data transmitted from the matching request apparatus and fifth encrypted data obtained by encrypting a second calculated value about the individual elements of the first binary vector by using the encryption key without decrypting the fourth and fifth encrypted data and transmitting the sixth encrypted data to a verification apparatus as a query; and
means for receiving a verification result from the verification apparatus that outputs the verification result based on a comparison between a distance between the first and second binary vectors obtained by decrypting the sixth encrypted data in the query by using the decryption key and a predetermined threshold.

(Note 34)
A matching apparatus, including:
means for calculating, on reception of a matching request from a matching request apparatus, second encrypted data by performing an operation of a generated random number and first encrypted data obtained by encrypting first transformed values obtained by applying preset first transformation to a registration target first binary vector encrypted by using an encryption key by using the encryption key and transmitting the second encrypted data to the matching request apparatus;
means for receiving third encrypted data, which is a sum of encrypted data, which corresponds to results of multiplication of second transformed values obtained by applying preset second transformation to a matching target second binary vector by values obtained by operating the random number to the first transformed values, by performing an operation of the second transformed values and the second encrypted data from the matching request apparatus;
means for calculating sixth encrypted data about a distance between the first and second binary vectors by removing the random number from the third encrypted data transmitted from the matching request apparatus, calculating fourth encrypted data, which is a sum of values obtained by multiplying the first transformed values by the second transformed values, and adding fifth encrypted data obtained by encrypting a sum of individual elements of the first binary vector by using the encryption key to the fourth encrypted data with the encrypted data being kept in an encrypted state and transmitting the sixth encrypted data to a verification apparatus as a query; and
means for receiving a verification result from the verification apparatus that outputs the verification result based on a comparison between a distance between the first and second binary vectors obtained by decrypting the sixth encrypted data in the query by using the decryption key and a predetermined threshold.

(Note 35)
A matching apparatus, including:
means for generating, on reception of a matching request from a matching request apparatus, first to third random numbers and transmitting first encrypted data obtained by encrypting the first random number with the encryption key to the matching request apparatus; and means for receiving second encrypted data, which is a first operation result between first calculated values of individual elements of a matching target second binary vector and the encrypted data of the first random number from the matching request apparatus;

means for transmitting third encrypted data obtained by performing an operation of the second encrypted data transmitted from the matching request apparatus and the second random number, fourth encrypted data which is an operation result of encrypted data of first calculated values of individual elements of a registration target first binary vector and the third random number, and hash values (auxiliary data for verification) based on the generated first to third random numbers to a verification apparatus; and means for receiving a verification result from the verification apparatus that decrypts the third and fourth encrypted data by using a decryption key, calculates hash values of values obtained by multiplying the decrypted values, determines whether a count number of mismatched elements between the hash values and the hash values transmitted from the matching apparatus is less than or equal to a predetermined value, determines acceptance as the verification result if the number of mismatched elements is less than or equal to the predetermined value, and determines rejection as the verification result if the number of mismatched elements is over the predetermined value.

(Note 36)

A matching apparatus, including:

means for generating, on reception of a matching request from a matching request apparatus, first and second random numbers and transmitting first encrypted data obtained by encrypting the first random number with the encryption key to the matching request apparatus;

means for receiving second encrypted data, which is a first operation result between first calculated values of individual elements of a matching target second binary vector and the encrypted data of the first random number from the matching request apparatus;

means for transmitting the second encrypted data transmitted from the matching request apparatus, third encrypted data, which is an operation result of encrypted data of first calculated values of individual elements of a registration target first binary vector encrypted by using the encryption key and the second random number, and hash values (auxiliary data for verification) based on the generated first and second random numbers to a verification apparatus; and means for receiving a verification result from the verification apparatus that decrypts the third encrypted data by using a decryption key, calculates hash values of the decrypted values, determines whether a count number of mismatched elements between the hash values and the hash values transmitted from the matching apparatus is less than or equal to a predetermined value, determines acceptance as the verification result if the number of mismatched elements is less than or equal to the predetermined value, and determines rejection as the verification result if the number of mismatched elements is over the predetermined value.

(Note 37)

A non-transitory computer-readable medium storing therein a program causing a computer of a matching apparatus to perform processing comprising generating a random number, and transmitting encrypted data obtained by performing an operation of each of first values related to a first binary vector encrypted with an encryption key, and the random number, with each of the first values being kept in an encrypted state, or encrypted data obtained by encrypting the generated random number with the encryption key, to a matching request apparatus;

receiving, from the matching request apparatus, encrypted data obtained by an operation of each element of a matching target second binary vector and the encrypted data, with the encrypted data being kept in an encrypted state;

generating, based on a second value related to the first binary vector encrypted with the encryption key, the encrypted data transmitted from the matching request apparatus, and the random number, encrypted data or the encrypted data and auxiliary data, each thereof for use of verification of a mismatch degree between the second binary vector and the first binary vector, and transmits the generated data as a query to a verification apparatus; and receiving a verification result from the verification apparatus that determines whether a count number of mismatched elements between the second binary vector and the first binary vector is less than or equal to a predetermined number, based on a decrypted value obtained by decrypting, with a decryption key, the encrypted data included in the query transmitted from the matching apparatus, or the decrypted value and the auxiliary data.

(Note 38)

A non-transitory computer-readable medium storing therein a program causing a computer of a matching apparatus to perform processing comprising generating, in response to a matching request from a matching request apparatus, a random number, calculating second encrypted data by performing an operation of the random number and individual elements of first encrypted data obtained by encrypting first calculated values about individual elements of a first binary vector encrypted by using an encryption key by using the encryption key, and transmitting the second encrypted data to the matching request apparatus; and receiving third encrypted data, which is a sum of values obtained by performing a scalar operation of individual elements of the second encrypted data and individual elements of a matching target second binary vector with the encrypted data being kept in an encrypted state from the matching request apparatus;

calculating sixth encrypted data about a distance between the first and second binary vectors by adding fourth encrypted data obtained by removing the random number from the third encrypted data transmitted from the matching request apparatus and fifth encrypted data obtained by encrypting a second calculated value about the individual elements of the first binary vector by using the encryption key without decrypting the fourth and fifth encrypted data and transmitting the sixth encrypted data to a verification apparatus as a query; and receiving a verification result from the verification apparatus that outputs the verification result based on a comparison between a distance between the first and second binary vectors obtained by decrypting the sixth encrypted data in the query by using the decryption key and a predetermined threshold.

(Note 39)

A non-transitory computer-readable medium storing therein a program, causing a computer to performing processing comprising:

calculating, on reception of a matching request from a matching request apparatus, second encrypted data by performing an operation of a generated random number and first encrypted data obtained by encrypting first transformed values obtained by applying preset first transformation to a registration target first binary vector encrypted by using an encryption key by using the encryption key and transmitting the second encrypted data to the matching request apparatus;

receiving third encrypted data, which is a sum of encrypted data, which corresponds to results of multiplication of second transformed values obtained by applying preset second transformation to a matching target second binary vector by values obtained by operating the random number to the first transformed values, by performing an operation of the second transformed values and the second encrypted data from the matching request apparatus;

calculating sixth encrypted data about a distance between the first and second binary vectors by removing the random number from the third encrypted data transmitted from the matching request apparatus, calculating fourth encrypted data, which is a sum of values obtained by multiplying the first transformed values by the second transformed values, and adding fifth encrypted data obtained by encrypting a sum of individual elements of the first binary vector by using the encryption key to the fourth encrypted data with the encrypted data being kept in an encrypted state and transmitting the sixth encrypted data to a verification apparatus as a query; and receiving a verification result from the verification apparatus that outputs the verification result based on a comparison between a distance between the first and second binary vectors obtained by decrypting the sixth encrypted data in the query by using the decryption key and a predetermined threshold.

(Note 40)

A non-transitory computer-readable medium storing therein a program causing a computer to perform processing comprising:

generating, on reception of a matching request from a matching request apparatus, first to third random numbers and transmitting first encrypted data obtained by encrypting the first random number with the encryption key to the matching request apparatus; and receiving second encrypted data, which is a first operation result between first calculated values of individual elements of a matching target second binary vector and the encrypted data of the first random number from the matching request apparatus;

transmitting third encrypted data obtained by performing an operation of the second encrypted data transmitted from the matching request apparatus and the second random number, fourth encrypted data which is an operation result of encrypted data of first calculated values of individual elements of a registration target first binary vector and the third random number, and a hash value based on the generated first to third random numbers to a verification apparatus; and receiving a verification result from the verification apparatus that decrypts the third and fourth encrypted data by using a decryption key, calculates hash values of values obtained by multiplying the decrypted values, determines whether a count number of mismatched elements between the hash values and the hash values transmitted from the matching apparatus is less than or equal to a predetermined value, determines acceptance as the verification result if the number of mismatched elements is less than or equal to the predetermined value, and determines rejection as the verification result if the number of mismatched elements is over the predetermined value.

(Note 41)

A non-transitory computer-readable medium storing therein a program causing a computer to perform processing comprising:

generating, on reception of a matching request from a matching request apparatus, first and second random numbers and transmitting first encrypted data obtained by encrypting the first random number with the encryption key to the matching request apparatus;

receiving second encrypted data, which is a first operation result between first calculated values of individual elements of a matching target second binary vector and the encrypted data of the first random number from the matching request apparatus;

transmitting the second encrypted data transmitted from the matching request apparatus, third encrypted data, which is an operation result of encrypted data of first calculated values of individual elements of a registration target first binary vector encrypted by using the encryption key and the second random number, and a hash value based on the generated first and second random numbers to a verification apparatus; and receiving a verification result from the verification apparatus that decrypts the third encrypted data by using a decryption key, calculates hash values of the decrypted values, determines whether a count number of mismatched elements between the hash values and the hash values transmitted from the matching apparatus is less than or equal to a predetermined value, determines acceptance as the verification result if the number of mismatched elements is less than or equal to the predetermined value, and determines rejection as the verification result if the number of mismatched elements is over the predetermined value.

The invention claimed is:

1. A matching system, comprising:

a matching apparatus;

a matching request apparatus; and a verification apparatus, wherein the matching apparatus calculates first encrypted data related to a first vector of biometric information encrypted with an encryption key, and transmits the first encrypted data to the matching request apparatus, wherein the first encrypted data includes a second encrypted vector obtained by performing a scalar operation of a random number in common on each element of a first encrypted vector obtained by applying a predetermined functional operation to each element of the first vector, and encrypting, with the encryption key, the functional operation result of the each element of the first vector, the matching request apparatus calculates second encrypted data related to a second vector of biometric information of a matching target and transmits the second encrypted data to the matching apparatus, wherein the second encrypted data is a sum of values, each value obtained by performing a scalar operation of each element of the second vector on a corresponding element of the second encrypted vector, the matching apparatus calculates encrypted data indicating a distance between the first and second vectors by using the first encrypted data and the second encrypted data, and transmits the encrypted data to the verification apparatus, and the verification apparatus determines, based on the encrypted data indicating the distance, a decryption key and a predetermined threshold, acceptance or rejection of the matching target, depending on whether or not the distance is less than or equal to the threshold to output a determination result.

2. The matching system according to claim 1, wherein the verification apparatus compares the distance between the first and second vectors obtained by decrypting the encrypted data indicating the distance with the decryption key, with the threshold, and outputs acceptance or rejection of the matching target, depending on whether or not the distance is less than or equal to the threshold.

3. The matching system according to claim 1, wherein the matching apparatus calculate the encrypted data indicating the distance between the first and second vectors, by adding the second encrypted data with the random number removed therefrom and third encryption data obtained by encrypting, with the encryption key, a sum of each element of the first vector.

4. The matching system according to claim 3, comprising:
a registration request apparatus that generates the first encrypted vector by applying the predetermined functional operation to each element of the first vector, and encrypting, with encryption key, the functional operation result of the first vector and the third encrypted data by encrypting, with encryption key, the sum of each element of the first vector and transmits the first encrypted vector and the third encrypted data to a storage apparatus; and
the storage apparatus that receives the first encrypted vector and the third encrypted data from the registration request apparatus, holds the first encrypted vector and the third encrypted data as registered data in a storage, and supplies the first encrypted vector and the third encrypted data to the matching apparatus.

5. The matching system according to claim 3, comprising:
a registration request apparatus that transmits encrypted data obtained by encrypting each element of the first vector with the encryption key to a storage apparatus; and
the storage apparatus that receives each item of the encrypted data of the each element of the first vector from the registration request apparatus, calculates the first encrypted vector and the third encrypted data, hold the first encrypted vector and the third encrypted data as registered data in a storage, and supplies the first encrypted vector and the third encrypted data to the matching apparatus.

6. The matching system according to claim 3, comprising:
a registration request apparatus that encrypts each element of the first vector by using the encryption key and transmit encrypted data to a storage apparatus; and
the storage apparatus that holds the encrypted data of the each element of the first vector,
wherein the matching apparatus calculates the first encrypted vector and the third encrypted data with the encrypted data of the each element of the first vector being kept in an encrypted state.

7. A matching system comprising:
a matching apparatus;
a matching request apparatus; and
a verification apparatus, wherein
the matching apparatus calculates first encrypted data related to a first vector of biometric information encrypted with an encryption key, and transmits the first encrypted data to the matching request apparatus,
the matching request apparatus calculates second encrypted data related to biometric information of a matching target and transmits the second encrypted data to the matching apparatus,
the matching apparatus calculates encrypted data indicating a distance between the first and second vectors by using the first encrypted data and the second encrypted data, and transmits the encrypted data to the verification apparatus, and
the verification apparatus determines, based on the encrypted data indicating the distance, a decryption key and a predetermined threshold, acceptance or rejection of the matching target, depending on whether or not the distance is less than or equal to the threshold to output a determination result,
wherein the matching apparatus calculates the first encrypted data, by generating a random number and performing an operation of the random number and third encrypted data obtained by encrypting, with the encryption key, first transformed values that are obtained by applying preset first transformation to the first vector, wherein the matching request apparatus calculates the second encrypted data, by performing an operation of each of second transformed values that are obtained by applying preset second transformation to the second vector and the first encrypted data transmitted from the matching apparatus to calculate encrypted data, each of which is a result of a multiplication of the second transformed value and a value which is obtained by operating the random number to each of the first transformed values, and calculating a sum of the encrypted data, as the second encrypted data.

8. The matching system according to claim 7, wherein the matching apparatus calculate the encrypted data indicating the distance between the first and second vectors, by removing the random number from the second encrypted data transmitted from the matching request apparatus, calculating fourth encrypted data which is a sum of values obtained by multiplying the first transformed values by the second transformed values, adding fifth encrypted data obtained by encrypting a sum of each element of the first vector with the encryption key to the fourth encrypted data with the fourth and fifth encrypted data being kept in an encrypted state to calculate the encrypted data indicating the distance between the first and second vectors.

9. The matching system according to claim 8, comprising:
a registration request apparatus that calculates the n first transformed values by applying the first transformation to the first vector which is a registration target and n-dimensional, generates the third encrypted data by encrypting the n first transformed values by using the encryption key, and transmit the first encrypted data and encrypted data of the individual elements of the first vector to a storage apparatus; and
the storage apparatus that generate the fifth encrypted data by encrypting a sum of the elements of the first vector, hold the first and fifth encrypted data as registered data in a storage, and transmits the first and fifth encrypted data to the matching apparatus.

10. The matching system according to claim 8, comprising:
- a registration request apparatus that transmits encrypted data of the individual elements of the first vector which is a registration target and n-dimensional first vector to a storage apparatus; and
- the storage apparatus is configured to:
- calculate the third encrypted data of the n first transformed values by applying the first transformation to the first vector with the encrypted data of each element of the first vector being kept in an encrypted state, and
- generate the fifth encrypted data by encrypting a sum of elements of the first vector and holds the third encrypted data of the n first transformed values and the fifth encrypted data obtained by encrypting a sum of elements of the first vector,
- wherein, on reception of a matching request from the matching request apparatus, the matching apparatus obtains the third encrypted data of the n first transformed values from the storage apparatus, generates a random number, calculates the first encrypted data by operating the random number to individual items of the third encrypted data of the n first transformed values, and transmits the second encrypted data to the matching request apparatus,
- wherein the matching request apparatus calculates the second transformed values by applying the second transformation to the second vector, performs an operation of each of the second transformed values and each of the first encrypted data received from the matching apparatus to calculate the second encrypted data by multiplying each of the second transformed values by each of values obtained by operating the random number to the first transformed values, and summing each value of the multiplication, and transmits the second encrypted data to the matching apparatus, and
- wherein the matching apparatus calculates the fourth encrypted data of a sum of values of multiplication of the first transformed values by the second transformed values by removing the random number from the second encrypted data transmitted from the matching request apparatus, and adds the fourth encrypted data and the fifth encrypted data registered in the storage apparatus to obtain the encrypted data indicating the distance between the first and second vectors and transmits the encrypted data indicating the distance between the first and second vectors to the verification apparatus.

11. The matching system according to claim 8, wherein the matching apparatus obtains, on reception of a matching request from the matching request apparatus, encrypted data of each element of the first vector and generates encrypted data of a sum of elements with the elements of the first vector being kept in an encrypted state;
- calculates the third encrypted data of the n first transformed values by applying the first transformation to the first vector with the encrypted data of each element of the first vector being kept in an encrypted state,
- generates the fifth encrypted data by encrypting a sum of the elements of the first vector, and
- generates a random number, calculates the first encrypted data by operating the random number to individual items of the third encrypted data of the n first transformed values, and transmits the first encrypted data to the matching request apparatus,
- wherein the matching request apparatus calculates the n second transformed values by applying the second transformation to the second vector, performs an operation of the individual second transformed values and the individual elements of the first encrypted data, obtains encrypted data by multiplying each of the second transformed values by each of values obtained by operating the random number to the first transformed values, and transmits the second encrypted data of a sum of the obtained encrypted data to the matching apparatus, and
- wherein the matching apparatus removes the random number from the second encrypted data transmitted from the matching request apparatus, calculates the fourth encrypted data of a sum of values obtained by multiplying the first transformed values by the second transformed values, and
- calculates the encrypted data indicating the distance between the first and second vectors by adding the fourth encrypted data and the fifth encrypted data registered in the storage apparatus.

12. The matching system according to claim 8, wherein the matching apparatus obtains, on reception of a matching request from the matching request apparatus, encrypted data of each element of the first vector, and generates the fifth encrypted data by encrypting a sum of the elements of the first vector, generates a first group of transformation coefficients constituting the first transformation,
- calculates the n first transformed values by applying the first transformation to the first vector, with the encrypted data of each element of the first vector being kept in an encrypted state, and
- generates a random number, calculates the first encrypted data by operating the random number to individual items of the third encrypted data of the n first transformed values, transmits the second encrypted data to the matching request apparatus, and transmits a second group of transformation coefficients constituting the second transformation used to generate the first group of transformation coefficients to the matching request apparatus,
- wherein the matching request apparatus calculates the second transformed values by applying the second transformation defined by the second group of transformation coefficients from the matching apparatus to the second vector, performs an operation of each of the second transformed values and each of the first encrypted data received from the matching apparatus, obtains encrypted data by multiplying each of the second transformed values by each of values obtained by operating the random number to the first transformed values, and transmits the second encrypted data of a sum of the obtained encrypted data to the matching apparatus, and
- wherein the matching apparatus removes the random number from the second encrypted data transmitted from the matching request apparatus, obtains encrypted data of a sum of values obtained by multiplying the first transformed values by the second transformed values, calculates the encrypted data indicating the distance between the first and second vectors by adding the encrypted data of the sum and the fifth encrypted data, and transmits the encrypted data the encrypted data indicating the distance between the first and second vectors to the verification apparatus.

13. A matching method for a system including a matching apparatus, a matching request apparatus, and a verification apparatus, the method comprising:

the matching apparatus calculating first encrypted data related to a first vector of biometric information encrypted with an encryption key, and transmits the first encrypted data to the matching request apparatus;

the matching request apparatus calculating second encrypted data related to biometric information of a matching target and transmitting the second encrypted data to the matching apparatus, the matching apparatus calculating encrypted data indicating a distance between the first and second vectors by using the first encrypted data and the second encrypted data, and transmits the encrypted data to the verification apparatus; and the verification apparatus determining, based on the encrypted data indicating the distance, a decryption key and a predetermined threshold, acceptance or rejection of the matching target, depending on whether or not the distance is less than or equal to the threshold to output a determination result, the method comprising:

the matching apparatus calculating the first encrypted data, by generating a random number and performing an operation of the random number and third encrypted data obtained by encrypting, with the encryption key, first transformed values that are obtained by applying preset first transformation to the first vector; and the matching request apparatus calculating the second encrypted data, by performing an operation of each of second transformed values that are obtained by applying preset second transformation to the second vector and the first encrypted data transmitted from the matching apparatus to calculate encrypted data, each of which is a result of a multiplication of the second transformed value and a value which is obtained by operating the random number to each of the first transformed values, and calculating a sum of the encrypted data, as the second encrypted data.

14. The matching method according to claim 13, comprising the verification apparatus comparing the distance between the first and second vectors obtained by decrypting the encrypted data indicating the distance with the decryption key, with the predetermined threshold, and outputting acceptance or rejection of the matching target, depending on whether or not the distance is less than or equal to the threshold.

\* \* \* \* \*